US012602805B2

(12) United States Patent
Phillips

(10) Patent No.: US 12,602,805 B2
(45) Date of Patent: Apr. 14, 2026

(54) DATA TRANSMISSION THROTTLING AND DATA QUALITY UPDATING FOR A SLAM DEVICE

(71) Applicant: Adeia Guides Inc., San Jose, CA (US)

(72) Inventor: Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 336 days.

(21) Appl. No.: 18/128,934

(22) Filed: Mar. 30, 2023

(65) Prior Publication Data

US 2024/0331180 A1 Oct. 3, 2024

(51) Int. Cl.
| | |
|---|---|
| *G06T 7/579* | (2017.01) |
| *G06T 3/40* | (2024.01) |
| *G06V 10/74* | (2022.01) |
| *H04N 7/01* | (2006.01) |

(52) U.S. Cl.
CPC ............... *G06T 7/579* (2017.01); *G06T 3/40* (2013.01); *G06V 10/761* (2022.01); *H04N 7/013* (2013.01)

(58) Field of Classification Search
CPC ......... G06V 10/761; G06T 3/40; G06T 7/579; G06T 7/70; G06T 17/00; G06T 7/246; H04N 7/013
See application file for complete search history.

(56) References Cited

U.S. PATENT DOCUMENTS

| | | | | |
|---|---|---|---|---|
| 10,893,310 | B1 * | 1/2021 | Wu | .................... H04N 21/2387 |
| 2018/0101173 | A1 * | 4/2018 | Banerjee | ................. G08G 5/80 |
| 2018/0306590 | A1 * | 10/2018 | Li | ...................... G01C 21/3859 |
| 2019/0042860 | A1 * | 2/2019 | Lee | ...................... G06V 20/588 |
| 2022/0047134 | A1 | 2/2022 | Burbank et al. | |
| 2024/0328815 | A1 * | 10/2024 | Phillips | .............. G01C 21/3804 |

OTHER PUBLICATIONS

"MalLab, " [retrieved on Apr. 25, 2023 from URL: https://github.com/ethz-asl/maplab] (8 pages).
"SCReaM," [retrieved on Apr. 25, 2023 from URL: https://github.com/EricssonResearch/scream] (10 pages).
Divya Agarwal, AutoVisionNews "How Slam Works for Self-Driving Cars: A Brief but Detailed Overview," Jun. 5, 2020 [retrieved on Apr. 25, 2023 from URL: https://www.autovision-news.com/adas/how-slam-works/] (5 pages).
Fredrick Alriksson et al., "XR and 5G: Extended reality at scale with time-critical communication," Ericsson Technology Review: Extended Reality and 5G (2021) (14 pages).

(Continued)

*Primary Examiner* — Delomia L Gilliard
(74) *Attorney, Agent, or Firm* — HG LAW LLP

(57) ABSTRACT

A communication control method for a SLAM device may include requesting an adjustment of a framerate of the sensor of the first device for obtaining additional image data or a request for an adjustment of image resolution, framerate or other parameters of additional image data to be received from the SLAM device, according to the speed of the SLAM device or a distance of the SLAM device from nearby objects. Also, map data of a device region of the SLAM device initially used for guiding the device may be updated if higher quality image data is received, to aid in improved navigating of the device region based on the updated map data.

15 Claims, 56 Drawing Sheets

1300

1302 Receive IMU and image data
1304 Determine distance to objects
1306 Determine speed of the device
1308 Determine speed of other objects
1310 Does the distance or speed warrant an image data adjustment? No
Yes
1312 Request adjusting framerate
1314 Request adjusting resolution
1316 Localize based on additional data

(56)        References Cited

OTHER PUBLICATIONS

Scott Martin, NVIDIA "What Is Simultaneous Localization and Mapping?," [retrieved on Apr. 25, 2023 from URL: https://blogs.nvidia.com/blog/2019/07/25/what-is-simultaneous-localization-and-mapping-nvidia-jetson-isaac-sdk/] Jul. 25, 2019 (4 pages).

Shweta Mayekar, Analytics Insight "The Future of AR Is SLAM Technology. But What Is SLAM?," Jun. 22, 2018 [retrieved on Apr. 25, 2023 from URL: https://www.analyticsinsight.net/future-ar-slam-technology-slam/] (3 pages).

Sanket Prabhu, AR Reverie "Introduction to SLAM (Simultaneous Localisation and Mapping)," Jan. 28, 2018 [retrieved on Apr. 25, 2023 from URL: http://www.arreverie.com/blogs/introduction-simultaneous-localisation-and-mapping/] (7 pages).

Maplab [retrieved Apr. 25, 2023 from URL: https://maplab.asl.ethz.ch/docs/master/index.html] (3pages).

\* cited by examiner

111

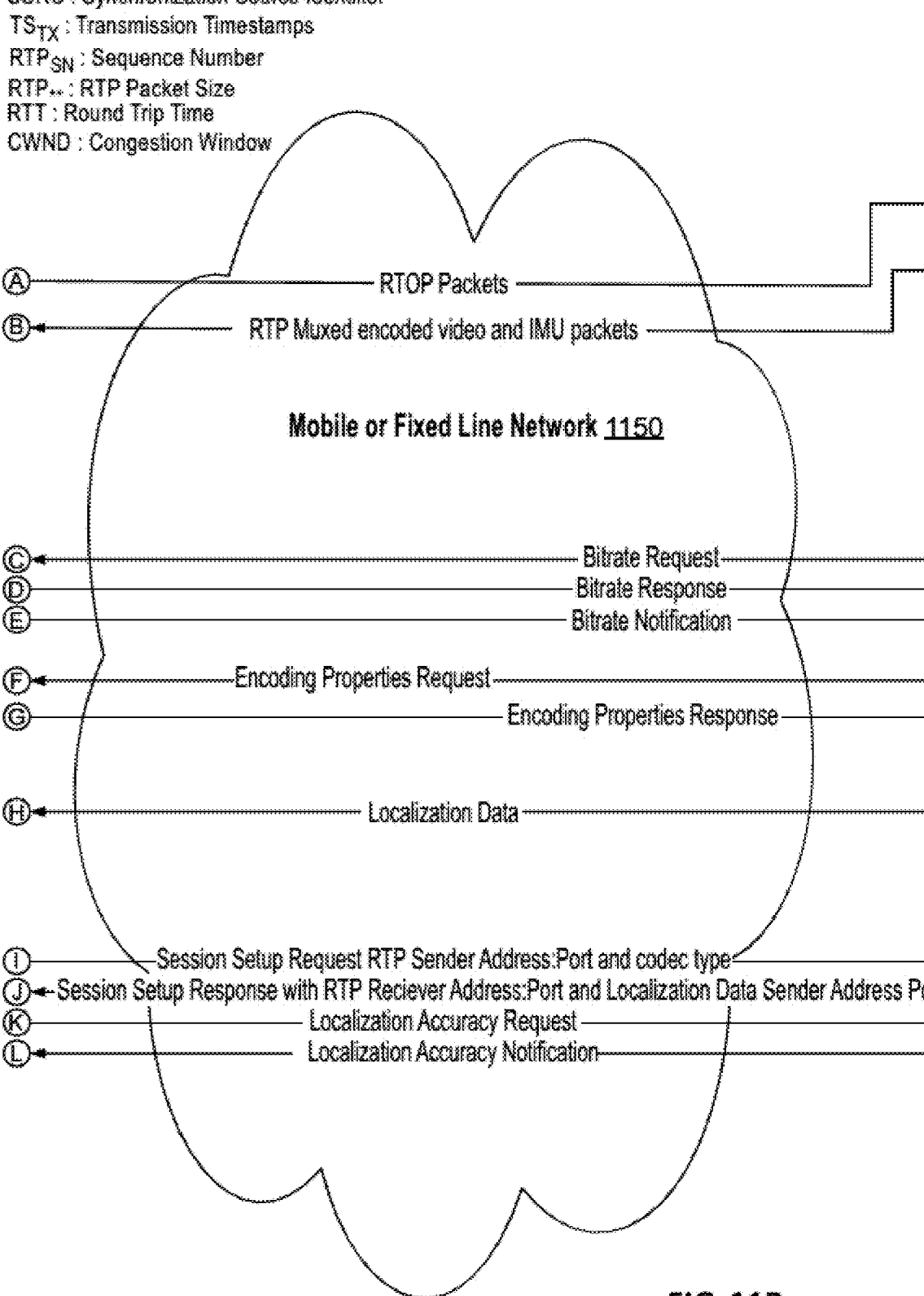

SSRC : Synchronization Source Identifier
TS_TX : Transmission Timestamps
RTP_SN : Sequence Number
RTP.. : RTP Packet Size
RTT : Round Trip Time
CWND : Congestion Window Ⓐ ——————————————— RTOP Packets ———————————————

Ⓑ ◄——————— RTP Muxed encoded video and IMU packets ———————

Mobile or Fixed Line Network 1150

Ⓒ ◄——————————————— Bitrate Request ———————————————

Ⓓ ————————————————— Bitrate Response —————————————————

Ⓔ ————————————————— Bitrate Notification —————————————————

Ⓕ ◄————— Encoding Properties Request —————

Ⓖ ————————————— Encoding Properties Response —————————————

Ⓗ ◄———————————— Localization Data ————————————

Ⓘ ————— Session Setup Request RTP Sender Address:Port and codec type —————

Ⓙ ◄— Session Setup Response with RTP Reciever Address:Port and Localization Data Sender Address Po Ⓚ ——————————— Localization Accuracy Request ———————————

Ⓛ ◄—————— Localization Accuracy Notification ——————

1302 — Receive IMU and image data

1304 — Determine distance to objects

1306 — Determine speed of the device

1308 — Determine speed of other objects

1310 — Does the distance or speed warrant an image data adjustment?

No

Yes

1312 — Request adjusting framerate

1314 — Request adjusting resolution

1316 — Localize based on additional data

FIG. 14A

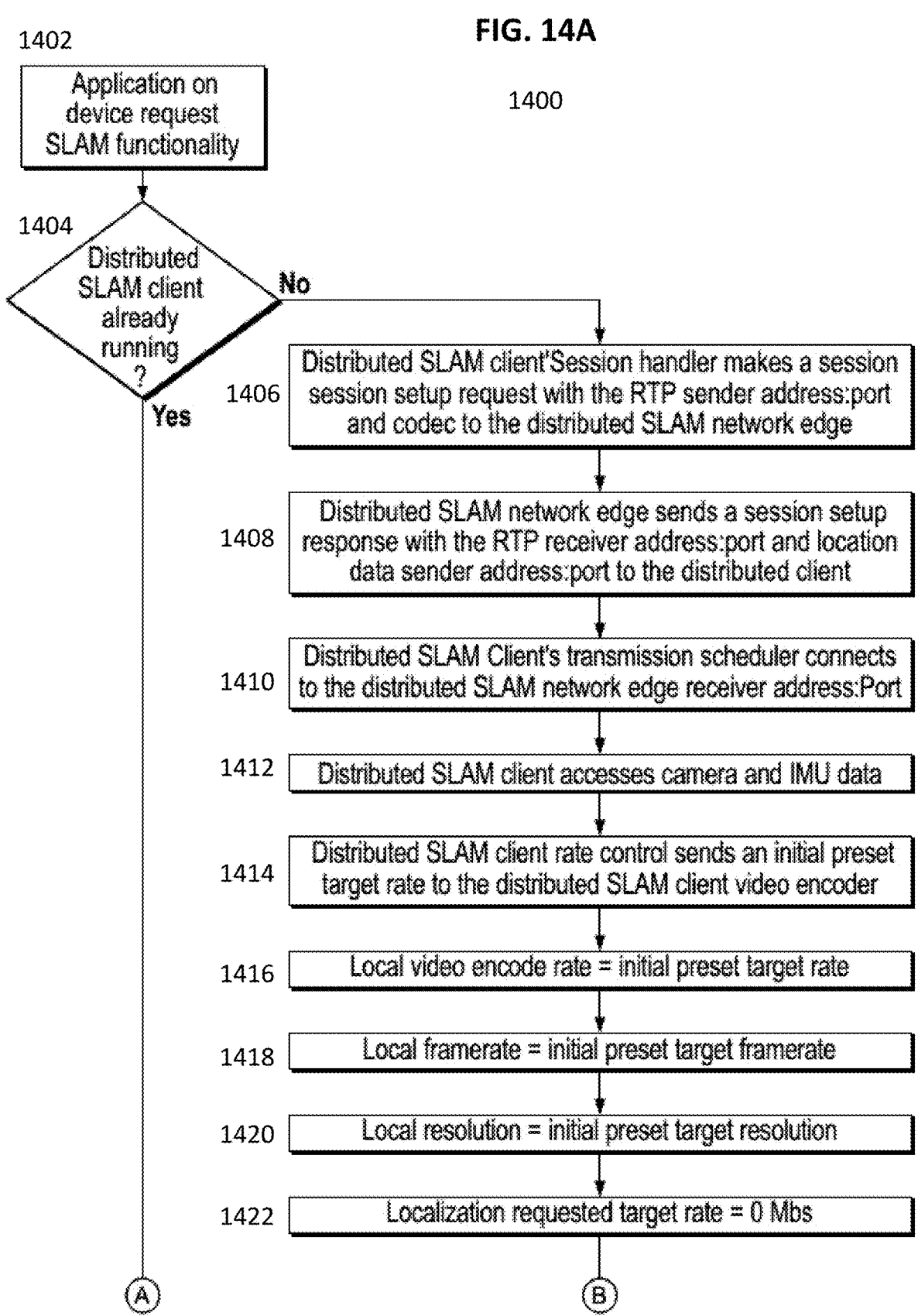

1402
Application on device request SLAM functionality

1404
Distributed SLAM client already running ?

No

Yes

1406 Distributed SLAM client'Session handler makes a session session setup request with the RTP sender address:port and codec to the distributed SLAM network edge 1408 Distributed SLAM network edge sends a session setup response with the RTP receiver address:port and location data sender address:port to the distributed client 1410 Distributed SLAM Client's transmission scheduler connects to the distributed SLAM network edge receiver address:Port 1412 Distributed SLAM client accesses camera and IMU data 1414 Distributed SLAM client rate control sends an initial preset target rate to the distributed SLAM client video encoder 1416 Local video encode rate = initial preset target rate 1418 Local framerate = initial preset target framerate 1420 Local resolution = initial preset target resolution 1422 Localization requested target rate = 0 Mbs

1400

A

B

1500      FIG. 15A
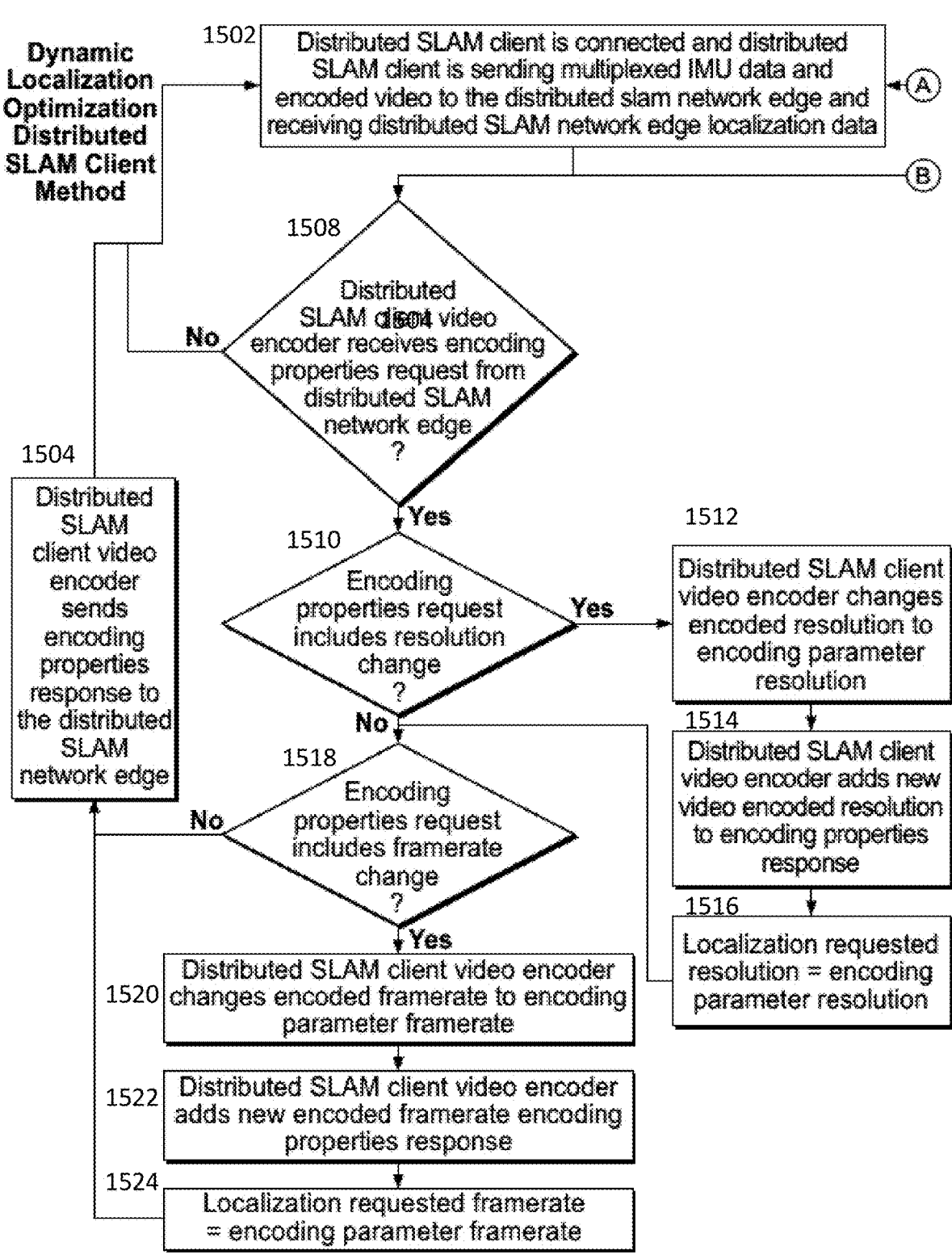

Figure 17:
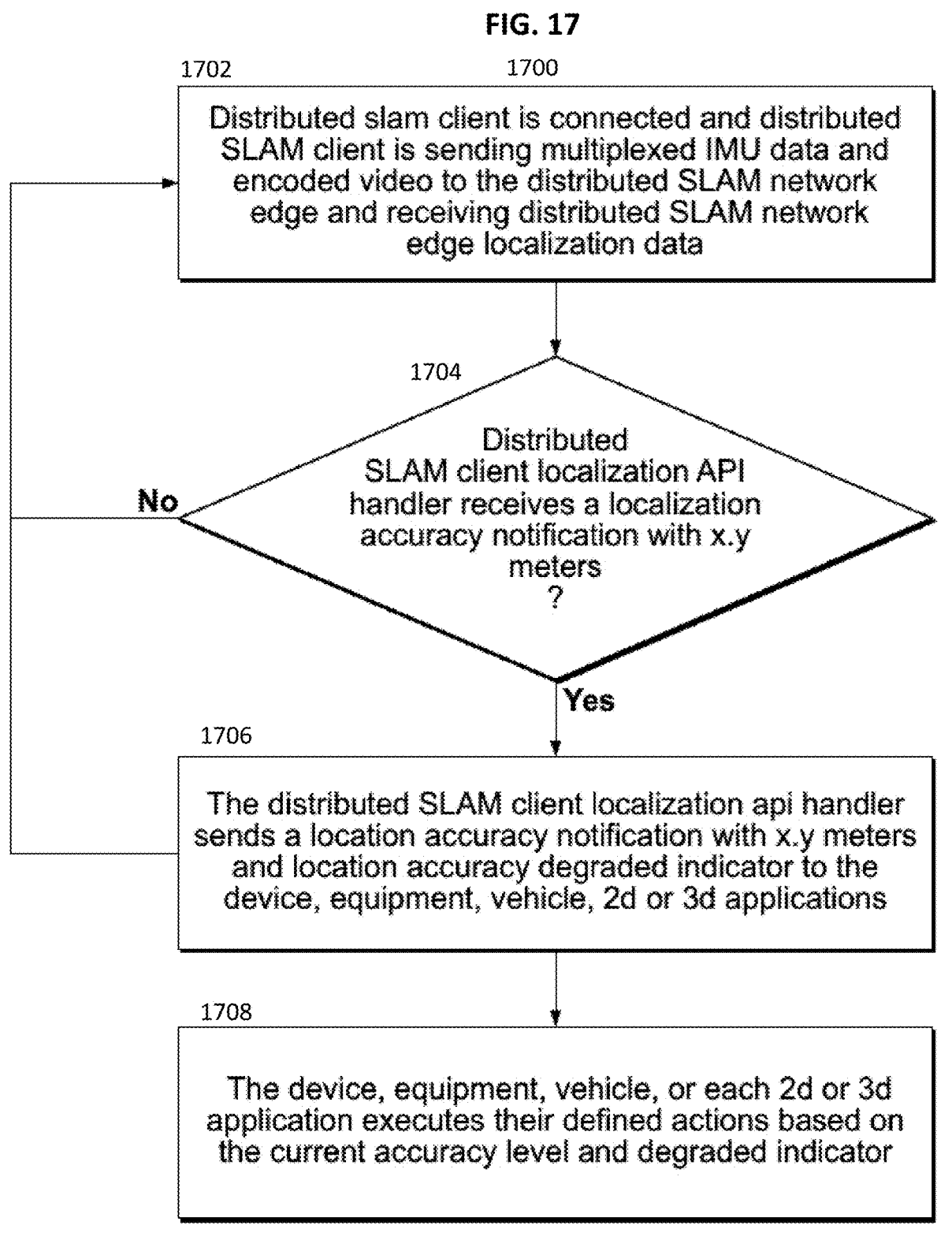

Distributed slam client is connected and distributed SLAM client is sending multiplexed IMU data and encoded video to the distributed SLAM network edge and receiving distributed SLAM network edge localization data

1704

Distributed SLAM client localization API handler receives a localization accuracy notification with x.y meters ?

No

Yes

1706

The distributed SLAM client localization api handler sends a location accuracy notification with x.y meters and location accuracy degraded indicator to the device, equipment, vehicle, 2d or 3d applications

1708

The device, equipment, vehicle, or each 2d or 3d application executes their defined actions based on the current accuracy level and degraded indicator

FIG. 18A    1800

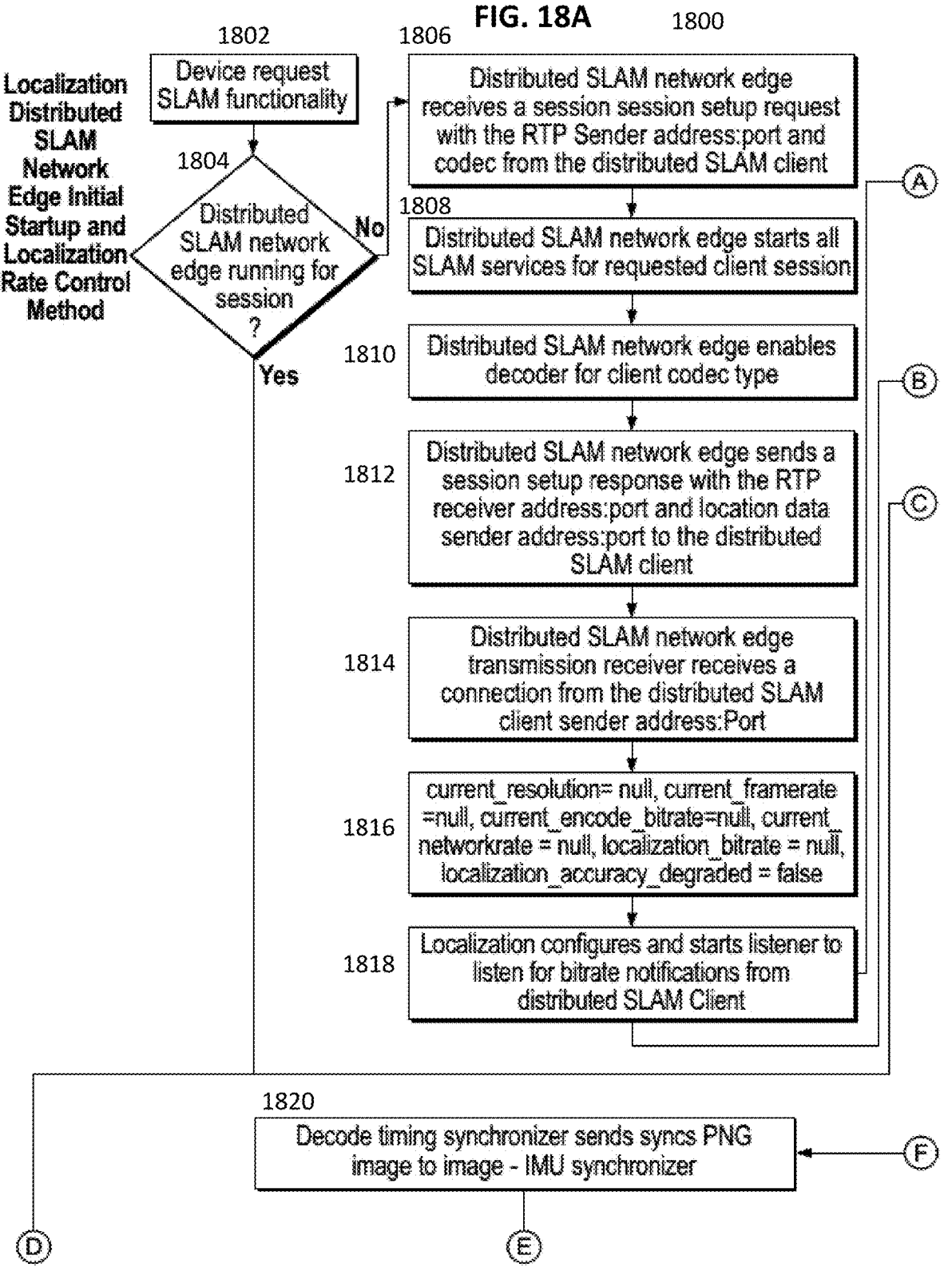

1802
Device request SLAM functionality

Localization Distributed SLAM Network Edge Initial Startup and Localization Rate Control Method

1804
Distributed SLAM network edge running for session ?
No
Yes

1806
Distributed SLAM network edge receives a session session setup request with the RTP Sender address:port and codec from the distributed SLAM client
Ⓐ

1808
Distributed SLAM network edge starts all SLAM services for requested client session 1810
Distributed SLAM network edge enables decoder for client codec type
Ⓑ

1812
Distributed SLAM network edge sends a session setup response with the RTP receiver address:port and location data sender address:port to the distributed SLAM client
Ⓒ

1814
Distributed SLAM network edge transmission receiver receives a connection from the distributed SLAM client sender address:Port 1816
current_resolution= null, current_framerate =null, current_encode_bitrate=null, current_networkrate = null, localization_bitrate = null, localization_accuracy_degraded = false 1818
Localization configures and starts listener to listen for bitrate notifications from distributed SLAM Client 1820
Decode timing synchronizer sends syncs PNG image to image - IMU synchronizer
Ⓕ

Figure 18D:
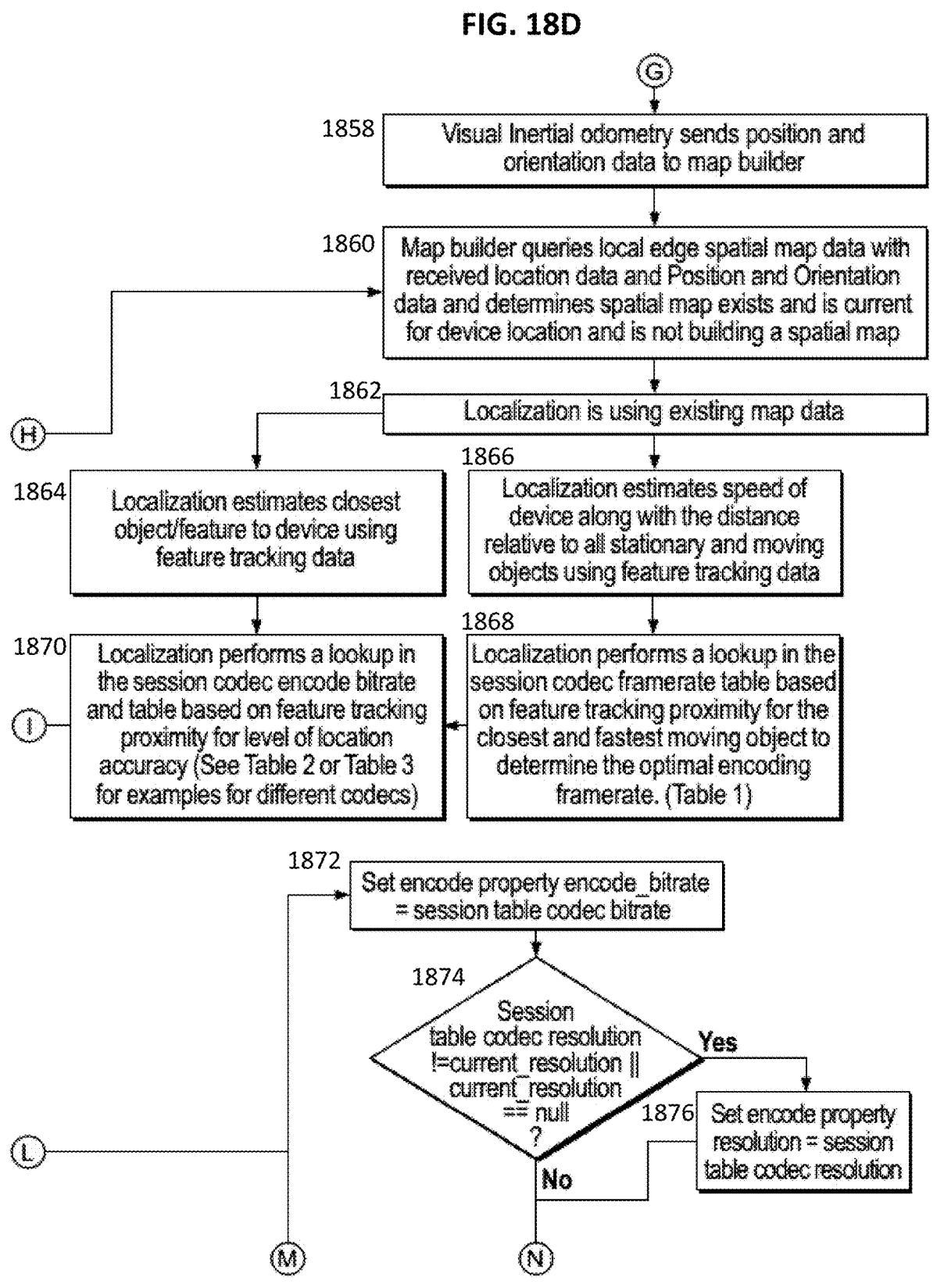

1858 | Visual Inertial odometry sends position and orientation data to map builder 1860 | Map builder queries local edge spatial map data with received location data and Position and Orientation data and determines spatial map exists and is current for device location and is not building a spatial map (H)

1862 | Localization is using existing map data

1864 | Localization estimates closest object/feature to device using feature tracking data 1866 | Localization estimates speed of device along with the distance relative to all stationary and moving objects using feature tracking data 1870 | Localization performs a lookup in the session codec encode bitrate and table based on feature tracking proximity for level of location accuracy (See Table 2 or Table 3 for examples for different codecs)

(I)

1868 | Localization performs a lookup in the session codec framerate table based on feature tracking proximity for the closest and fastest moving object to determine the optimal encoding framerate. (Table 1)

1872 | Set encode property encode_bitrate = session table codec bitrate

1874 | Session table codec resolution !=current_resolution || current_resolution == null ?

Yes →

1876 | Set encode property resolution = session table codec resolution

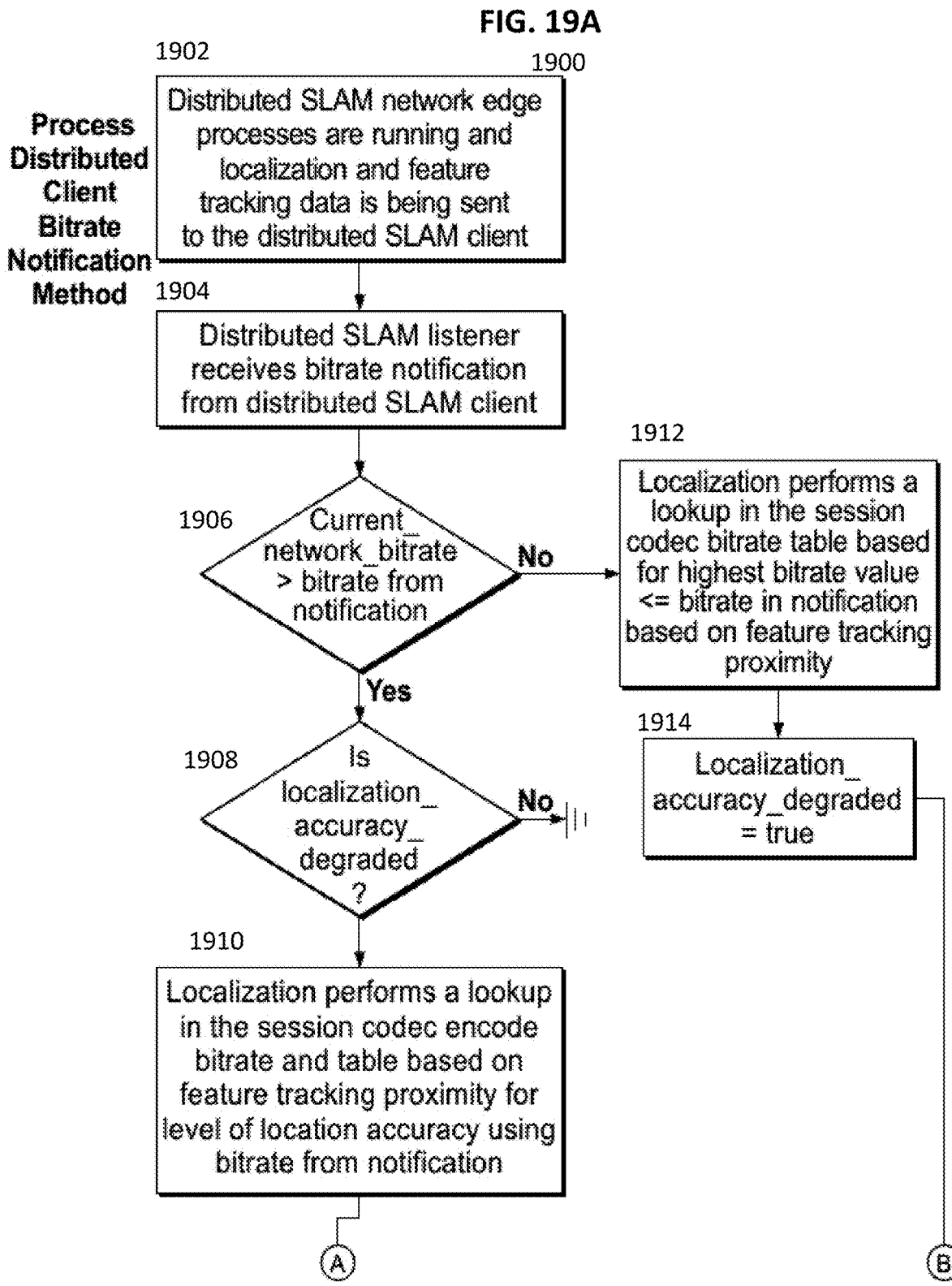

1902

1900

Process Distributed Client Bitrate Notification Method

Distributed SLAM network edge processes are running and localization and feature tracking data is being sent to the distributed SLAM client

1904

Distributed SLAM listener receives bitrate notification from distributed SLAM client

1906

Current_ network_bitrate > bitrate from notification

1912

Localization performs a lookup in the session codec bitrate table based for highest bitrate value <= bitrate in notification based on feature tracking proximity No Yes

1908

Is localization_ accuracy_ degraded ?

No

1914

Localization_ accuracy_degraded = true

1910

Localization performs a lookup in the session codec encode bitrate and table based on feature tracking proximity for level of location accuracy using bitrate from notification

Figure 19B:
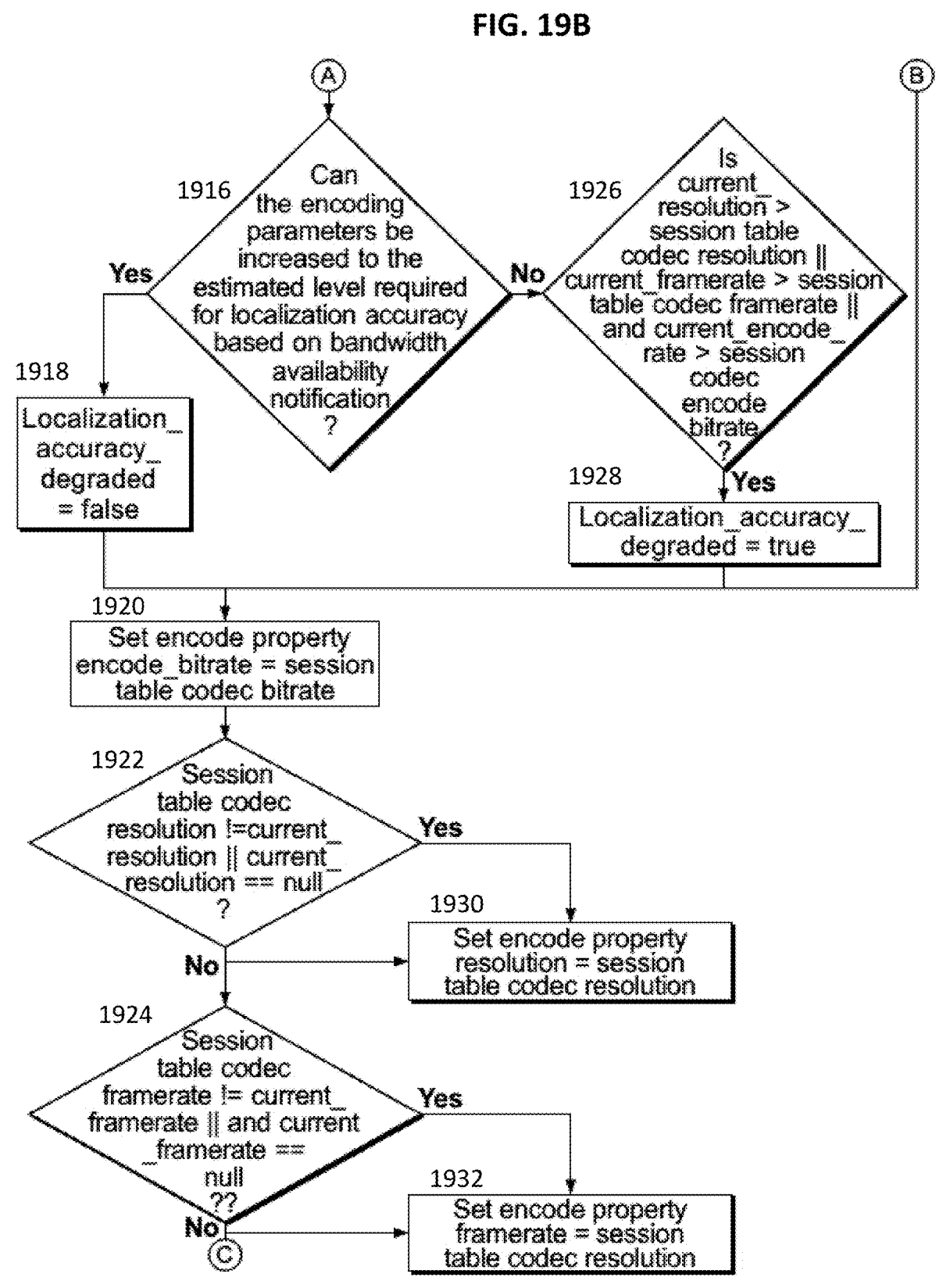

1916
Can the encoding parameters be increased to the estimated level required for localization accuracy based on bandwidth availability notification ?

1926
Is current_resolution > session table codec resolution || current_framerate > session table codec framerate || and current_encode_rate > session codec encode bitrate ?

Yes ← → No

1918
Localization_accuracy_degraded = false

1928
Localization_accuracy_degraded = true    Yes

1920
Set encode property encode_bitrate = session table codec bitrate

1922
Session table codec resolution !=current_resolution || current_resolution == null ?    Yes

1930
Set encode property resolution = session table codec resolution

No

1924
Session table codec framerate != current_framerate || and current_framerate == null ??    Yes

1932
Set encode property framerate = session table codec resolution

No
Ⓒ

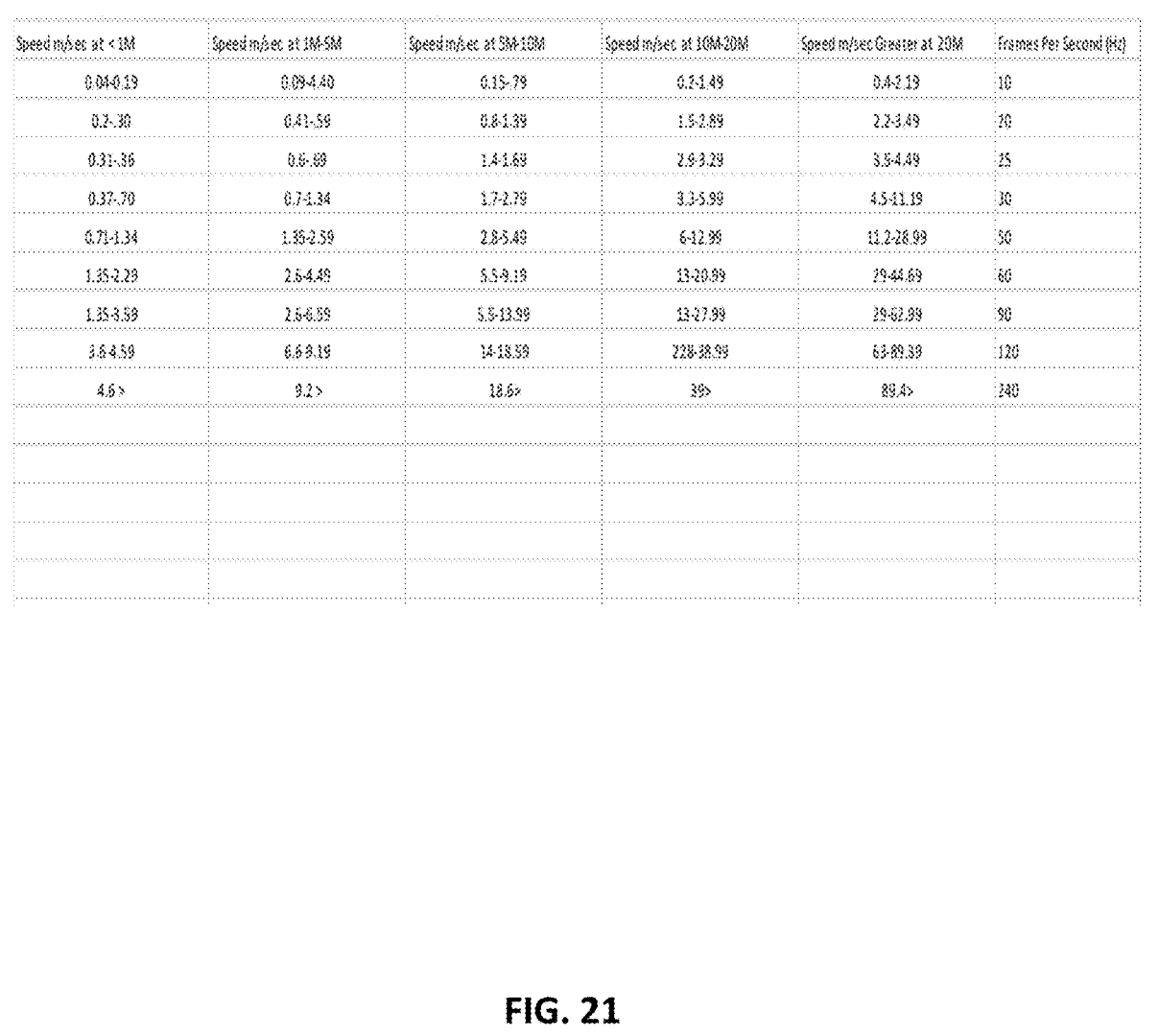

| Speed m/sec at <1M | Speed m/sec at 1M-5M | Speed m/sec at 5M-10M | Speed m/sec at 10M-20M | Speed m/sec Greater at 20M | Frames Per Second (Hz) |
|---|---|---|---|---|---|
| 0.04-0.19 | 0.09-4.40 | 0.15-.79 | 0.2-1.49 | 0.4-2.19 | 10 |
| 0.2-.30 | 0.41-.59 | 0.8-1.39 | 1.5-2.89 | 2.2-3.49 | 20 |
| 0.31-.36 | 0.6-.69 | 1.4-1.69 | 2.9-3.29 | 3.5-4.49 | 25 |
| 0.37-.70 | 0.7-1.34 | 1.7-2.79 | 3.3-5.99 | 4.5-11.19 | 30 |
| 0.71-1.34 | 1.35-2.59 | 2.8-5.49 | 6-12.99 | 11.2-28.99 | 50 |
| 1.35-2.29 | 2.6-4.49 | 5.5-9.19 | 13-20.99 | 29-44.69 | 60 |
| 1.35-3.59 | 2.6-6.59 | 5.5-13.99 | 13-27.99 | 29-62.89 | 90 |
| 3.6-4.59 | 6.6-9.19 | 14-18.59 | 228-38.99 | 63-89.39 | 120 |
| 4.6> | 9.2> | 18.6> | 39> | 89.4> | 240 |

FIG. 21

| Accuracy (m) | Resolution | Frame Rate | HEVC Bitrate Mbs | VVC Bitrate Mbs |
|---|---|---|---|---|
| 0.01 | 8K | 240 Hz | 280 | 135 |
| 0.01 | 8K | 120 Hz | 230 | 115 |
| 0.01 | 8K | 90 Hz | 180 | 90 |
| 0.01 | 8K | 60 Hz | 145 | 72.5 |
| 0.01 | 8K | 50 Hz | 130 | 67 |
| 0.01 | 8K | 30 Hz | 115 | 57.5 |
| 0.01 | 8K | 25 Hz | 100 | 55.5 |
| 0.01 | 8K | 20 Hz | 85 | 51 |
| 0.01 | 8K | 10 Hz | 59 | 45 |
| 0.05 | 8K | 240 Hz | 230 | 115 |
| 0.05 | 8K | 120 Hz | 200 | 100 |
| 0.05 | 8K | 90 Hz | 160 | 80 |
| 0.05 | 8K | 60 Hz | 130 | 65 |
| 0.05 | 8K | 50 Hz | 110 | 55 |
| 0.05 | 8K | 30 Hz | 96 | 48 |
| 0.05 | 8K | 25 Hz | 90 | 45 |
| 0.05 | 8K | 20 Hz | 80 | 40 |
| 0.05 | 8K | 10 Hz | 50 | 25 |
| 0.1 | 4K | 240 Hz | 160 | 80 |
| 0.1 | 4K | 120 Hz | 120 | 63 |
| 0.1 | 4K | 90 Hz | 105 | 55 |
| 0.1 | 4K | 60 Hz | 55 | 27 |
| 0.1 | 4K | 50 Hz | 49 | 25 |
| 0.1 | 4K | 30 Hz | 42 | 21 |
| 0.1 | 4K | 25 Hz | 39 | 20.5 |
| 0.1 | 4K | 20 Hz | 35 | 17.4 |
| 0.1 | 4K | 10 Hz | 19 | 10 |
| 0.5 | 4K | 240 Hz | 150 | 75 |
| 0.5 | 4K | 120 Hz | 105 | 54 |
| 0.5 | 4K | 90 Hz | 99 | 49 |
| 0.5 | 4K | 60 Hz | 48 | 25 |
| 0.5 | 4K | 50 Hz | 40 | 21 |
| 0.5 | 4K | 30 Hz | 31 | 16.4 |
| 0.5 | 4K | 25 Hz | 28 | 15 |
| 0.5 | 4K | 20 Hz | 25 | 13 |
| 0.5 | 4K | 10 Hz | 15.2 | 8 |
| 0.9 | 1080p | 240 Hz | 33 | 17.9 |
| 0.9 | 1080p | 120 Hz | 26 | 14 |
| 0.9 | 1080p | 90 Hz | 20 | 11.5 |

FIG. 22

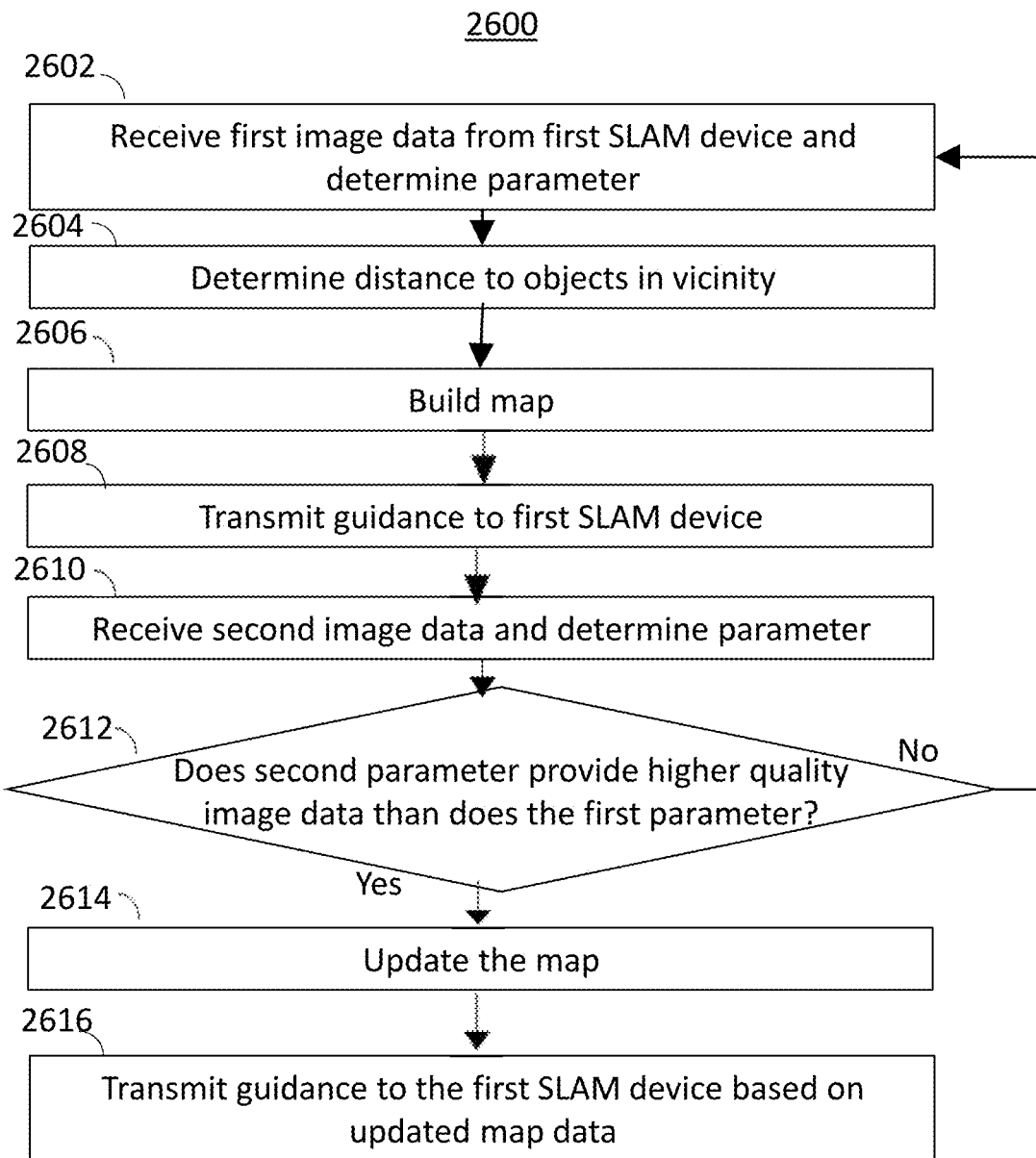

2600

2602
Receive first image data from first SLAM device and determine parameter

2604
Determine distance to objects in vicinity

2606
Build map

2608
Transmit guidance to first SLAM device

2610
Receive second image data and determine parameter

2612
Does second parameter provide higher quality image data than does the first parameter?

No

Yes

2614
Update the map

2616
Transmit guidance to the first SLAM device based on updated map data

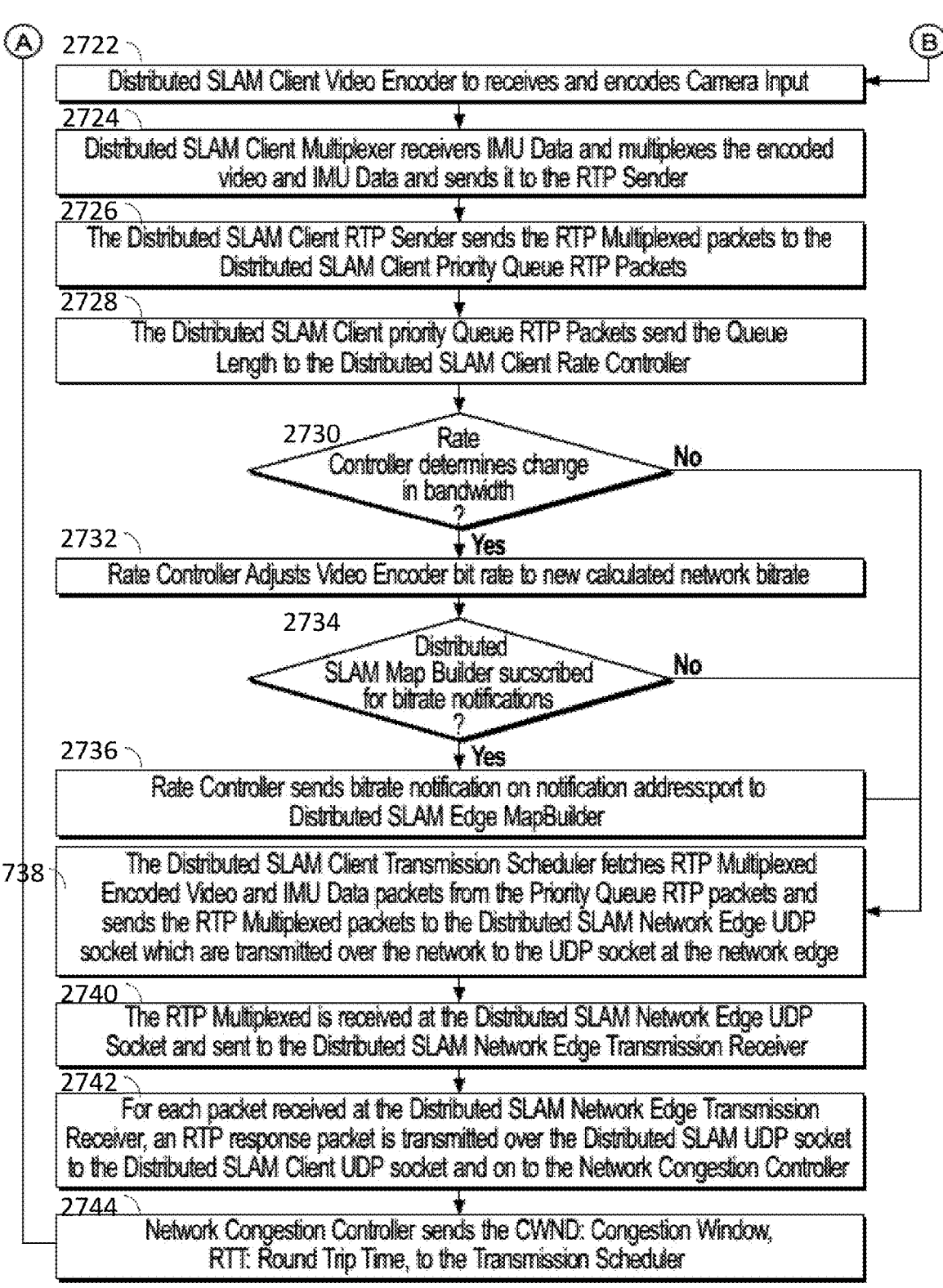

(A)    2722
Distributed SLAM Client Video Encoder to receives and encodes Camera Input ◄─── (B)

2724
Distributed SLAM Client Multiplexer receivers IMU Data and multiplexes the encoded video and IMU Data and sends it to the RTP Sender 2726
The Distributed SLAM Client RTP Sender sends the RTP Multiplexed packets to the Distributed SLAM Client Priority Queue RTP Packets 2728
The Distributed SLAM Client priority Queue RTP Packets send the Queue Length to the Distributed SLAM Client Rate Controller 2730    Rate Controller determines change in bandwidth ?    No ↓ Yes 2732
Rate Controller Adjusts Video Encoder bit rate to new calculated network bitrate 2734    Distributed SLAM Map Builder suscribed for bitrate notifications ?    No ↓ Yes 2736
Rate Controller sends bitrate notification on notification address:port to Distributed SLAM Edge MapBuilder 2738
The Distributed SLAM Client Transmission Scheduler fetches RTP Multiplexed Encoded Video and IMU Data packets from the Priority Queue RTP packets and sends the RTP Multiplexed packets to the Distributed SLAM Network Edge UDP socket which are transmitted over the network to the UDP socket at the network edge 2740
The RTP Multiplexed is received at the Distributed SLAM Network Edge UDP Socket and sent to the Distributed SLAM Network Edge Transmission Receiver 2742
For each packet received at the Distributed SLAM Network Edge Transmission Receiver, an RTP response packet is transmitted over the Distributed SLAM UDP socket to the Distributed SLAM Client UDP socket and on to the Network Congestion Controller 2744
Network Congestion Controller sends the CWND: Congestion Window, RTT: Round Trip Time, to the Transmission Scheduler

FIG. 29A

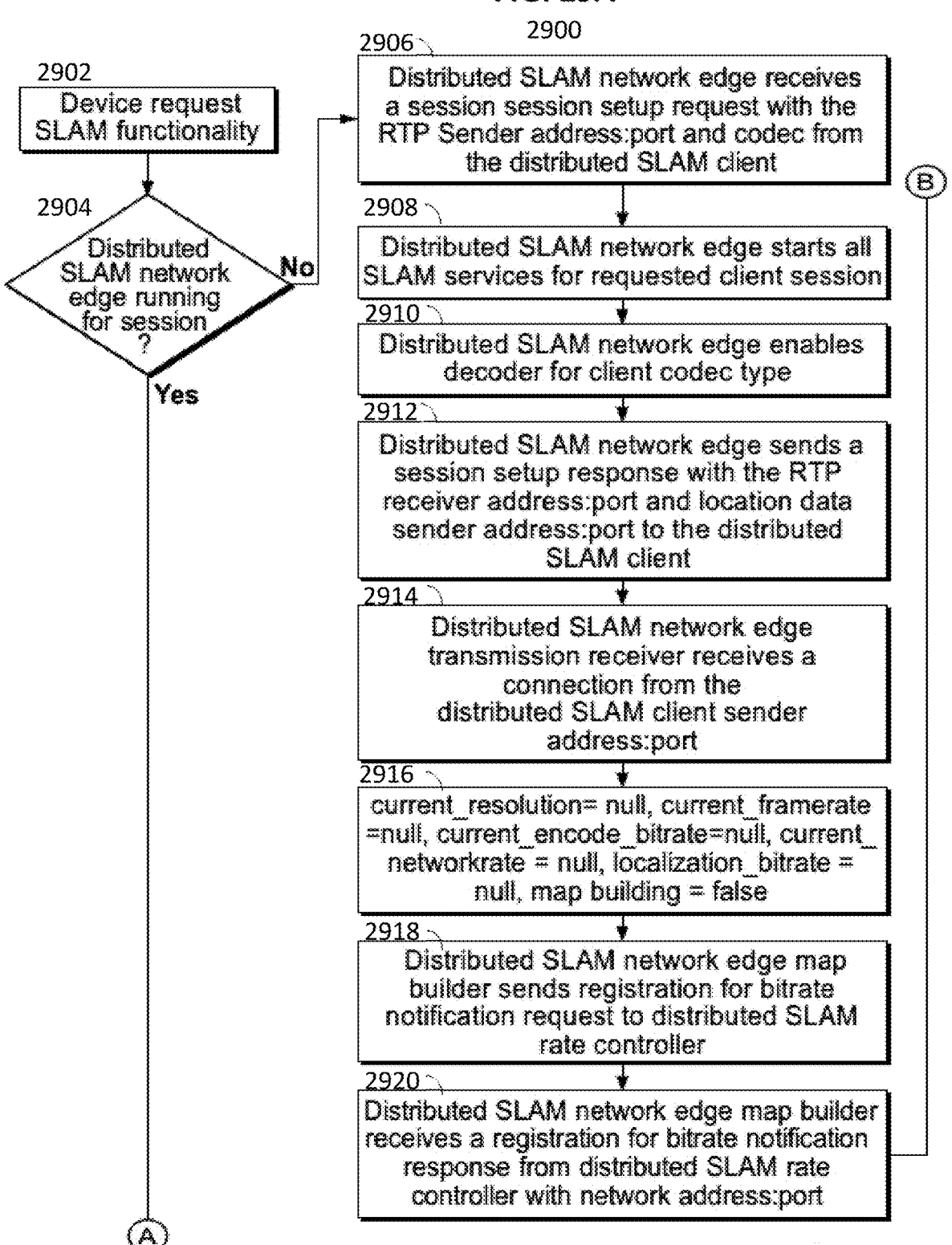

2900

2902
Device request SLAM functionality

2904
Distributed SLAM network edge running for session ? — No

Yes

2906
Distributed SLAM network edge receives a session session setup request with the RTP Sender address:port and codec from the distributed SLAM client

B

2908
Distributed SLAM network edge starts all SLAM services for requested client session 2910
Distributed SLAM network edge enables decoder for client codec type 2912
Distributed SLAM network edge sends a session setup response with the RTP receiver address:port and location data sender address:port to the distributed SLAM client 2914
Distributed SLAM network edge transmission receiver receives a connection from the distributed SLAM client sender address:port 2916
current_resolution= null, current_framerate =null, current_encode_bitrate=null, current_networkrate = null, localization_bitrate = null, map building = false 2918
Distributed SLAM network edge map builder sends registration for bitrate notification request to distributed SLAM rate controller 2920
Distributed SLAM network edge map builder receives a registration for bitrate notification response from distributed SLAM rate controller with network address:port

Figure 29B:
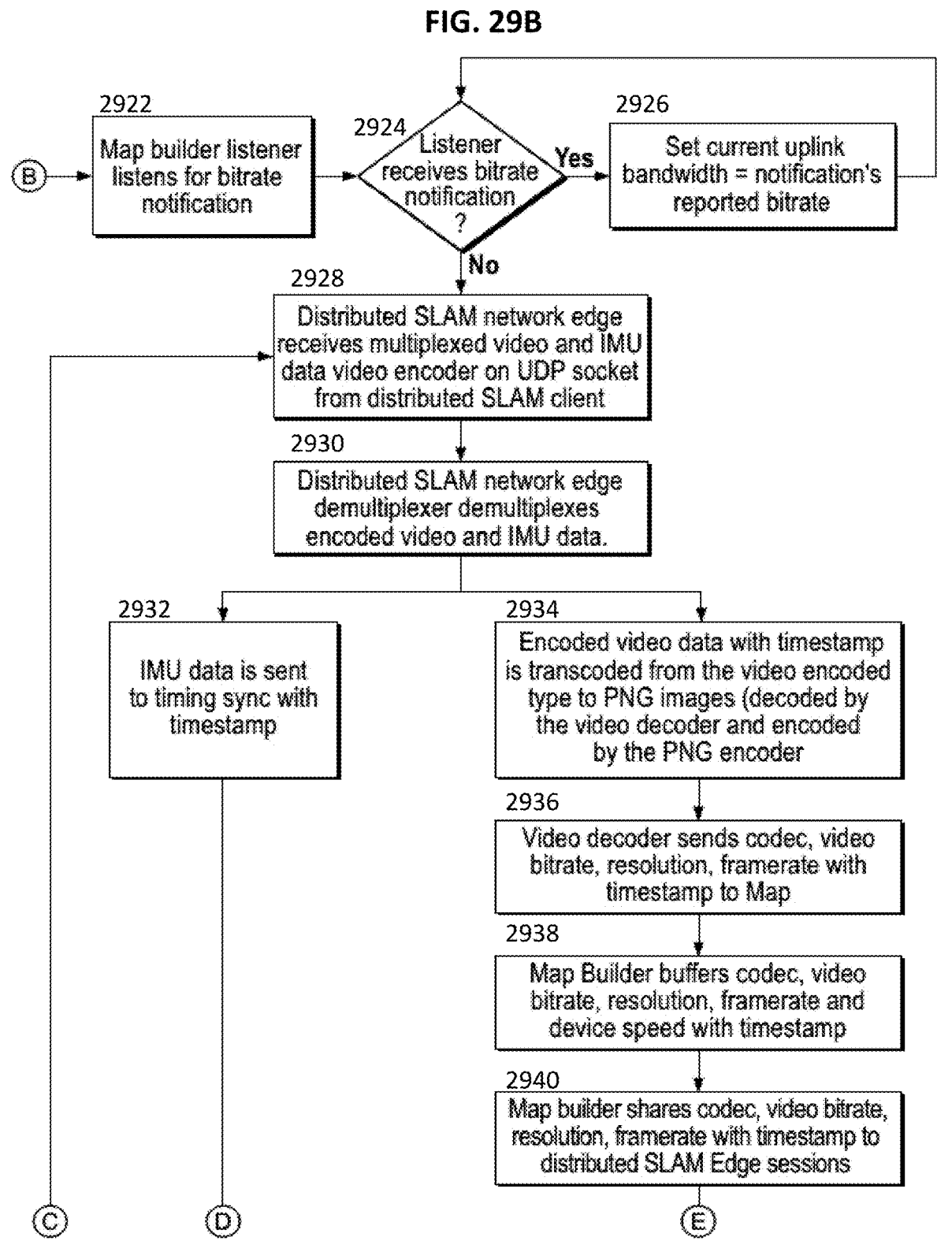

2922
Map builder listener listens for bitrate notification

B →

2924
Listener receives bitrate notification ?

Yes →

2926
Set current uplink bandwidth = notification's reported bitrate

No ↓

2928
Distributed SLAM network edge receives multiplexed video and IMU data video encoder on UDP socket from distributed SLAM client 2930
Distributed SLAM network edge demultiplexer demultiplexes encoded video and IMU data.

2932
IMU data is sent to timing sync with timestamp

2934
Encoded video data with timestamp is transcoded from the video encoded type to PNG images (decoded by the video decoder and encoded by the PNG encoder 2936
Video decoder sends codec, video bitrate, resolution, framerate with timestamp to Map 2938
Map Builder buffers codec, video bitrate, resolution, framerate and device speed with timestamp 2940
Map builder shares codec, video bitrate, resolution, framerate with timestamp to distributed SLAM Edge sessions

| See perform lookup of encoding properties based on device, uplink bandwidth and device speed for optimal spatial map Building |

3004

| Map builder sets the encoded resolution parameter = selected resolution from narrowing of the bitrates, resolutions, and framerates table |

3006

| Map builder sets the encoded frame rate parameter = selected framerate from narrowing of the bitrates, resolutions, and framerates table |

3008

| Map builder make an encoding properties request to the distributed slam client's video encoder |

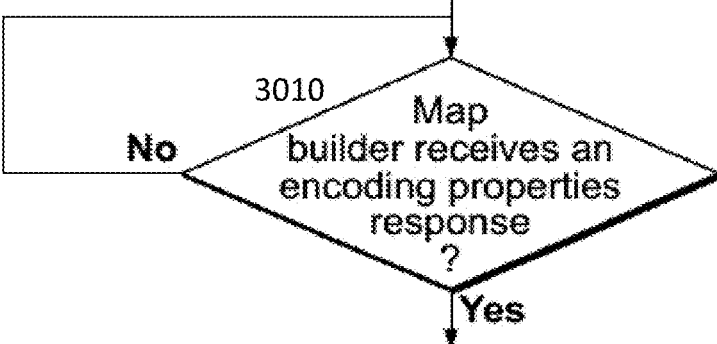

3010

No ← Map builder receives an encoding properties response ? → Yes

3012

| Map builder enters map building mode generating new map data with codec, video bitrate, resolution, framerate and device speed data generating a new map |

3014

| Map merging emerges new map data with codec, video bitrate, resolution, framerate and device speed data into community local edge spatial map with codec, video bitrate, resolution, framerate and device speed database |

Figure 31A:
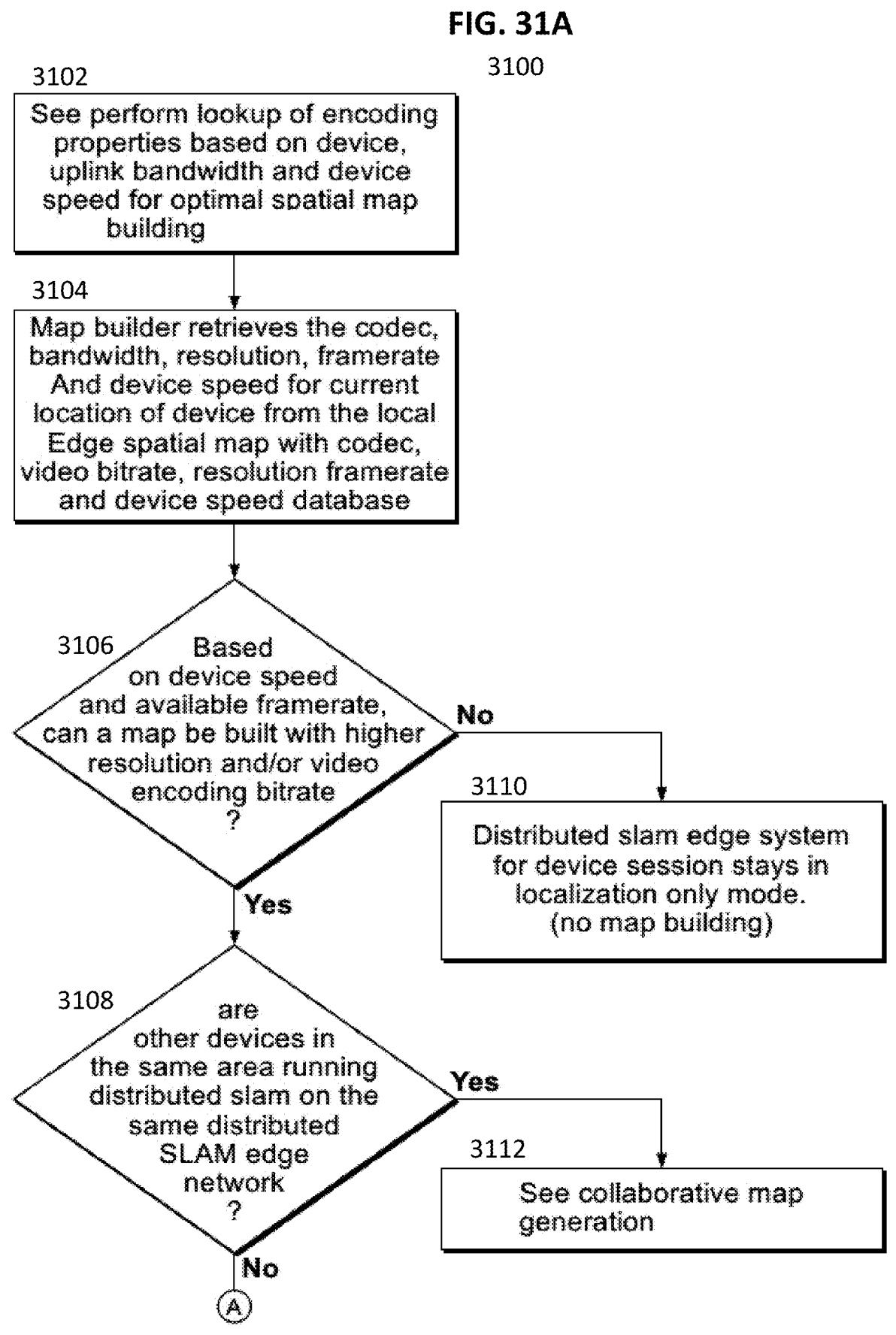

See perform lookup of encoding
properties based on device,
uplink bandwidth and device
speed for optimal spatial map
building

3104

Map builder retrieves the codec,
bandwidth, resolution, framerate
And device speed for current
location of device from the local
Edge spatial map with codec,
video bitrate, resolution framerate
and device speed database 3106
Based
on device speed
and available framerate,
can a map be built with higher
resolution and/or video
encoding bitrate
?

No

3110

Distributed slam edge system
for device session stays in
localization only mode.
(no map building)

Yes

3108
are
other devices in
the same area running
distributed slam on the
same distributed
SLAM edge
network
?

Yes

3112

See collaborative map
generation

3114

Map builder sets the encoded
frame rate parameter = selected
framerate from narrowing of the
bitrates, resolutions, and
framerates table

3116

Map builder make an encoding
properties request to the
distributed SLAM client's
video encoder

3118

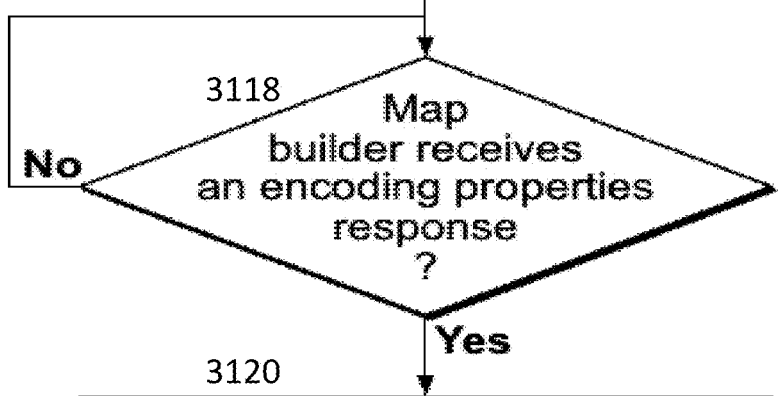

Map
builder receives
an encoding properties
response
?

No

Yes

3120

Map builder enters map building
mode generating new map data
with codec, video bitrate,
resolution, framerate and device
speed data generating a new map

3122

Map merging updates existing
map data with new mapped data,
codec, video bitrate, resolution,
framerate and device speed data
into community local edge spatial
map with codec, video bitrate,
resolution, framerate and device
speed database

Session map builder receives all other session's codec, video bitrate, resolution, framerate and device speed with timestamp

3204

Map builder retrieves the codec, bandwidth, resolution, framerate and device speed for current location of device from the local edge spatial map with codec, video bitrate, resolution framerate and device speed database

3206

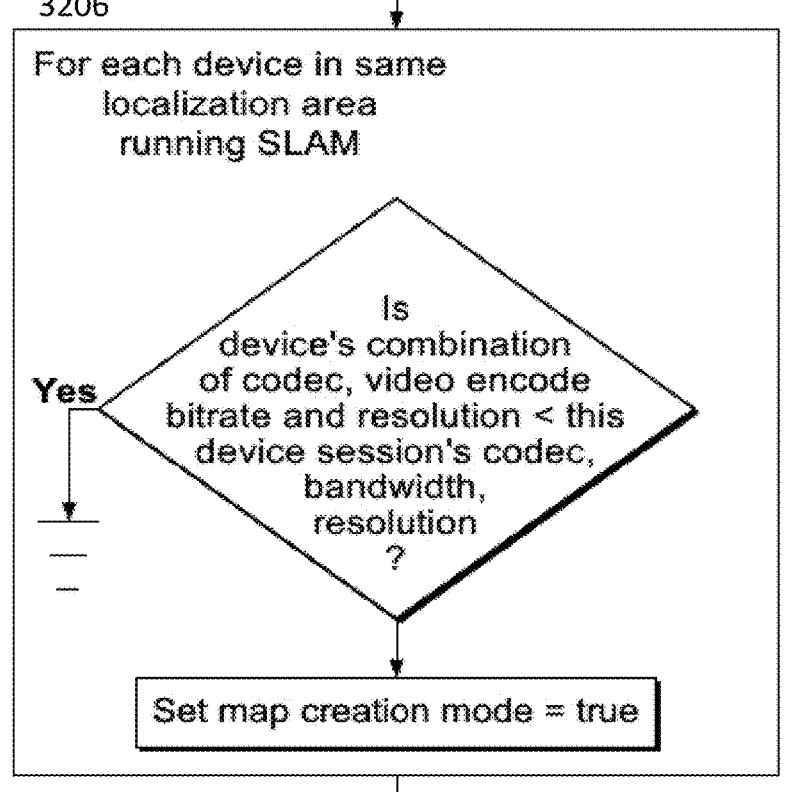

For each device in same localization area running SLAM

Is device's combination of codec, video encode bitrate and resolution < this device session's codec, bandwidth, resolution ?

Yes

Set map creation mode = true

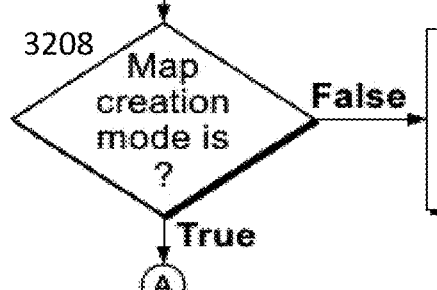

3208

Map creation mode is ?

False

3210

Distributed slam edge system for device session stays in localization only mode. (no map building)

True (A)

FIG. 32B

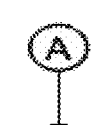

3212

Map builder sets the encoded resolution parameter = selected resolution from narrowing of the bitrates, resolutions, and framerates table

3214

Map builder sets the encoded frame rate parameter = selected framerate from narrowing of the bitrates, resolutions, and framerates table

3216

Map builder makes an encoding properties request to the distributed slam client's video encoder

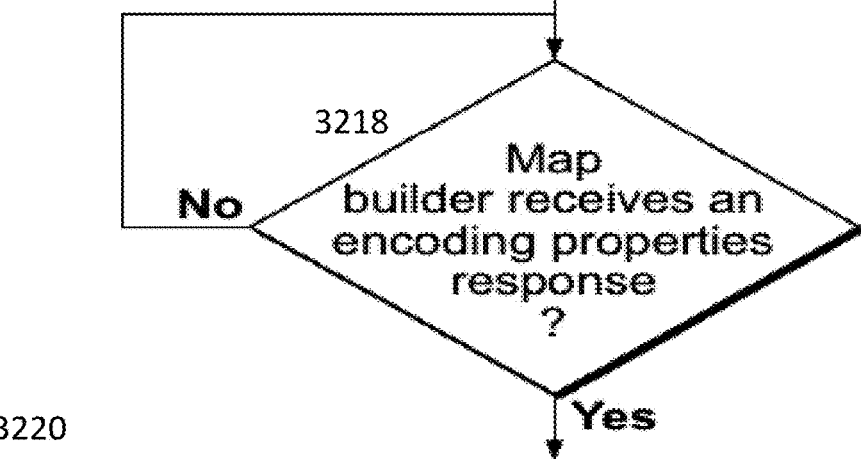

3218

No

Map builder receives an encoding properties response ?

Yes

3220

Map builder enters map building mode generating new map data with codec, video bitrate, resolution, framerate and device speed data generating a new map

3222

Map merging updates existing map data with new mapped data, codec, video bitrate, resolution, framerate and device speed data into community local edge spatial map with codec, video bitrate, resolution, framerate and device speed database

Figure 33:
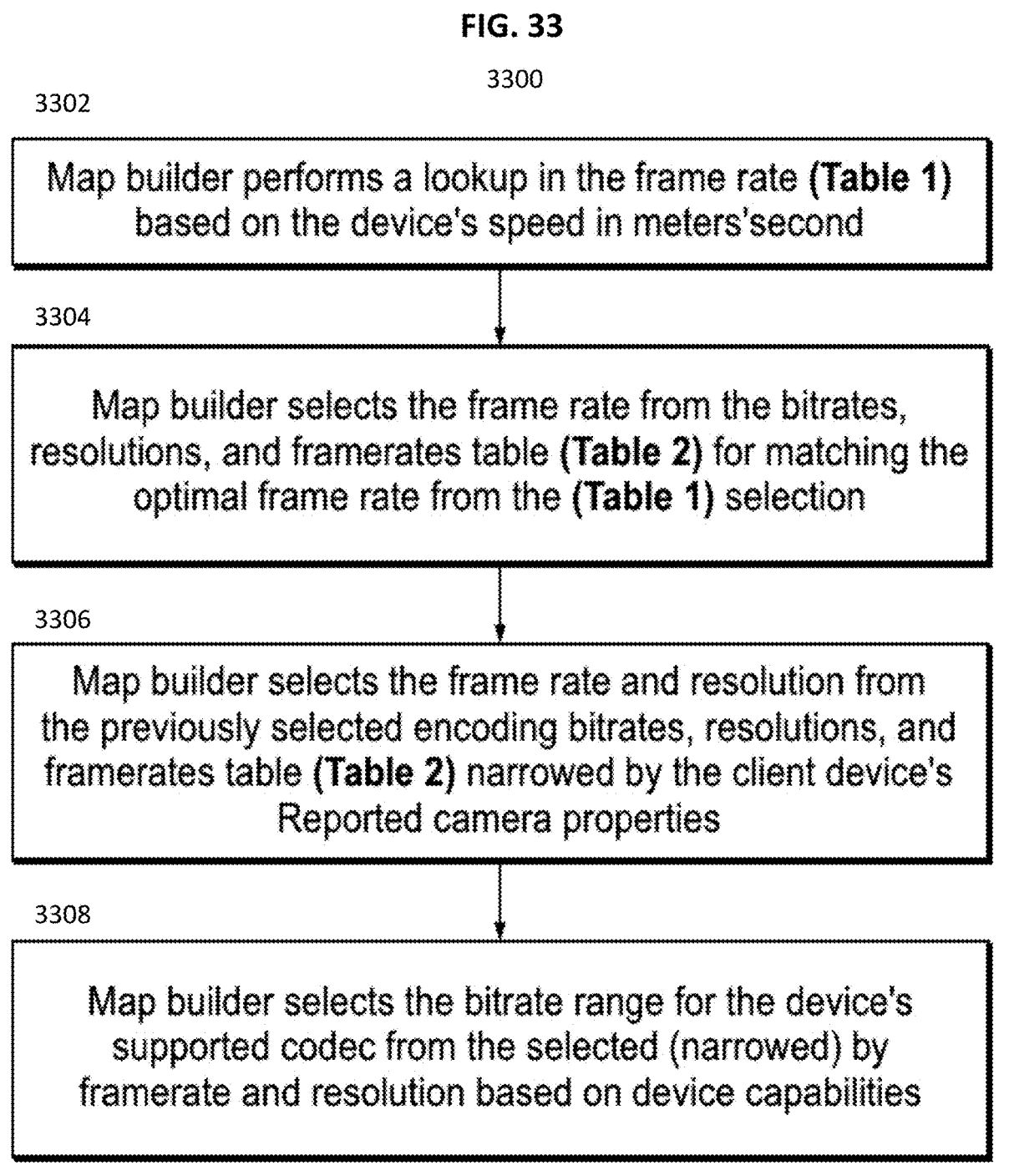

Map builder performs a lookup in the frame rate (Table 1) based on the device's speed in meters'second

3304

Map builder selects the frame rate from the bitrates, resolutions, and framerates table (Table 2) for matching the optimal frame rate from the (Table 1) selection

3306

Map builder selects the frame rate and resolution from the previously selected encoding bitrates, resolutions, and framerates table (Table 2) narrowed by the client device's Reported camera properties

3308

Map builder selects the bitrate range for the device's supported codec from the selected (narrowed) by framerate and resolution based on device capabilities Table 1

| Speed m/sec | Frames Per Second (Hz) |
|---|---|
| 0.4-2.19 | 10 |
| 2.2-3.49 | 20 |
| 3.5-4.49 | 25 |
| 4.5-11.19 | 30 |
| 11.2-28.99 | 50 |
| 29-44.69 | 60 |
| 29-62.99 | 90 |
| 63-89.39 | 120 |
| 89.4> | 240 |

FIG. 34

Table 2

| Resolution | Frame Rate | h.264 Bitrate Mbs | HEVC Bitrate Mbs | VVC Bitrate Mbs |
|---|---|---|---|---|
| 8K | 240 Hz | | 280+ | 150+ |
| 8K | 120 Hz | | 230-279.9 | 115-149.9 |
| 8K | 90 Hz | | 180-229.9 | 90-114.9 |
| 8K | 60 HZ | | 145-179.9 | 72.5-89.9 |
| 8K | 50 HZ | | 130-144.9 | 67-72.4 |
| 8K | 30 Hz | | 115-129.9 | 57.5-66.9 |
| 8K | 25 Hz | | 100-114.9 | 55.5-57.4 |
| 8K | 20 Hz | | 85-99.9 | 51-55.4 |
| 4K | 240 Hz | 320+ | 160+ | 80+ |
| 4K | 120 Hz | 240-319.9 | 120-159.9 | 63-79.9 |
| 4K | 90 Hz | 210-239.9 | 105-199.9 | 55-62.9 |
| 4K | 60 HZ | 110-209.9 | 55-104.9 | 27-54.9 |
| 4K | 50 HZ | 98-109.9 | 49-54.9 | 25-26.9 |
| 4K | 30 Hz | 84-97.9 | 42-48.9 | 21-24.9 |
| 4K | 25 Hz | 78-83.9 | 39-41.9 | 20.5-20.9 |
| 4K | 20 Hz | 70-77.9 | 35-38.9 | 17.4-20.4 |
| 1080p | 240 Hz | 60+ | 33+ | 18+ |
| 1080p | 120 Hz | 50-59.9 | 26-32.9 | 14-17.9 |
| 1080p | 90 Hz | 47-49.9 | 20-25.9 | 11.5-13.9 |
| 1080p | 60 HZ | 30-46.99 | 17-19.9 | 9-11.4 |
| 1080p | 50 HZ | 24-29.9 | 13-16.9 | 6.8-8.9 |
| 1080p | 30 Hz | 13-23.99 | 8-12.9 | 4.4-6.7 |
| 1080p | 25 Hz | 9-12.99 | 6.9-7.9 | 3.78-4.3 |
| 1080p | 20 Hz | 7-8.99 | 5.7-6.8 | 3.1-3.77 |
| 720p | 240 Hz | 37+ | 20+ | 13+ |
| 720p | 120 Hz | 25-36.9 | 14-19.9 | 7.8-12.9 |
| 720p | 90 Hz | 18-24.9 | 10-13.9 | 6.5-7.8 |
| 720p | 60 HZ | 12-17.9 | 7-9.9 | 4.2-6.4 |
| 720p | 50 HZ | 9.5-11.9 | 6-6.9 | 3.6-4.1 |
| 720p | 30 Hz | 7-9.4 | 4-5.9 | 2.4-3.5 |
| 720p | 25 Hz | 4-6.99 | 3.3-3.9 | 2.8 |
| 720p | 20 Hz | 3-3.99 | 2.6-3.2 | 1.8-2.7 |
| 480p | 240 Hz | 24.5+ | 14+ | 8.8+ |
| 480p | 120 Hz | 19-24.4 | 11-13.9 | 7-8.7 |
| 480p | 90 Hz | 14.5-18.9 | 8-12.9 | 5-6.9 |
| 480p | 60 HZ | 7-14.4 | 5-7.9 | 3.8-4.9 |
| 480p | 50 HZ | 5.4-6.9 | 4.4-4.9 | 2.9-3.7 |
| 480p | 30 Hz | 4.5-5.39 | 3.9-4.3 | 2.1-2.8 |
| 480p | 25 Hz | 4-4.4 | 3.5-3.8 | 1.8-2.0 |
| 480p | 20 Hz | 2.8-3.9 | 2.9-3.4 | 1.4-1.7 |

FIG. 35

DATA TRANSMISSION THROTTLING AND DATA QUALITY UPDATING FOR A SLAM DEVICE

BACKGROUND

The present disclosure relates to controlling data transmission for localization in a Simultaneous Localization and Mapping (SLAM) network, and to updating a map in the SLAM network based on the quality of mapping data, such as image data.

SUMMARY

SLAM technology allows a variety of devices, such as virtual reality (VR) or augmented reality (AR) equipment (e.g., glasses, head mounted devices (HMD) or other wearable devices), industrial robots, autonomous household devices, drones, self-driving vehicles, etc., to create a map of its surroundings and to locate and assist in autonomous and/or user-assisted navigation based on the map in real time. A map of an area may be generated based on sensor data captured by sensors onboard the SLAM-enabled device, and the location of the SLAM-enabled device on the map may be determined based on data generated by the device. One or more sensors may be positioned in, on, or at the SLAM-enabled device, or may be positioned elsewhere and capture a field of view of the SLAM-enabled device. For example, one or more stationary cameras in the vicinity of the SLAM-enabled device may provide image data, in addition to or instead of, cameras onboard the SLAM-enabled device. The device's sensors, such as one or more charge coupled devices and/or cameras and/or RADAR/LIDAR and the like, or a combination of the foregoing, collect visual data from the physical world in terms of reference points. In addition, or instead, a SLAM-enabled device may also use one or more of GPS data, satellite data, wireless network and/or WiFi signal strength detection, acoustic signals, and the like for determining location, movement and/or orientation. A SLAM-enabled device may be equipped with IMU (inertial measurement unit). IMU data may be used for location/orientation/movement determination. These reference points help the machine estimate distances and to distinguish between floors, walls, and any barriers.

Google's AR platform, Tango, uses SLAM to interact with the surroundings. A self-driving car may use a roof-mounted LIDAR sensor to create a 3D map of its surroundings. Measurements are constantly taken as the device moves through its surroundings and SLAM takes care of the inaccuracies of the measurement method by factoring in 'noise.' A Kalman filter is used on some SLAM implementations to take into account a series of measurements over time, instead of just a single measurement, to predict the position of unknown variables. In the case of SLAM technology, a Kalman filter may be used to take into account a series of measurements of unknown points on 3D objects in the machine's point of view.

An autonomous vehicle can find itself moving in places where maps currently do not exist and through areas it has never visited before. A challenge of SLAM technology is to construct a map of an unknown environment while simultaneously localizing—keeping track of the location of the device that is supplying the information for building the map.

In VR, users would like to interact with objects in the virtual environment without using external controllers. In AR, the object being rendered needs to fit in the real-life 3D environment, especially when the user wearing the AR device moves. In autonomous vehicles, such as drones or autonomous automobiles, the location in a 3D environment of the vehicle must be determined continuously as the drone or vehicle moves through its environment.

Having a global map with sufficiently high definition for controlling a moving device is a difficult task and may be impractical. Bots cannot always rely on GPS, and GPS is not sufficiently accurate outdoors because precision within a few inches is required to move about safely. Some consumer appliances, such as robot vacuum cleaners and floor mops, and, and robots such as the Amazon Astro, operate indoors, where GPS data is often unavailable or not sufficiently specific, and they use SLAM technology to map rooms to create and to localize themselves within a home. In industrial applications, such as automated factories and distribution warehouses, SLAM is used for robot navigation and interacting with the world around the robot and with other moving robots, as well as humans, to solve the specified task.

Also, many manufacturers or device platforms have their own proprietary or otherwise different techniques for storing and processing spatial map data. Some companies store spatial map data in the cloud, generate the spatial map on the device, and periodically upload the spatial map data and merge it into a shared database of spatial maps in the cloud.

With the introduction of 5G offering high bandwidth and low latency, however, some companies are looking at ways to distribute XR functionality such as SLAM, remote/split rendering, object detection and tracking, haptics, etc. to the network edge service. Standards bodies such as 3GPP SA4, MPEG, etc. have started to perform studies in device/network split architectures.

A SLAM network may make use of data gathered by several devices in the same device region to build a map of the device region and to localize each device. SLAM networks may use visual odometry based on frames captured by one or more cameras of its SLAM-enabled devices to determine distances. The distances thus determined may be used to build a map and to determine locations of the SLAM-enabled devices, which in turn are used to control the SLAM-enabled devices. Repeated determinations of the distance of a given object may also be used to determine speed.

A trend in AR and many other devices is toward miniaturization and to become more lightweight, with a smaller form factor, which is often seen as fashionable by consumers, and may increase usage in industrial applications. SLAM-enabled devices, for instance, may be built smaller and cheaper when much of the processing entailed in the map building and the localization is handled off the device by the network edge service. As a result, some of these devices are going to have less processing power, less storage, smaller batteries and will be challenged with keeping heat generation low. Glasses such as Nreal currently connect to a phone via a USB-C cable and only offer rendering capability with the processing happening inside of the phone. Even the Magic Leap, HoloLens 2 and the Oculus Quest 2 have limited processing on the device compared to the possibilities AR and VR could offer with much more compute capabilities. The display of the HoloLens 2 is very constrained in terms of the field of vision and the main reason is due to limited graphics processing capabilities and optics design. The Oculus Quest 2 offers the ability to connect to a high-powered PC to enhance the quality of experience by leveraging the much more powerful graphics and general compute processing. Even the latest phones are processor and storage constrained when compared with high powered CPUs and GPUs which run at the edge. To get better quality of experience and more functionality from small formfactor devices, edge service compute should be leveraged along with the low latency and high bandwidth capabilities of 5G and future 6G networks, for example.

This may result in the generation of large volumes of data network traffic as data generated by each SLAM-enabled device is transmitted. The data processing available at the edge service device that is receiving the data from the SLAM-enabled devices may be exceeded at times, particularly at peak times when SLAM-enabled devices are most active and require the most localization, by the amount of data received. At the same time, often when devices operate at slower speeds or at locations farther from nearby objects, including other SLAM-enabled devices, high precision data is unnecessary at every moment. For example, an autonomous vacuum cleaner often can move slowly, because collision with surrounding objects at slow speed causes no significant damage to it or the surrounding objects. By way of further example, a drone may move quite fast or may be stationary, and thus its instantaneous speed may determine the level of granularity needed for localization.

According to an embodiment, depending on the level of accuracy needed, the encoded bitrate and/or resolution may be raised or lowered. When a SLAM-enabled device is far away from any surrounding objects, a much lower image data capture and transmission bitrate may be used. As moving objects move into a closer range of the device, or as the device moves closer to other objects in their vicinity, the bitrate can be raised, offering better localization accuracy, since with increased bitrates, image resolution can be enhanced and transmitted in a timely fashion, framerates can be increased and transmitted in a timely fashion, and, in general, data may be provided in a more timely fashion closer to real time. This bitrate may be dynamically throttled or ramped up according to the changing proximity of the objects to the device and according to the speed of the device and the speed of the objects in the vicinity of the SLAM device being controlled. Additionally, the framerate of the video encoder may be increased based on the speed of the device and the speed of other objects, and based on distances of the device from the other objects. The other objects may be other devices of the SLAM system. This may optimize the encoding for distributed SLAM systems in which there is a high offload of processing to the network edge service.

Such a system can provide optimized bandwidth usage in unmanaged fixed line and mobile networks for AR/VR/robotics and self or driver assisted vehicles. It may also result in increased accuracy for object tracking based on object's speed, decreased power usage, increased level of localization accuracy (depending on bandwidth availability), ability to share SLAM maps and localization across devices in the same space.

Another problem is that some SLAM-enabled devices produce low-quality image data because of low resolution cameras, low speed frame capture, less efficient lossy codecs, low data transmission rate capabilities, high speed movement of the device through its environment, weather or lighting conditions, or the like. Also, at any given time, due to network congestion or due to data traffic, and due to processing parameters at the network device receiving and processing the image data from the SLAM-enabled device, the data available only allows for the generation of a less accurate map. At the same time, other SLAM-enabled devices in the same area may have higher quality equipment that allows for capturing, encoding and transmission of higher quality image data but the SLAM network may be unaware of the capacities of such devices.

According to an embodiment, image data quality parameters, for example, bandwidth, codec, resolution, and framerate of the camera that capture image data, may be stored by the processor building a map for the SLAM-enabled devices when the map is initially built. The image data quality parameters may describe the capacity limits of the device and/or may describe the parameters prevailing to the image data when the device captured transmitted the image data. As the system determines that a contributing device's image data can contribute to updating the map to improve map quality, the system may request the highest quality image data the client device can deliver based on the client device's camera capabilities, encoding capabilities and available uplink bandwidth. The image data captured and transmitted may be in the visible spectrum, IR, microwave, radio frequency or other spectral ranges, or a combination of the foregoing.

When higher quality image data becomes available, the map may be upgraded to a higher accuracy map, for example, with improved estimation of distances between objects afforded by higher resolution image data or by a higher frame capture rate or by improved uplink network conditions affording increased data throughput. This upgraded map may replace or may be merged into the existing collaborative map and the quality parameters, for example, resolution, framerate, bandwidth and/or codec may be saved in association with the new map, or in association with the data used for portions or aspects of the map. In the case of multiple devices collaborating in the same area, the device offering the highest quality of image data may be selected to contribute to either the initial map building or map updating. If there are multiple devices in the same space, the device(s) offering the highest quality may contribute to building or updating the map. In a distributed SLAM system, improved localization accuracy for SLAM-enabled devices in the region described by a map may be achieved.

At the same time, with the improved, more detailed, higher quality data-based maps generated through repeated iterations as improved/more data becomes available (as described with respect to the second embodiment), lower localization bandwidth and lower encoding requirements may be needed (as described with respect to the first embodiment). For example, if an enhanced map provides greater detail/resolution with regard to feature points of nearby objects, distances of nearby objects to the SLAM-enabled device may be estimated more precisely or with a greater degree of confidence. This greater precision of the location of nearby objects with respect to the SLAM-enabled device, or greater degree of certainty with regard to the location of such nearby objects, may make it possible to set a lower transmission bitrate for the SLAM-enabled device at runtime.

A communication control method, system, device, non-transitory computer-readable medium, and means for such a method are described. Such a method may include: receiving a transmission from a first device, the transmission indicating inertial measurement data and image data obtained by a sensor of the first device; determining by a first processor, based on the indicated inertial measurement data and the indicated image data, one or more of a speed of the first device or a distance of the first device from one or more objects; and in response to the determining of the speed of the first device or the distance of the first device from the one or more objects, controlling a communication of the first device by transmitting to the first device one or more of a request for an adjustment of a framerate of the sensor of the first device for obtaining additional image data or a request for an adjustment of the resolution of the additional image data. Additional image data may then be received from the first device at the adjusted framerate or at the adjusted resolution.

This method may also entail determining by the first processor, based on the transmission received from the first device, a change in a speed of a first object of the one or more objects relative to the first device; and in response to the determining of the change in the speed of the first object, transmitting to the first device the request for the adjustment of the framerate.

In such a method the determining of the distance of the first device from the one or more objects may include a decreased distance of the first device from the one or more objects relative to a previous distance of the first device from the one or more objects, such that the request for the adjustment of the framerate comprises an indication of a specified second framerate of the sensor of the first device for obtaining the additional image data, the second framerate being greater than the first framerate.

In addition, localizing the first device may be performed according to spatial mapping data generated by the first processor and the additional data, wherein the first processor is physically not connected to the first device and is remote from the first device, or is otherwise distinct from the first device.

According to such a method, the first device may be a wearable virtual reality device or augmented reality device, an autonomous vehicle, a drone or a robot.

Also described herein is an automated map generation method, system, device, non-transitory computer-readable medium, and means for such a method are described. Such a method may include: receiving first image data from a first device; identifying one or more first data parameters of the first image data; generating, using the first image data, map data of a device region of the first device; transmitting to the first device first guide data configured to guide the first device in navigating the device region of the first device, wherein the first guide data are obtained based on the map data; receiving second image data; determining that the second image data were obtained for the device region and identifying one or more second data parameters of the second data; determining that the one or more second data parameters provide higher quality image data than do the one or more first data parameters; in response to the determining that the second data parameters provide the higher quality image data, updating the map data of the device region based on the second image data; and transmitting to the first device second guide data configured to guide the first device in the navigating of the device region based on the updated map data.

For example, in such a method, a first data parameter of the one or more first data parameters or of the one or more second data parameters may include a maximum image resolution capacity of a capturing sensor of the first device, and/or may include a maximum framerate capacity of a capturing sensor of the first device, and/or may include a codec image data throughput of the first device, a maximum bitrate transmission capacity of the first device.

A first data parameter of the one or more first data parameters or of the one or more second data parameters may one or more of an image resolution or a framerate associated with the first image data at a time of capture of the first image data.

For example, after identifying the second device as being in the device region, one or more second data parameters may be requested from the second device. The second image data may be received from a second device different from the first device, or from the same one.

This generating of the map and the updating of the map may be performed by a SLAM-enabled device. The second image data may be used to replace the first image data map data.

The first device may be a wearable virtual reality device or augmented reality device, or may be an autonomous vehicle, a drone, or a robot.

performed by a SLAM-enabled device.

Other aspects and features of the present disclosure will become apparent to those ordinarily skilled in the art upon review of the following description of specific embodiments in conjunction with the accompanying FIGs.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 11B illustrates communication via the data network between the SLAM device and the distributed SLAM network edge service, according to an aspect of the disclosure;

FIGS. 14A-C are a flowchart that illustrates an example of a process for initial startup and local rate control by a SLAM-enabled client of a SLAM client device, according to an aspect of the first embodiment;

FIGS. 15A-B are a flowchart that illustrates an example of a process performed by the SLAM client for receiving a request for adjusting a bit rate or video encoder properties, according to an aspect of the first embodiment;

FIG. 17 is a flowchart illustrating an example of a process performed by a SLAM client device for handling a localization accuracy notification received from the SLAM network edge service processor, according to an aspect of the first embodiment;

FIGS. 18A-F are a flowchart that illustrates an example of a process performed by a SLAM network edge service processor for startup, localization, and controlling encoding image resolution and framerate, according to an aspect of the first embodiment;

FIG. 21 is a table of speed values (expressed in meters per second) that correlates the number of frames per second to be set in response to a determination of the fastest moving object combined with the speed of the SLAM device, according to an aspect of the first embodiment;

FIG. 22 is a table of values for setting encoding parameters based on framerates determined, according to an aspect of the first embodiment;

FIG. 26 is a flowchart that illustrates an example of a process that may be performed by the SLAM network edge service for map building and map updating based on additional image data received, according to the second embodiment;

FIGS. 27A-B are a flowchart showing an example of a process for distributed SLAM client at initial startup and performing rate control, according to the second embodiment;

FIGS. 29A-D are a flowchart showing an example of a process for the SLAM network edge service start up and map building process, according to the second embodiment;

FIG. 30 is a flowchart that shows an example of a process that may be performed by a SLAM network edge service processor for entering map builder mode, according to the second embodiment;

FIGS. 31A-B are a flowchart showing an example of a process for updating the map previously built by the SLAM networked edge service or by a system of such distributed processors, according to the second embodiment;

FIGS. 32A-B are a flowchart showing an example of a process for collaborative map generation for a device area, according to the second embodiment;

FIG. 33 is a flowchart showing an example of a process for retrieving encoding, parameters or properties for image data, according to the second embodiment;

FIG. 34 is a table showing an example for framerates that may be required for optimal map building based on the speed of the contributing device, according to the second embodiment;

FIG. 35 is a table showing an example for encoding bitrates, resolutions, and framerates that may be required for optimal map building, according to the second embodiment.

DETAILED DESCRIPTION

Figure 1:
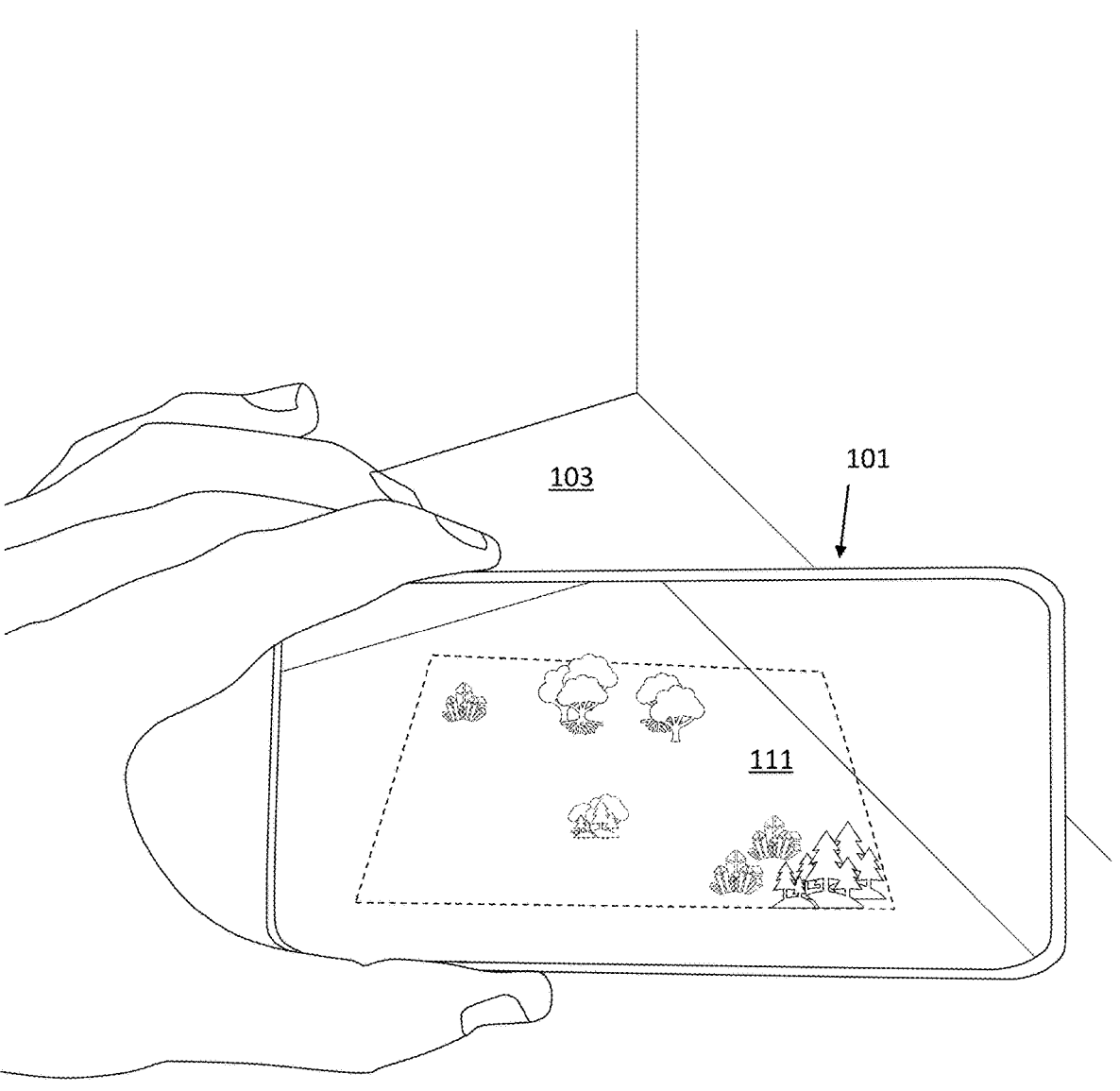
FIG. 1 illustrates an example of SLAM running on a smartphone enabling placement of a virtual objects interacting with the physical room.

It will be appreciated that for simplicity and clarity of illustration, where considered appropriate, reference numerals may be repeated among the FIGs. to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

Figure 2:
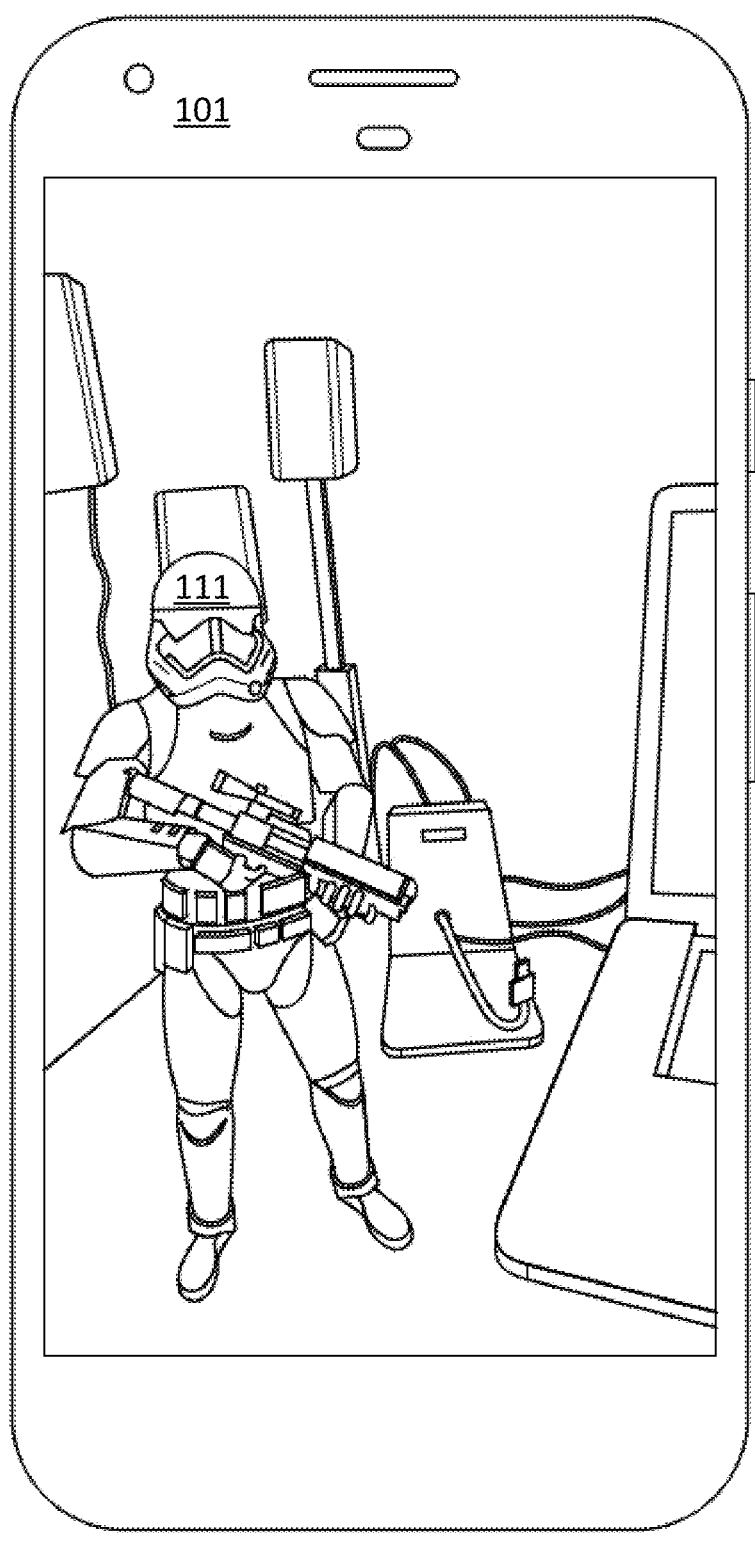
FIG. 2 illustrates another example of SLAM running on a phone enabling proper placement of a virtual object and interacting with the physical room.

FIGS. 1 and 2 illustrates that a virtual object 111 shown on a handheld device 101, such as a smartphone, may be "placed," or may be made otherwise to interact with, a physical room 103. The room is also represented in the image displayed on the monitor of the handheld device. The handheld device, such as the smartphone, is SLAM technology enabled, to provide a mapping of the area and the localization of the virtual object in the area.

Figure 3:
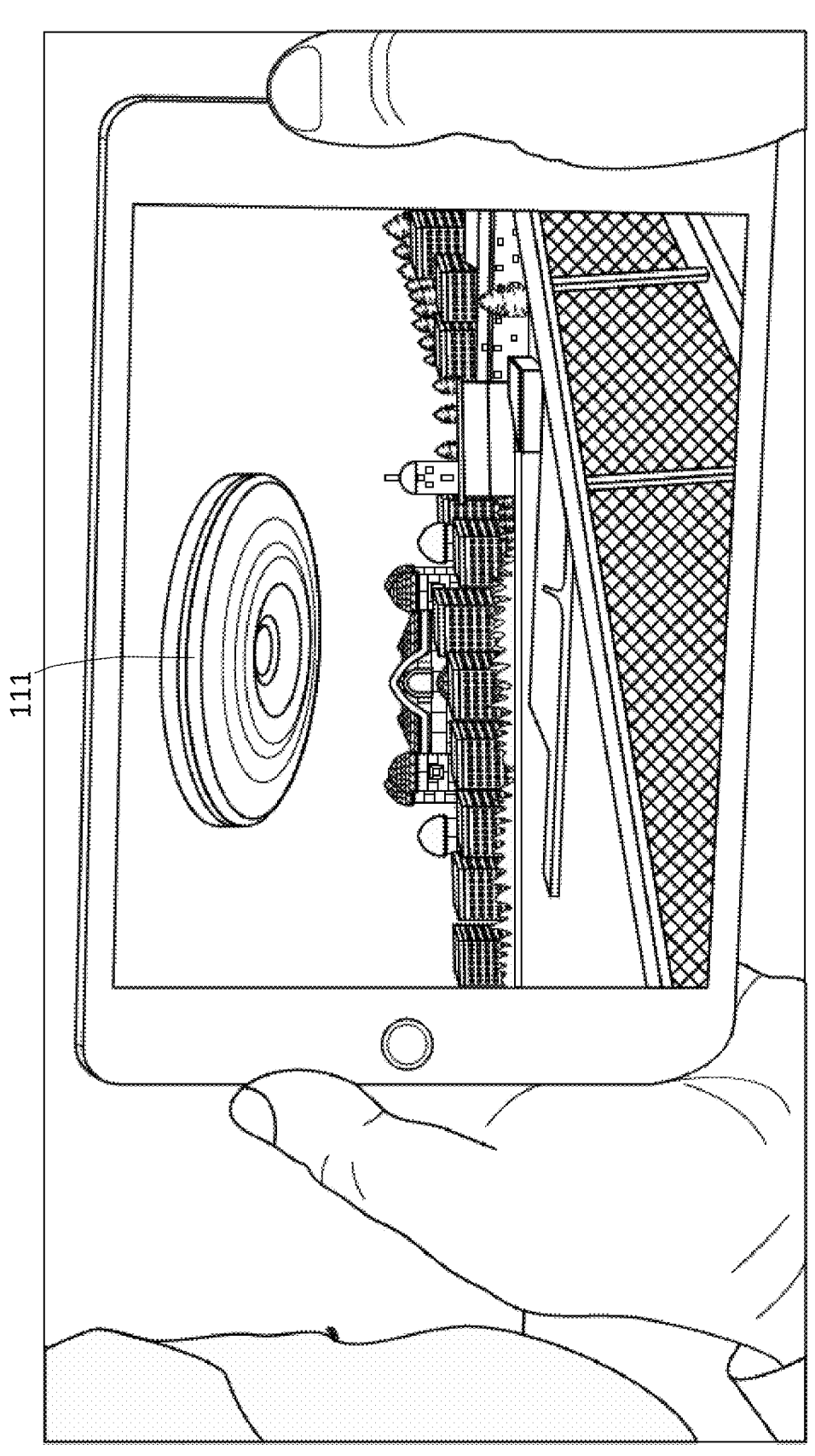
FIG. 3 illustrates an example using SLAM on a tablet outdoors enabling a virtual object to interact with the physical world.

FIG. 3 illustrates a handheld device, such as a tablet, that allows visualizing and placing a virtual object outside and allows the user to control interactions of the virtual object with the physical world "around it."

Figure 4:
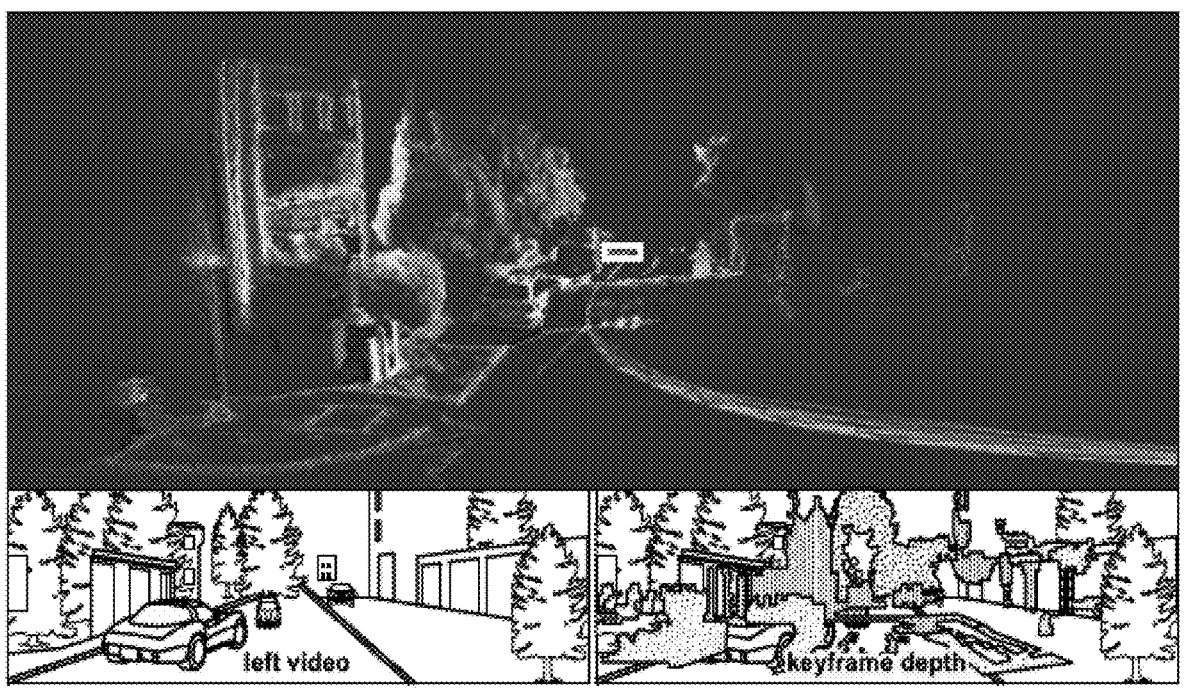
FIG. 4 illustrates an example of using SLAM in a driver-assisted or self-driving automobile application.

FIG. 4 illustrates SLAM technology implemented as driver-assist device or as a self-driving automobile. The SLAM technology locates the automobile in its environment, based on a map of the region and the location of the automobile on the map.

A SLAM system may be a visual-data SLAM system that supports RGB-D inertial sensor input (e.g., a depth-sensing device in association with a red, green, blue input). The SLAM system may use the predicted depth map as the depth input. The SLAM system may also receive a gravity direction value from one or more inertial sensors. Using the gravity direction value, the SLAM system may implement a fast plane detection method that detects horizontal planes via a one-point Random Sample Consensus (RANSAC) and vertical planes via a two-point RANSAC, resulting in determined horizontal and vertical planes.

The SLAM system may include one or more processors, memory, and machine readable media. In some examples, a visual-inertial SLAM system may be implemented at a first user device and provide output to a second user device for implementing in a SD environment.

Data processing module may receive data from one or more user sensors or other devices, and store the sensor data in sensor data store. Data may be generated by the user devices (e.g., computing device, mobile or smart phone, etc.) or sensors. Sensors may comprise, for example, monocular or stereo cameras, depth sensors, and inertial measurement units (IMU). The sensor data generated by a refracting or monocular camera can generate magnified images and/or optical prism as a two-dimensional (2D) image. The stereo and RGB-D cameras can provide metric scale recovery for map points and camera poses. Depth sensors can generate a three-dimensional (3D) image by acquiring multi-point distance information across a wide Field-of-View (FoV).

Figure 5:
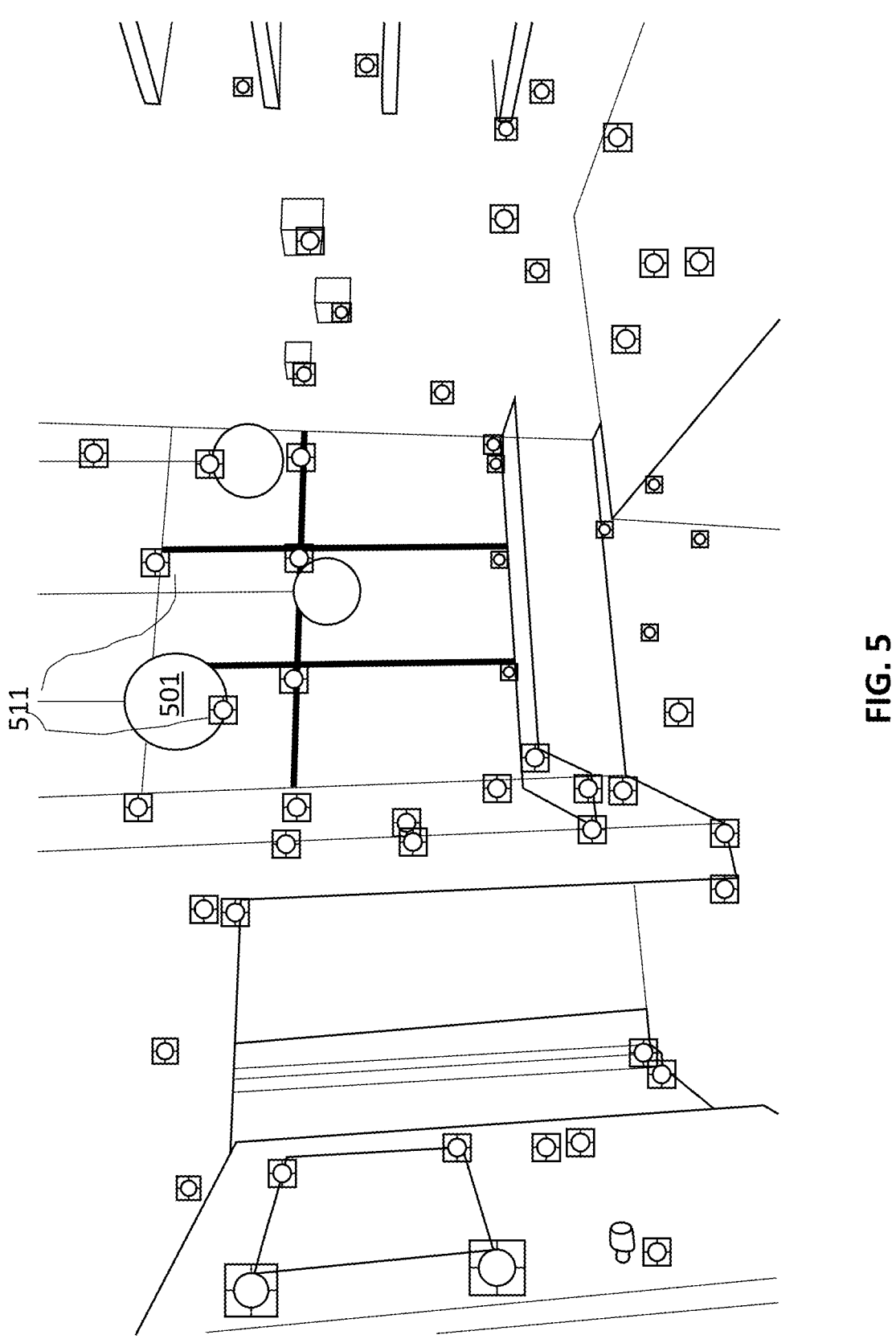
FIG. 5 illustrates an example of SLAM key points in an AR application that are used to enabling the AR examples shown in FIGS. 1-3.

FIG. 5 illustrates an AR application of SLAM in which key points 511 on nearby objects 501 are identified to assist in building a map and localizing the device by gauging distances to the key points. For example, visual odometry may be used to estimate distances to key points based on image data captured by one or more sensors of the SLAM-enabled device, or by more than one SLAM-enabled device.

Figure 6:
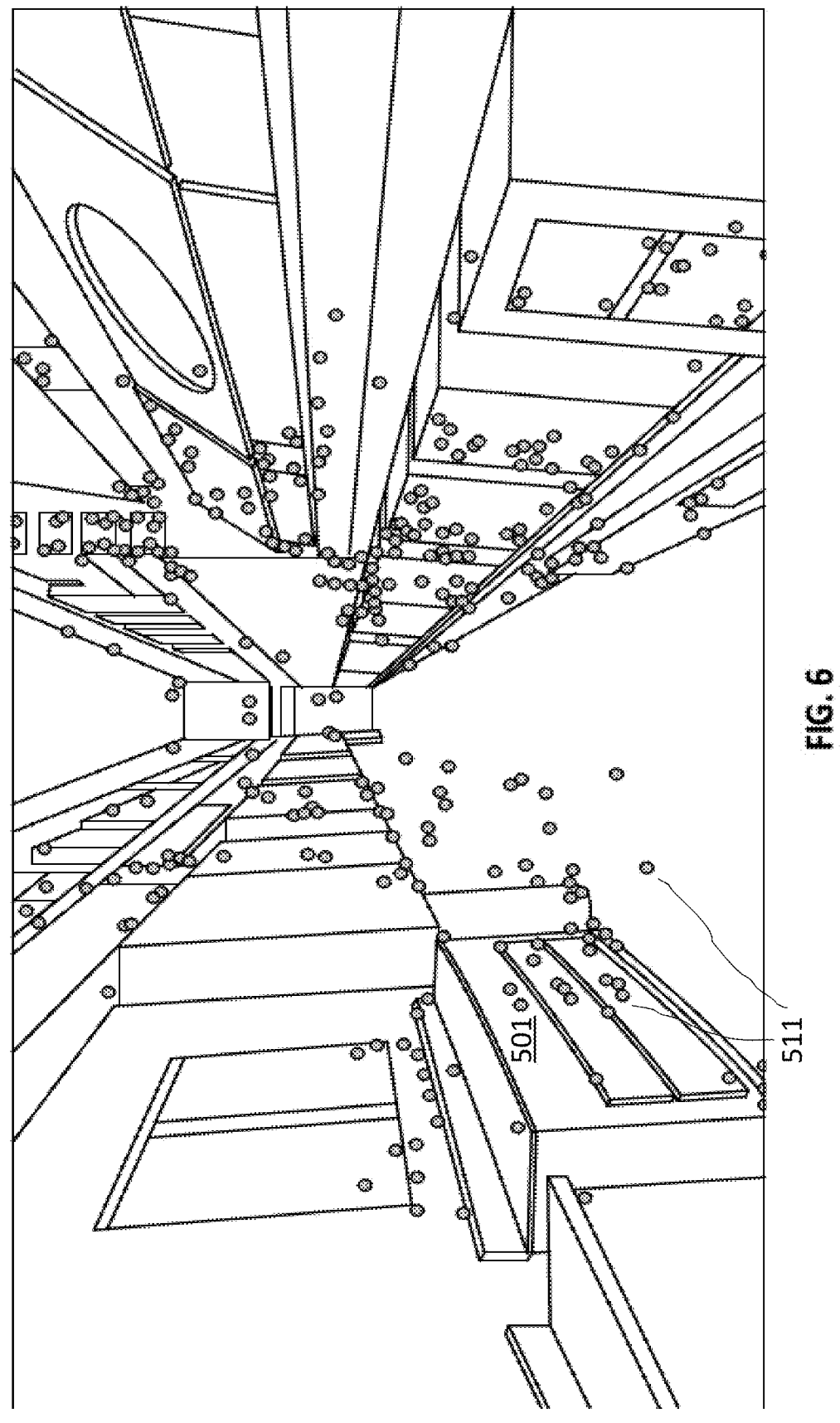
FIG. 6 illustrates an example of SLAM technology applied in a robotics application with feature points tracking as the robot moves through its environment.

FIG. 6 illustrates key points (feature points) 511 having been extracted from image data generated by a SLAM-enabled device, for example, in a robotics application. These feature points may be tracked continuously as the device moves through its environment. In addition, feature points may move if they are located on moving objects, including for example, other SLAM-enabled devices.

A SLAM device typically includes some type of inertial measurement unit (IMU) to measure the acceleration and angular velocity of the device along three mutually perpendicular axes over time. A visual-inertial module may be configured to determine visual-inertial data (e.g., as sensor data) using visual-inertial odometry (VIO). For example, visual-inertial module may acquire one or more input images from sensor data store or directly from a user device 1B0 or sensor 1B2 (e.g., single cameras, stereo cameras, omnidirectional cameras, or other image sensors). Based on the quality of the image data, visual-inertial module may apply an image correction process or image processing techniques to improve the quality of one or more portions of the image (e.g., for lens distortion removal).

In some examples, the VIO process may implement feature detection and feature extraction to help estimate the sensor motion. In feature detection, the process may define interest operators and match features across frames to construct an optical flow field. The process may establish a correlation between two images and perform feature extraction based on the comparison. In some examples, the process may construct optical flow field (e.g., using Lucas-Kanade method) and remove outliers. In some examples, the VIO process may further estimate the visual-inertial data (e.g., the motion of the sensor, and thus the motion of the device) from the optical flow. A Kalman filter may be used to estimate a state distribution and/or geometric and 3D properties of the features that minimize a cost function (e.g., using an A1 model) may be determined based on the re-projection error between two adjacent images. This can be done by, for example, mathematical minimization or random sampling.

Figure 7:
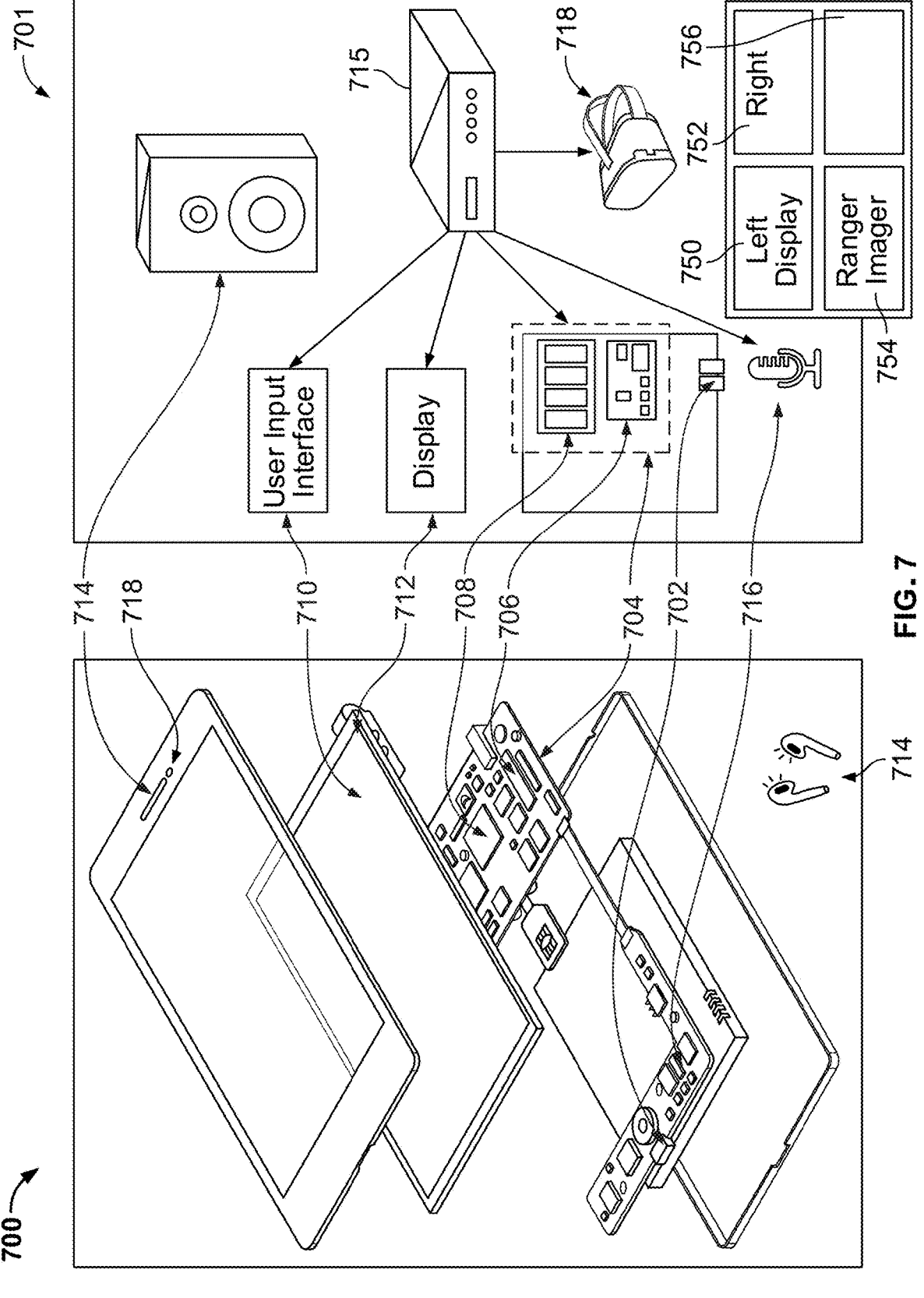
FIG. 7 is an illustration of a computer with peripheral devices.

FIG. 7 illustrates devices and related hardware for AR generation or other applications or implementations of a SLAM-enabled device, and for network edge service devices, including devices used for mapping and localization. A circuit board may include control circuitry, processing circuitry, and storage (e.g., RAM, ROM, hard disk, removable disk, etc.). In some embodiments, the circuit boards may include an input/output path. Each device 700/701 may receive content and data via input/output (I/O) path 702 that may comprise I/O circuitry (e.g., network card, or wireless transceiver). I/O path 702 may communicate over a local area network (LAN) or wide area network (WAN).

Control circuitry 704 may comprise processing circuitry 706 and storage 708 and may comprise I/O circuitry. Control circuitry 704 may be used to send and receive commands, requests, and other suitable data using I/O path 702, which may comprise I/O circuitry. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable control circuitry such as processing circuitry 706. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i9 processor and an Intel Core i7 processor). In some embodiments, control circuitry 704 executes instructions for the AR application stored in memory (e.g., storage 708). Specifically, control circuitry 704 may be instructed by the AR application to perform the functions discussed above and below. In some implementations, processing or actions performed by control circuitry 704 may be based on instructions received from the AR application.

In client/server-based embodiments, control circuitry 704 may include communications circuitry suitable for communicating with other networks. The AR application may be implemented as software or a set of executable instructions. The instructions for performing any of the embodiments discussed herein of the AR application may be encoded on non-transitory computer-readable media (e.g., a hard drive, random-access memory on a DRAM integrated circuit, read-only memory etc.). For example, in FIG. 7, the instructions may be stored in storage 708, and executed by control circuitry 704 of a device 700.

In some embodiments, the AR application may be a client/server application where only the client application resides on device 700 (e.g., device 104), and a server application resides on an external device or edge service network. Control circuitry 704 may include communications circuitry suitable for communicating with a server, edge service computing systems and devices, a table or database server, or other networks or servers Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 708 may be used to store various types of content described herein as well as AR application data described above (e.g., database 420). Non-volatile memory may also be used (e.g., to launch a boot-up routine and other instructions). Cloud-based storage, described in relation to FIG. 7, may be used to supplement storage 708 or instead of storage 708.

Control circuitry 704 may include video generating circuitry and tuning circuitry. Control circuitry 704 may also include scaler circuitry for upconverting and down converting content into the preferred output format of equipment 700. Control circuitry 704 may also include digital-to-analog converter circuitry and analog-to-digital converter circuitry for converting between digital and analog signals. In some embodiments all elements of system 700 may be inside housing of the AR display device 718. In some embodiments, AR display device 718 comprises a camera (or a camera array) 756. Video cameras 756 may be integrated with the equipment or externally connected. One or more of cameras 756 may be a digital camera comprising a charge-coupled device (CCD) and/or a complementary metal-oxide semiconductor (CMOS) image sensor. In some embodiments, one or more of cameras 756 may be dirtied at outside physical environment (e.g., two cameras may be pointed out to capture to parallax views of the physical environment). In some embodiments, AR display device 718 may comprise other biometric sensor or sensors to measure eye rotation (e.g., electrodes to measure eye muscle contractions). AR display device 718 may also comprise range image 754 (e.g., LASER or LIDAR) for computing distance of devices by bouncing the light of the objects and measuring delay in return (e.g., using cameras 756). In some embodiments, AR display device 718 comprises left display 750, right display 750 (or both) for generating VST images, or see-through AR images in accordance with embodiments in FIGS. 1-6.

The AR application may be implemented using any suitable architecture. For example, it may be a stand-alone application wholly-implemented on each one of user equipment device 700 and user equipment device 701. In such an approach, instructions of the application may be stored locally (e.g., in storage 708), and data for use by the application is downloaded on a periodic basis (e.g., from the edge service network, from an out-of-band feed, from an Internet resource, or using another suitable approach). Control circuitry 704 may retrieve instructions of the application from storage 708 and process the instructions to provide AR generation functionality and preform any of the actions discussed herein. Based on the processed instructions, control circuitry 704 may determine what action to perform when input is received from user input interface 710. For example, head movement or movement of a cursor on a display up/down may on user input interface 710. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the AR application may be downloaded and interpreted or otherwise run by an interpreter or virtual machine (run by control circuitry 704). In some embodiments, the AR application may be encoded in the ETV Binary Interchange Format (EBIF), received by control circuitry 704 as part of a suitable feed, and interpreted by a user agent running on control circuitry 704. For example, the AR application may be an EBIF application. In some embodiments, the AR application may be defined by a series of JAVA-based files that are received and run by a local virtual machine or other suitable middleware executed by control circuitry 704. Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network. While sometimes described as an "AR" network or system by way of example, it will be understood that other types of SLAM implementations are also contemplated, including drones, vehicles, robots and the like.

Figure 8:
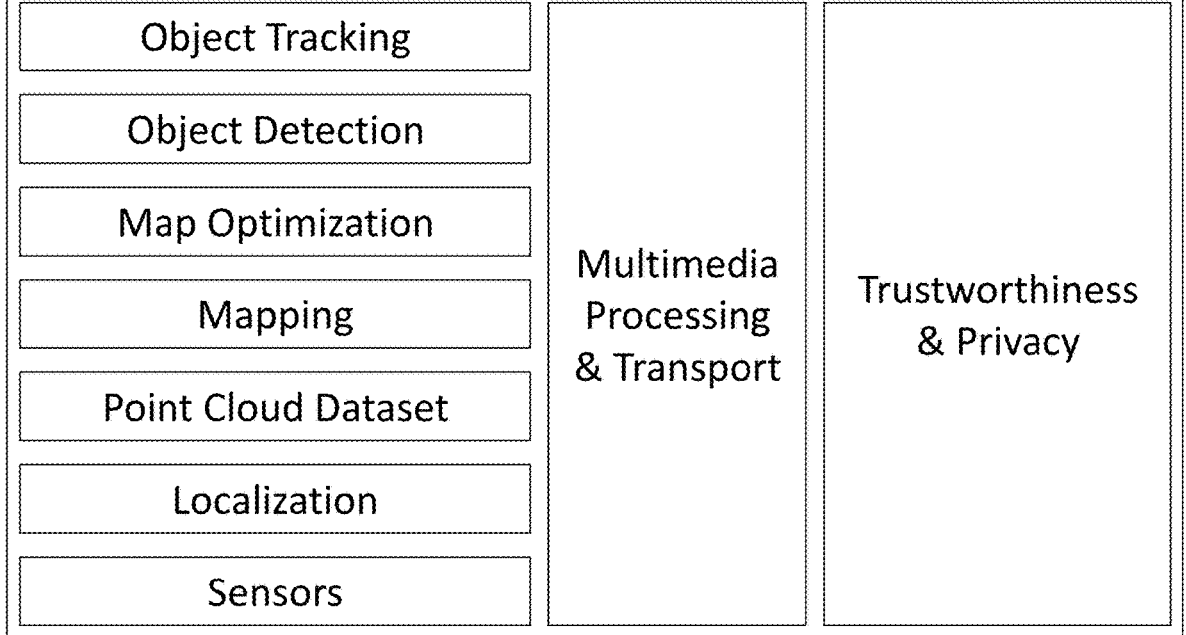
FIG. 8 illustrates components of a SLAM system that may be provided on a SLAM-enabled device.

FIG. 8 illustrates components of a SLAM device, one or more of which may be implemented as software modules or as hardware, including, for example, object tracking (OT), object detection (OD), map optimization (MO), mapping (M), point cloud dataset (PCD), localization (L), and sensors (S), in addition to multimedia processing and transport/transmission, and trustworthiness and privacy measures. However, it is often the case that one or more of these modules are not present on a SLAM-enabled device, but are offloaded to the edge service network. This may be done to make the SLAM-enabled devices less expensive and to optimize resources.

Figures 9A, 9B, 9C:
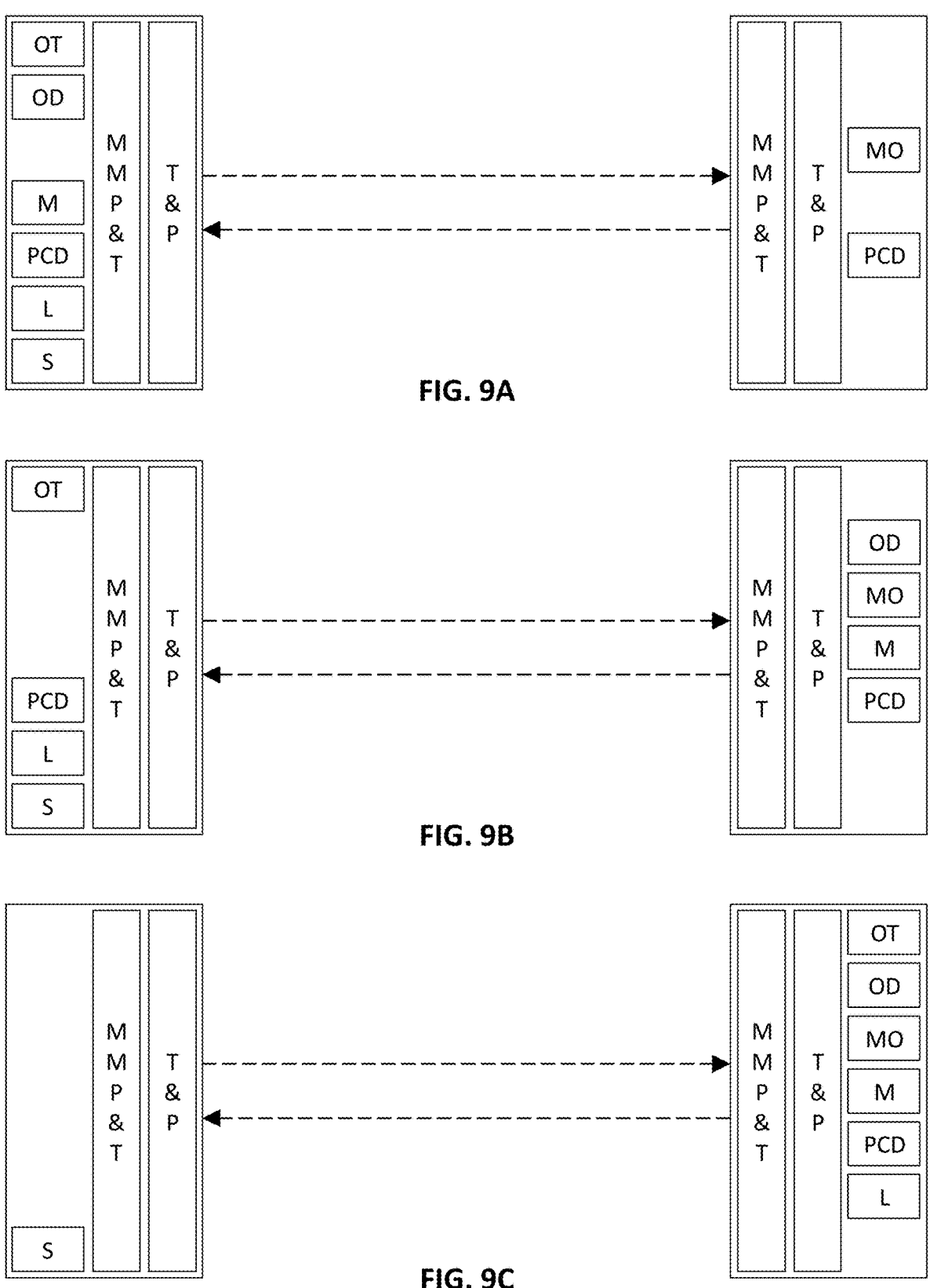
FIGS. 9A-9C illustrate three architectures for splitting SLAM processing, for example, in an XR application: low offload (FIG. 9A), mid offload (FIG. 9B), and high offload (FIG. 9C)

FIGS. 9A-9C illustrate three SLAM architectures with increasing degrees of offloading the processing from the SLAM device. In FIG. 9A, all of the processing, with the exception of map optimization, is performed by the SLAM device. FIG. 9B illustrates that the object detection, map optimization, and mapping processes have been offloaded from the SLAM device to the edge service network. FIG. 9C illustrates that all, but the sensors and associated processing, as well as the multimedia processing and transport, and the trustworthiness and privacy modules have been offloaded from the SLAM device.

Figure 10:
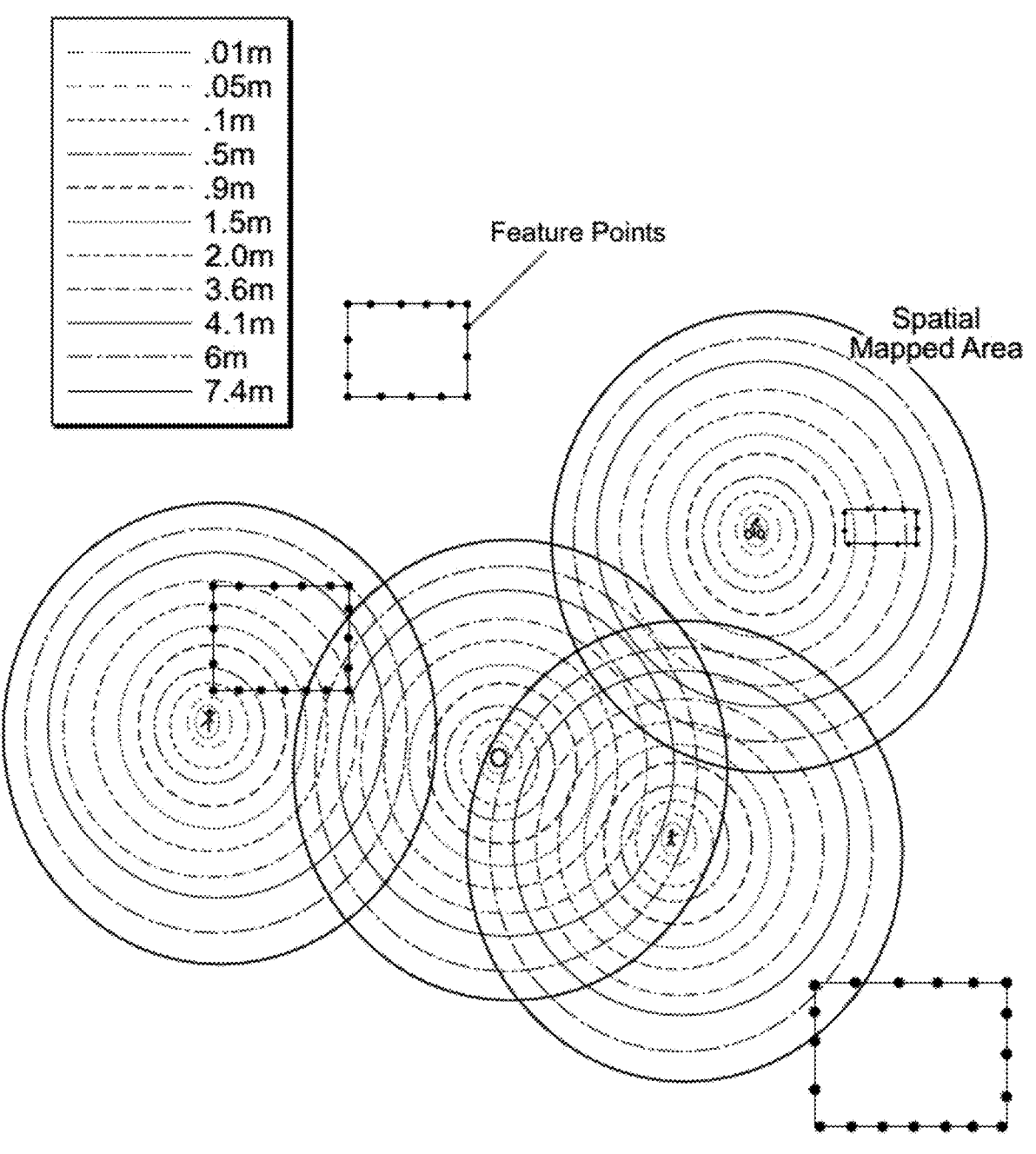
FIG. 10 illustrates an example of a method for a distributed SLAM Network Edge service receiving a location accuracy request from a distributed SLAM client, according to an aspect of an embodiment.

FIG. 10 illustrates a conceptual representation of a request received, by a SLAM network edge service, for a location accuracy for a distributed SLAM-enabled device. Concentric circles indicate distance from the dynamic moving virtual object provided by the AR system. The rectangles represent stationary physical objects with points along the edge services representing feature points determined for the stationary physical objects. In the example shown for purposes of illustrating the concept, for a tracked physical object may be moving at 10.9 m/second 10-20 m away there may be a framerate of 50 Hz. A closest moving virtual or physical object to a feature point may be 0.1 m. Optimal encoding may be 1080p 50 Hz at 13 Mbs HEVC or 5.8 Mbs for VVC in this example. As discussed, the request for location accuracy may be triggered by a distance range of a SLAM device to one or more objects and/or one or more virtual objects in its vicinity and/or by a speed of the SLAM device or of the virtual object.

Figure 11A:
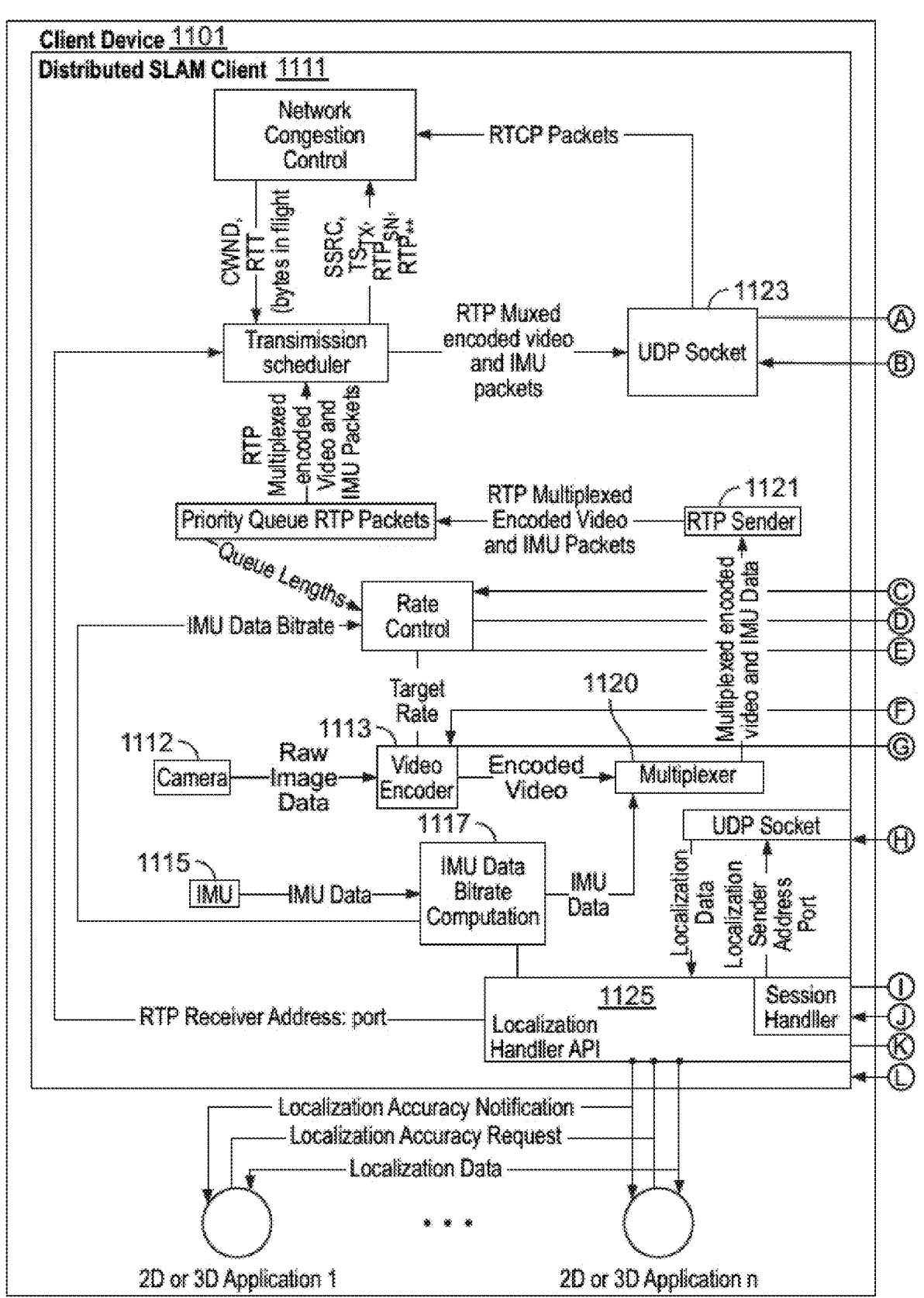
FIG. 11A illustrates an example of a SLAM device in communication through a data network with a distributed SLAM network edge service, according to an aspect of the disclosure.
Figure 12A:
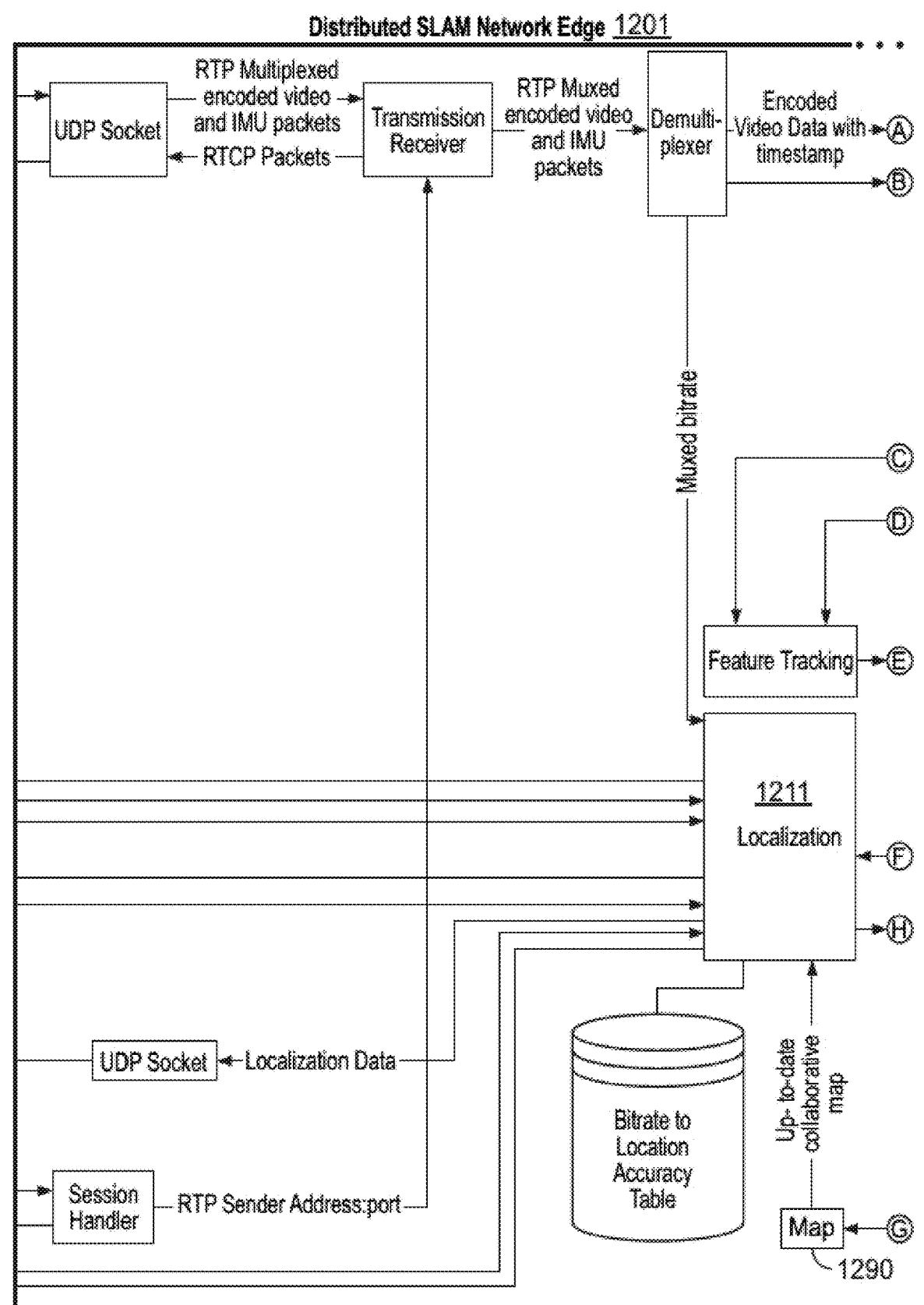
FIGS. 12A-B illustrate an example of a SLAM network edge service that may perform localization, according to the first embodiment.
Figure 12B:
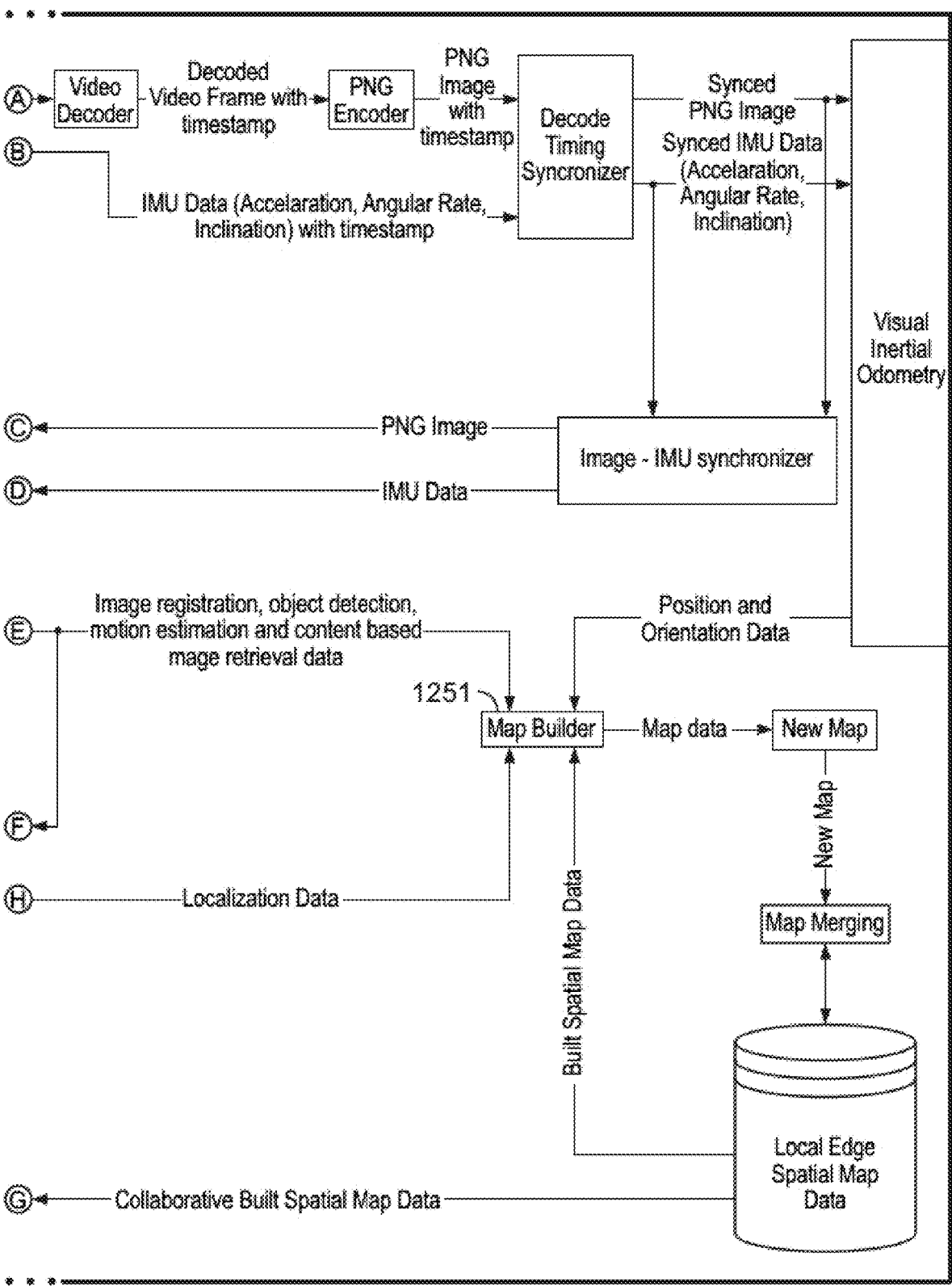

FIG. 11A illustrates a SLAM-enabled device 1101 communicating via exchanges through a data network, shown in FIG. 11B with a distributed SLAM network edge service device, server, service or system 1201 shown in FIGS. 12A and 12B, according to the first embodiment. As shown in FIG. 11, the SLAM device 1101, such as a AR/ER glasses or head mounted display (HMD) or other wearable device, smartphone, tablet or other handheld device, laptop computer, industrial robot, vacuum cleaner or other household appliance, drone, automobile or other vehicle, may have a SLAM client 1111 that controls a camera 1112 for capturing, at a set framerate, a stream of frames as image data that are then transmitted to a video encoder 1113 of the SLAM client 1111. In addition, the SLAM client 1111 may have an inertial measurement unit (IMU) 1115, which measures a change in speed or a change in orientation (change in acceleration) of the device 1101 and then transmits the IMU data to an IMU data bitrate computation module 1117. The IMU data bitrate computation module 1117 transmits this data as data packets to multiplexer 1120, which also receives the encoded video data. Multiplexer 1120 may also encode the IMU and image data it receives using a selected codec, and then transmits this encoded, multiplexed data to RTP (real end time transport protocol) sender 1121. The example illustrated in FIG. 11A shows RTP, being used to transmit the data from these sensors (the camera and the IMU data, as encoded and multiplexed, via UDP (user datagram protocol) socket 1123 through the wireless network 1150 to the SLAM network edge service 1201. However, it will be understood that other types of processing and other protocols may be used to prepare the data for transmission and to transmit the data. The data may be transmitted via a mobile or fixed line network 1150 to SLAM network edge service 1201 shown in FIGS. 12A-B.

The SLAM network edge service 1201, illustrated in FIGS. 12A-B, may perform localization, according to the first embodiment of the present disclosure. According to the first embodiment, the map of the area of the device is already generated by map builder module 1251 of the SLAM network edge service 1201 and stored in a map module 1290. However, the map may be generated by another device, for example, one or more other SLAM network edge service devices and transmitted to the SLAM network edge service 1201 and stored there. Data for the map may be generated by the SLAM client 1111 and transmitted to the SLAM network edge service 1201 or to one or more other SLAM edge service network devices and/or may be generated by and transmitted from other SLAM devices 1101. The generation of the data for the map be a collaborative process performed by the capturing of data and data transmission by more than one SLAM device and processed by more than one SLAM network edge service 1201. Some SLAM clients may provide processing, including map building, as part of this process.

Localization accuracy for the SLAM device 1101 on the map, as needed for the SLAM device 1101, may be provided by the distributed SLAM network edge service 1201 illustrated in FIGS. 12A-B, based on the image data received from the SLAM client 1111 of the SLAM device 1101 and based on the IMU data received from the SLAM client 1111. The SLAM network edge service 1201 provides a level of localization accuracy needed at the moment for the SLAM device 1101, as explained herein. The SLAM network edge service 1201 may be a base station for a mobile telephony system or other network, may be stationary or mobile, airborne, on the ground or water, or may itself be a SLAM device that moves autonomously and needs to be localized on the map.

Figure 13:
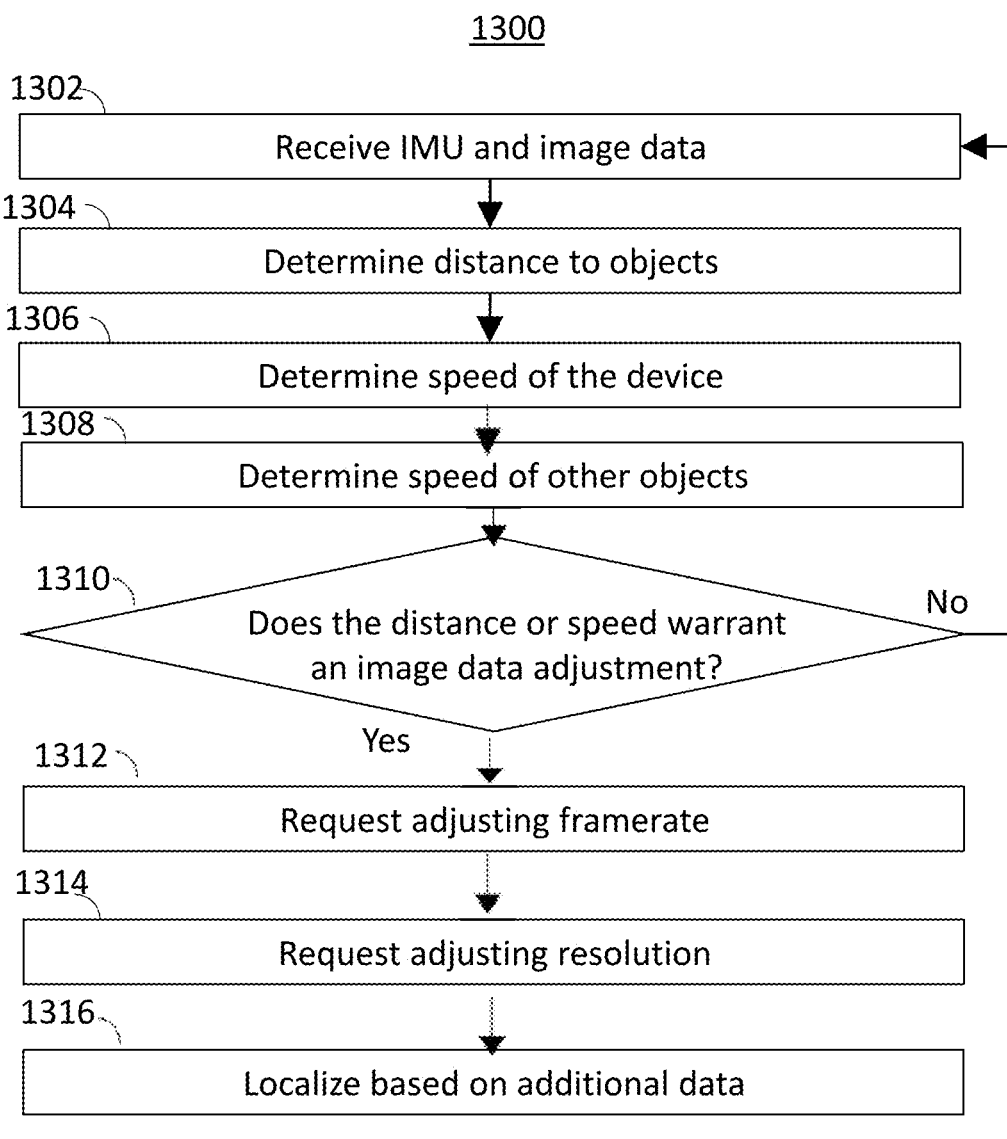
FIG. 13 is a flowchart illustrating an example of a process for controlling data communication with a SLAM device, according to the first embodiment.

FIG. 13 illustrates a method of communication control 1300 between SLAM device 1101 and the SLAM network edge service 1201, according to the first embodiment of the present disclosure. At 1302, the network edge service device 1201 receives IMU and image data from the SLAM device 1101. The data may be demultiplexed and decoded after receipt. This data may be sufficient for localizing the SLAM device 1101. Accordingly, SLAM network edge service 1201 may transmit guiding information to SLAM device 1101 based on the localization thus far determined.

At 1304 of FIG. 13, the SLAM network edge service 1201 determines a distance of the SLAM device 1101, or a change in distance of the SLAM device 1101 to neighboring objects. For example, visual odometry may be used for processing the image data received from the SLAM device 1101 to estimate a distance of the SLAM device from nearby objects, or a change in distance from nearby objects, including from other SLAM devices of the network.

At 1306 a speed, or a change in speed, is determined. For example, IMU data received from the SLAM device 1101 may be used to determine acceleration of the SLAM device 1101. Then, based on the known previous speed of the SLAM device 1101 in combination with the acceleration data, a current speed may be determined. Successive frames of the image data may be analyzed to estimate distance at known successive intervals, the length of the time intervals depending on the frame capture rate. The rate of change of distance may be used to determine speed of the SLAM device 1101 relative to other objects. Similarly, the image data may be used to determine a change in direction or orientation of the SLAM device 1101, or a rate of change in direction or orientation of the SLAM device 1101.

At 1308, a speed of other objects, or a change in speed of other objects may be determined. For example, successive distances of another object to the SLAM device 1101 may be estimated based on successive frames of image data captured at known frame capture intervals. The successive distances over time may be used to estimate the speed and/or the changes in speed of other objects, as well as the rates of such changes. Similarly, the image data may be used to determine a direction or a change in direction of other objects, or a rate of change in direction of other objects. In addition, or instead, image data received from other SLAM devices in the area may be used to estimate speed, change in speed, direction, and/or change in direction of the SLAM device 1101 and/or of other objects near the SLAM device 1101, as well as the rates of such changes. The image data received from the SLAM device 1101 may be supplemented with other SLAM device data, including IMU data, to determine such values, or ranges of values. If the other objects in the vicinity are part SLAM devices that are part of the SLAM network, then SLAM network edge service 1201 may have access to the data received from the other SLAM device to determine distances, orientations, and speeds relative to the SLAM device 1101.

At 1310 it is determined whether a distance or speed determined warrants an adjustment of the data from the device. For example, a distance that is deemed very close to objects in the vicinity of the SLAM device 1101 may call for an increase in the rate of frame capture by the camera of the SLAM client 1111 and/or an increase in the resolution of the image data captured.

Such an adjustment may result in an increase in the quantity of data being generated, which may require an increase in the bit rate to achieve the same data throughput over time. According to an aspect, at 1310 a change in the distance or a change in the speed of the SLAM client 1101 may be used as the basis for determining than an adjustment of the framerate or an adjustment of the resolution is needed. Examples of specific adjustment in response to specific distances are provided below. The speed of other near the SLAM device 1101 may also drive adjustment of the framerate and/or the image resolution. For example, the speed of nearby objects relative to the SLAM device 1101 may be picked up as change in distance of the SLAM device 1101 relative to the nearby object, in which case this change in the distance may call for an adjustment in framerate and/or resolution. On the other hand, if no adjustment is warranted, then processing returns to 1302 to continue monitoring.

If adjustment is warranted, then at 1312 a transmission to SLAM client 1101 may request/instruct that the rate of frame capture (framerate) be increased or decreased. The specific new framerate needed may be specified in the instruction transmitted. In addition, or instead, at 1314, a request/instruction for increasing or decreasing of the image resolution may be transmitted. The specific new image resolution needed may be specified in the request/instruction transmitted.

Adjustment of additional parameters related to image data capture, encoding, compression, transmission may also be called for and requested/instructed. A change in transmission bit rate may be requested. A bit rate change may be set. A bitrate may be accomplished by downloading software for updating a codec used for encoding and compressing image data and/or IMU data.

With such adjustment, more efficient communication may be achieved between the SLAM device 1101 and the SLAM network edge service 1201, as less data may be needed at greater distances to nearby objects and/or at slower speeds. Less power consumption may be achieved by the SLAM device 1101 and the SLAM network edge service 1201, and less needless data traffic may be realized, as data traffic is throttled with reduced framerates, reduced image resolutions, and the like. At the same time, network resources, and computational resources of the SLAM network edge service 1201 may be preserved for mapping and localization of other SLAM devices moving at greater speed or moving closer to nearby objects at any given time.

According to another embodiment, an adjustment in a rate of IMU data capture may also be instructed according to distance and/or according to the speed detected. SLAM client 1101 then may generate additional data based on the adjusted rates and transmit them to the SLAM network edge service 1201.

According to an embodiment, the SLAM device 1101 may be requested to transmit maximum framerate, maximum resolution and/or maximum bit rate parameters, and/or the codec it uses for transmission, as well as the dimensions and maximum speed of SLAM client 1101 to the SLAM network edge service 1201, such information may be pre-stored or otherwise obtained by the SLAM network edge service 1201.

Based on the additional data, the SLAM network edge service 1201 may provide location data for the SLAM client device 1101 with a finer/coarser level of granularity, that is with greater/decreased accuracy, on the map 1290, and thus SLAM device 1101 may then be guided with greater/less accuracy, depending on the need of the SLAM device 1101 as determined according to distance and/or speed.

Figure 14B:
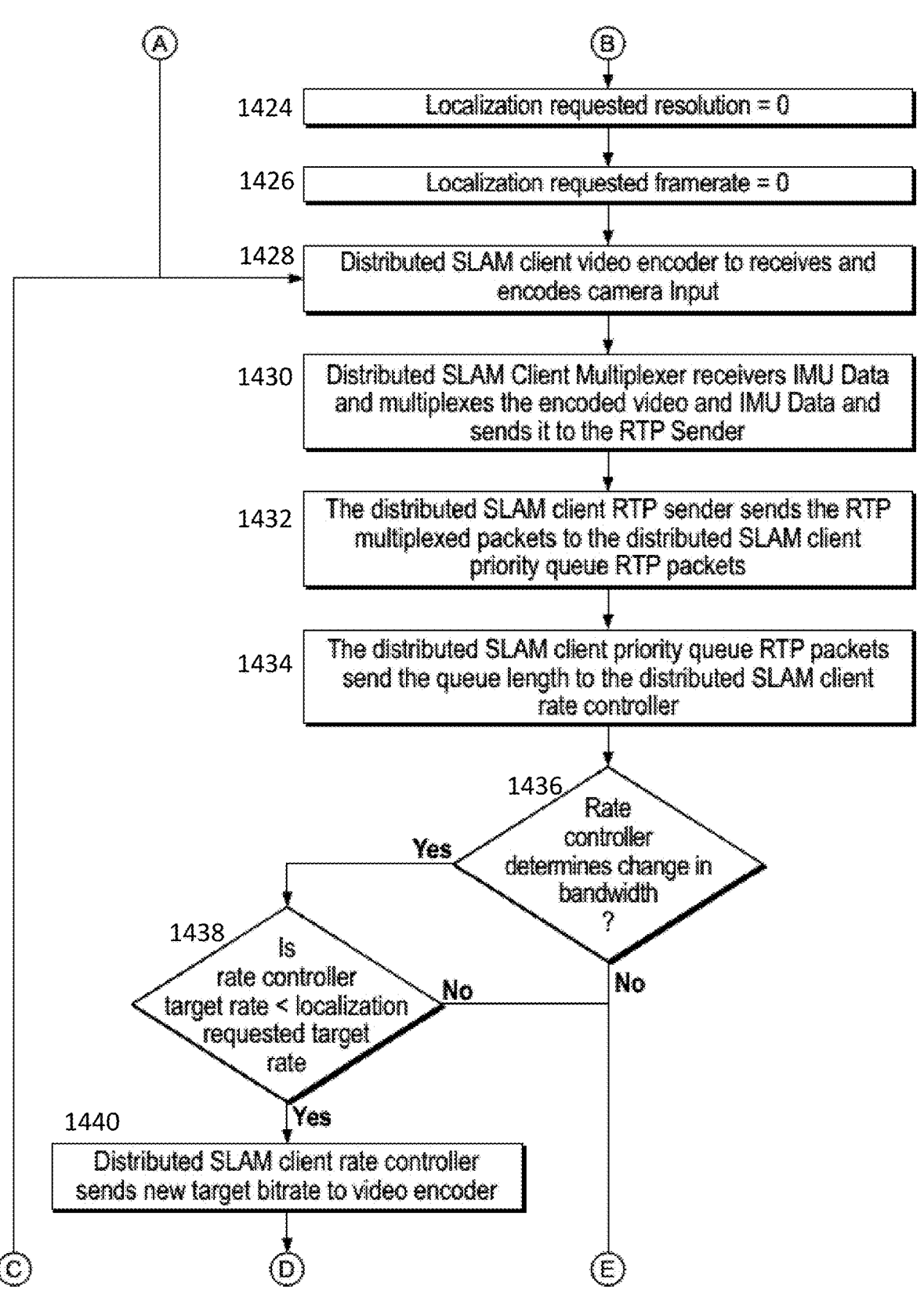
Figure 14C:
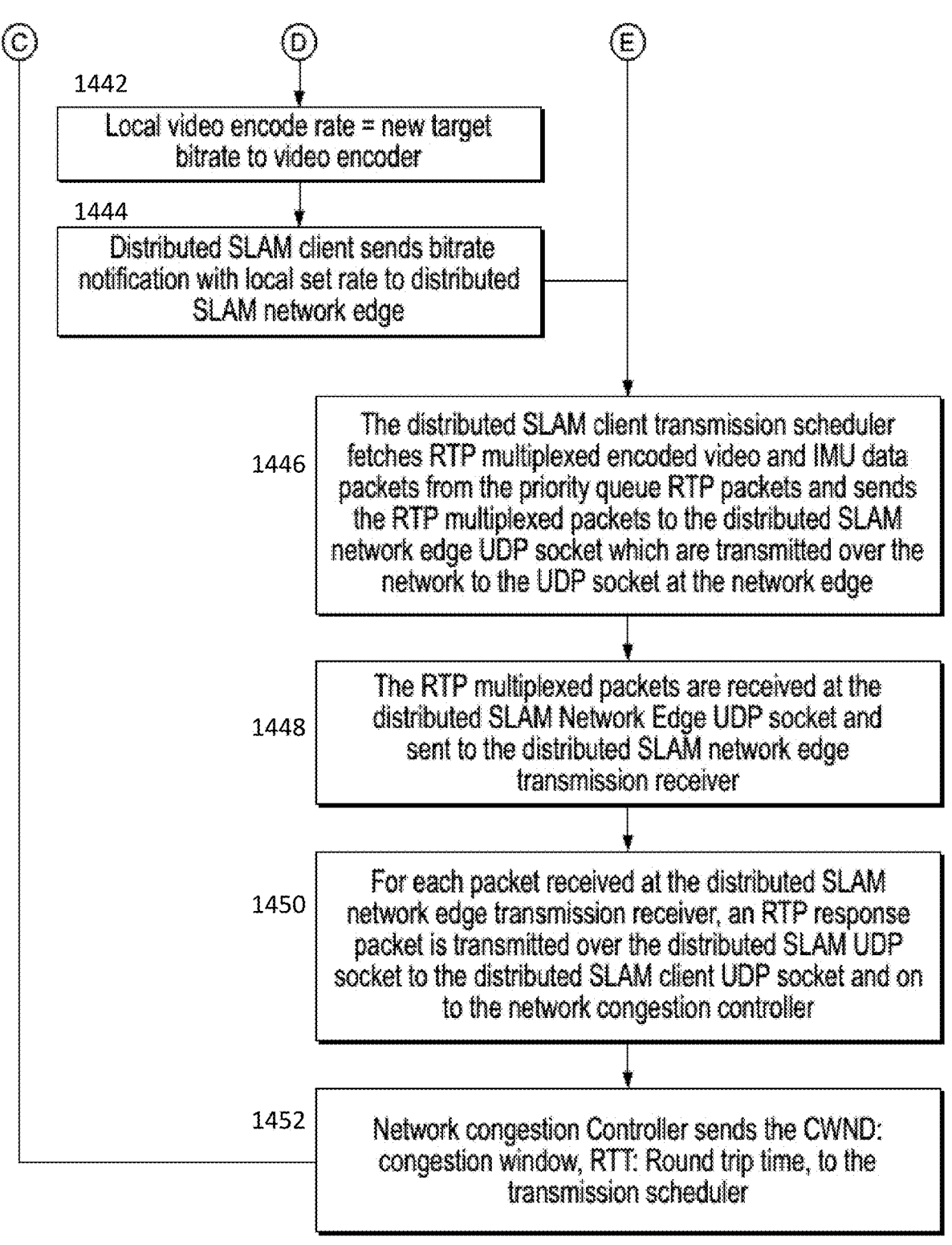

FIGS. 14A-C illustrate an example of a process 1400 that may be performed for startup of a SLAM-enabled client 1111 of SLAM client device 1101 as part of controlling a bit rate for transmission. FIGS. 14A-C illustrate that framerate and resolution are initialized and it is determined whether a packet transmission rate has changed and if so, whether it is less than a target rate. If it is less than the target rate, then a new encode rate is set and processing continues. This may be implemented as follows: If SLAM-enabled device 1101, at 1404, determines that the SLAM client 1111 is not already running, it starts up the SLAM client 1111 to initiate SLAM functionality. At 1406-1422, the distributed SLAM client's session handler makes a session setup request with the RTP Sender Address:port and codec to the SLAM Network Edge service 1201; SLAM Network Edge service 1201 sends a session setup response with the RTP receiver address:port, SLAM Client's transmission scheduler connects to the Distributed SLAM Network Edge service Receiver Address: Port, SLAM Client 1101 accesses camera and IMU data, SLAM Client's rate control sends an initial preset target rate to the SLAM Client's video Encoder, and values may be initialized as follows:

Local Video Encode Rate=initial preset target rate,

Local FrameRate=initial preset target FrameRate,

Local Resolution=initial preset target Resolution,

Localization requested Target Rate=0 Mbs,

Localization requested Resolution=0, and

Localization requested FrameRate=0.

Continuing with this illustrative example of a process 1400 that may be performed, at 1424-1434 shown in FIG. 14B, SLAM Client video encoder may receive and encode camera input, SLAM Client RTP Sender sends the RTP multiplexed packets to the SLAM Client Priority Queue as RTP Packets. If at 1436 Rate Controller determines a change in bandwidth, then at 1438 it is determined whether Rate Controller Target Rate<Localization requested Target Rate. If yes, then at 1440-1444, SLAM Client Rate controller sends new Target Bitrate to Video Encoder, Local Video Encode Rate is set to new Target Bitrate, and SLAM Client 1101 sends a bitrate notification with local set rate to SLAM Network Edge service 1201.

On the other hand, if at 1436 rate controller determines no change in bandwidth, or if at 1438 it is determined that rate controller target rate is not less than the localization requested Target Rate, then at 1446-1452 SLAM Client Transmission Scheduler fetches RTP multiplexed encoded video and IMU data packets from the priority queue RTP packets and sends the RTP multiplexed packets to the SLAM Network Edge service UDP socket. These packets are transmitted over the network to the UDP socket at the network edge service. The RTP multiplexed packets are received at the Distributed SLAM Network Edge service UDP Socket and sent to the Distributed SLAM Network Edge service Transmission Receiver. For each packet received at the SLAM Network Edge service Transmission Receiver, an RTP response packet is transmitted over the Distributed SLAM UDP socket to the UDP socket of SLAM Client 1111 and on to the Network Congestion Controller. Network Congestion Controller sends the Congestion Window (CWND) Round Trip Time (RTT) to the Transmission Scheduler. It will be understood throughout that steps of processes described herein, and processes in general, are provided by way of example and that aspects of the invention described may be performed or implemented in a variety of ways different from that described herein.

Figure 15B:
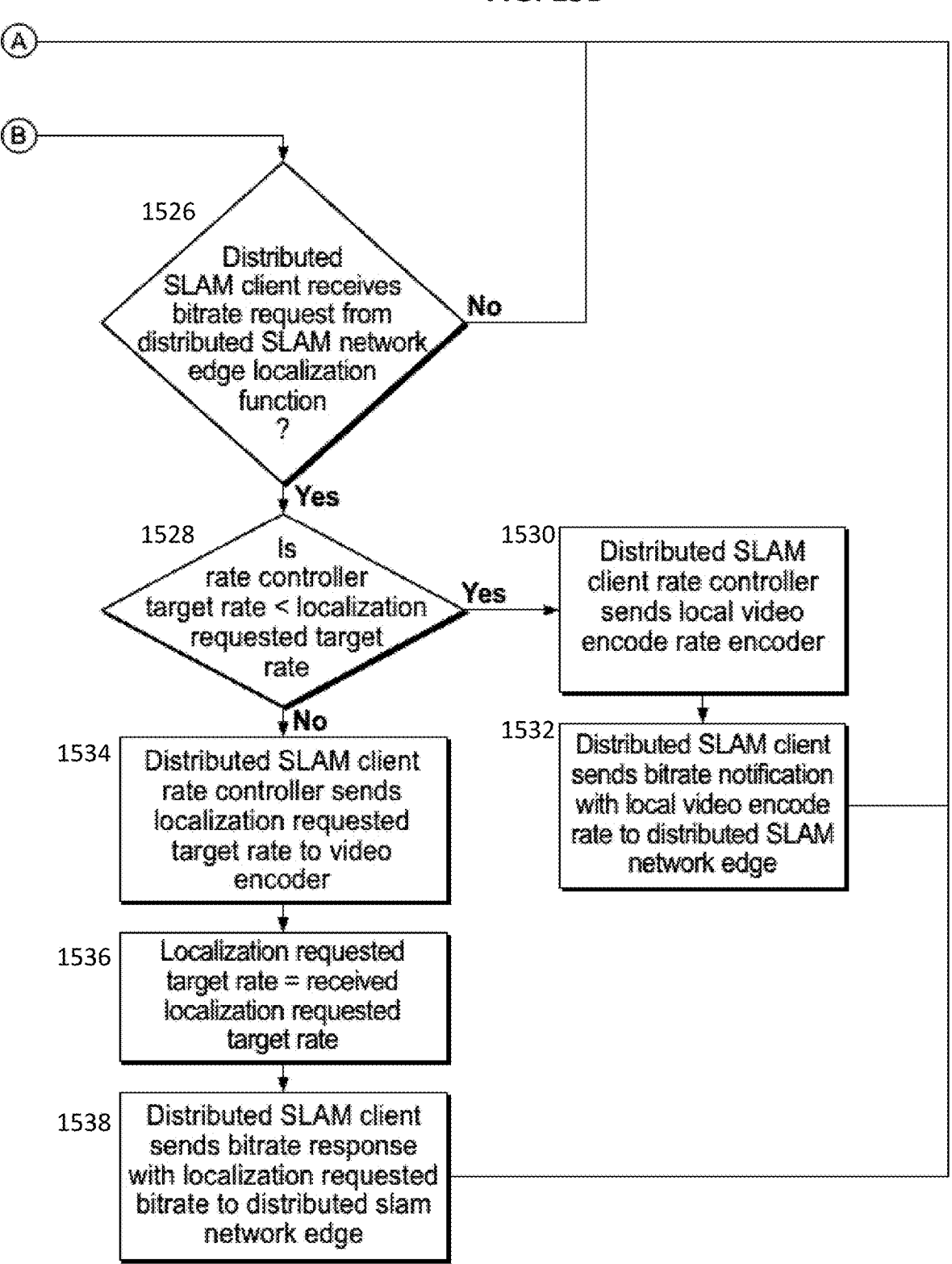

FIGS. 15A-B illustrate a process 1500 for dynamic localization optimization that may be performed for the SLAM client 1111 to receive, and to implement a request/command from the SLAM network edge service 1201 for a bit rate change or change video encoder properties of the SLAM client 1111. FIGS. 15A-B illustrates that at 1508 the SLAM client 1111 may receive from the SLAM network edge service 1201 a request/command for changing encoding properties that includes a resolution change (as described below at 1510-1516). In response to receiving such a request, the video encoder of SLAM client 1111 may change also an encoding parameter for video data, as follows: If at 1510 the request is for a resolution change, then at 1512-1516, SLAM Client Video Encoder changes encoded resolution to encoding parameter resolution, localization requested target rate is set to the received localization requested target rate, and Distributed SLAM Client sends bitrate response with localization requested bitrate to SLAM Network Edge service 1201 as confirmation.

Also, FIGS. 15A-B illustrate that the SLAM client 1111 may receive from the SLAM network edge service processor 1201 a bit rate modification request (1518-1524). SLAM Client Video Encoder changes encoded framerate to the encoding parameter framerate, SLAM Client Video Encoder adds new encoded framerate encoding properties response, and at 1524 localization requested framerate is set to the encoding parameter framerate. In this way, if the bit rate request is greater than the target rate that is currently set than the rate at the SLAM client 1111 is set by the video encoder of the SLAM client 1111. Also, in this way, if the encoding properties request received includes a framerate change, then the new framerate is sent and set for the encoding parameter. At 1526 (shown in FIG. 15B), if the Distributed SLAM Client receives a bitrate request from the SLAM Network Edge service 1201, then if the Rate Controller target rate less than localization requested target rate, then at 1530-1532 SLAM Client Rate controller sends local video encode rate to Encoder, and SLAM Client 1101 sends a bitrate notification with the local video encode rate to SLAM Network Edge service 1201. On the other hand, if the determination is "Yes" at 1526 and "No" at 1528 then at 1534-1538 SLAM Client Rate controller sends the localization requested target rate to the video encoder, localization requested target rate is set to received localization requested target rate, and SLAM Client 1101 sends a bitrate response with the localization requested bitrate to the SLAM Network Edge service 1201. While sometimes described as encoding properties, it will be understood that the adjustment may be made at the sensor level to increase/decrease frame capture and/or increase/decrease image resolution.

Figure 16:
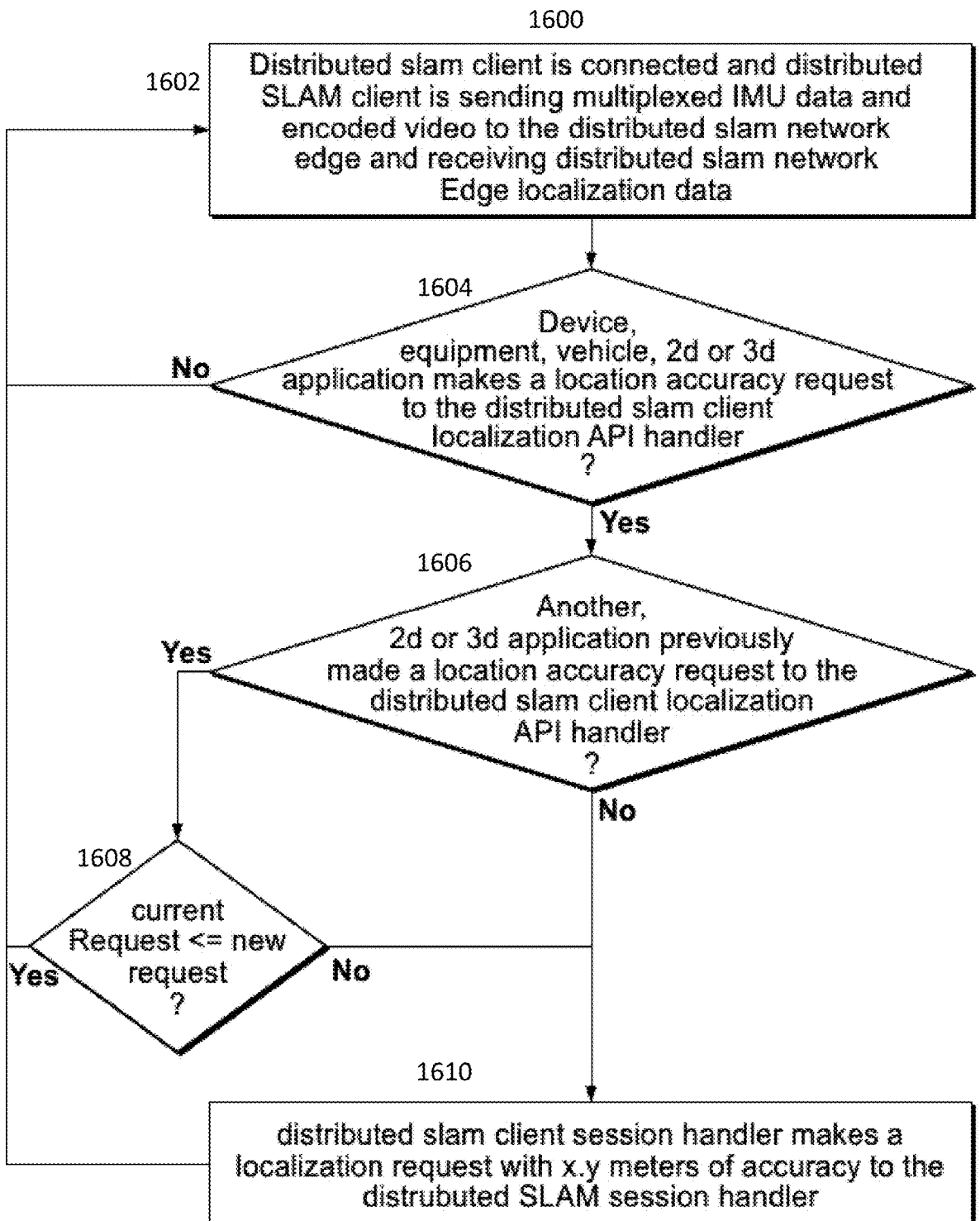
FIG. 16 is a flowchart illustrating an example of a process performed by the SLAM client for requesting a localization accuracy, according to an aspect of the first embodiment.

FIG. 16 shows a process 1600 that may be performed for requesting localization accuracy by the SLAM client 1111 to the SLAM network edge service 1201. After establishing a connection with the SLAM network edge service at 1602, at 1604 the SLAM device 1101, equipment or vehicle, or another application makes a location accuracy request to the SLAM network edge service 1201. Or, at 1604 SLAM-enabled device, equipment or vehicle's 2D or 3D application makes a location accuracy request to the SLAM Client: localization API Handler. Or as shown as 1606, such a request may have been previously made. In either case, at 1610, SLAM Client Session Handler makes a localization request with x.y meters of accuracy to the Distributed SLAM Session Handler, pursuant to which the SLAM network edge service 1201 is requested to localize the SLAM client device 1101 to within a set level of accuracy on the map previously generated. In an embodiment, SLAM client 1111 need not request location accuracy, but instead, the SLAM network edge service 1201 determines automatically on its own, based on distance and speed data as discussed, that an adjustment of the data is necessary for localizing the SLAM device 1101.

If another SLAM device made a location accuracy request, the priority of the request is determined, for example, based on earlier time of reception, a greater speed or acceleration of the requesting device, or the like. Priority may also be given to mission critical SLAM devices, such those providing emergency aid, those providing critical care medical services, and the like.

FIG. 17 shows a process 1700 that may be performed by a SLAM client 1111 in response to receiving a localization accuracy notification from the SLAM network edge service 1201. After connecting with the SLAM network edge service 1201, at 1704 the SLAM client 1111 determines whether a localization accuracy notification has been received. If so, then, at 1706 based on the location accuracy notification received, updates are sent to various components of the SLAM client 1111, including one or more sensors, for example, to one or more cameras, an IMU device, GPS device, and/or LIDAR, RADAR or the like provided on or at SLAM device 1101. According to the example provided in FIG. 17, the SLAM Client 1111 has a Localization API Handler that sends a location accuracy notification with x.y meters and Location Accuracy Degraded Indicator to applications of the SLAM-enabled device 1101. At 1708, the applications of the SLAM-enabled device 1101 execute their defined actions based on the current accuracy level and degraded indicator.

FIGS. 18A-F show a process 1800 that may be performed by a SLAM network edge service processor 1201 at start up, for localizing the SLAM device client 1111, and for controlling the SLAM device's resolution and framerate. FIGS. 18A-F illustrate that the SLAM network edge service processor 1201 receives a request for a client session with the SLAM client 1111. If at 1804 it is determined that the SLAM network edge service processor 1201 is not yet running, then a series of steps 1806-1818 may ensue: SLAM Network Edge service 1201 receives a session setup request with the RTP Sender Address:port and codec from the Distributed SLAM Client 1111, SLAM Network Edge service processor 1201 starts SLAM services for the requested client session. Then SLAM Network Edge service 1201 enables decoder for the client's codec type, and sends a session setup response with the RTP receiver address: port and Location Data Sender address:port to the SLAM Client 1111, SLAM Network Edge service 1201 transmission receiver receives a connection from the SLAM Client Sender Address: Port, and initial values may be set: current_resolution=null, current_framerate=null, current_encode_bitrate=null, current_networkrate=null, Localization_bitrate=null, localization_Accu racy_Degraded=false, Localization configures and starts listener to listen for Bitrate Notifications from Distributed SLAM Client 1111. If at 1824 (shown in FIG. 18B), Listener receives a bitrate notification, then processing continues as shown in FIG. 19.

Resuming with FIG., 18B, at 1830, SLAM Network Edge service 1201 receives multiplexed video and IMU data and video on UDP socket from SLAM Client 1111, pursuant to which a series of steps 1832-1842 may follow to decode and to synchronize the data received: SLAM Network Edge service Demultiplexer demultiplexes encoded video and IMU data, IMU data is sent to timing sync. At the same time, at 1836 encoded video data may be transcoded to PNG images and the PNG image data (decoded by the video decoder and encoded by the PNG encoder) and at 1838 the PNG image is sent to timing sync.

If at 1840 it is determined that the timing sync received PNG image and IMU data share the same timestamp, then Decode Timing Synchronizer sends sync PNG image to Image-IMU Synchronizer.

Figure 18B:
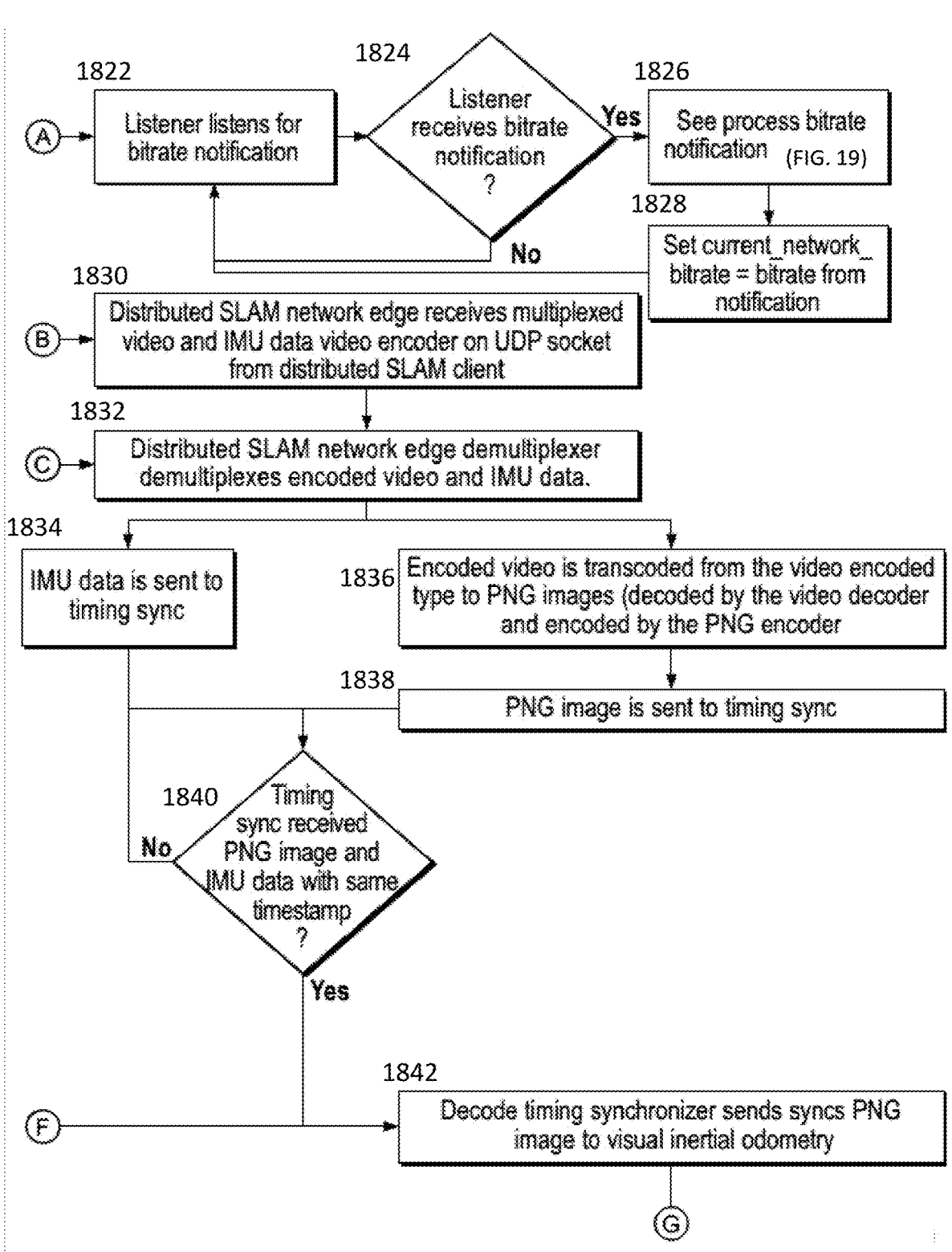
Figure 18C:
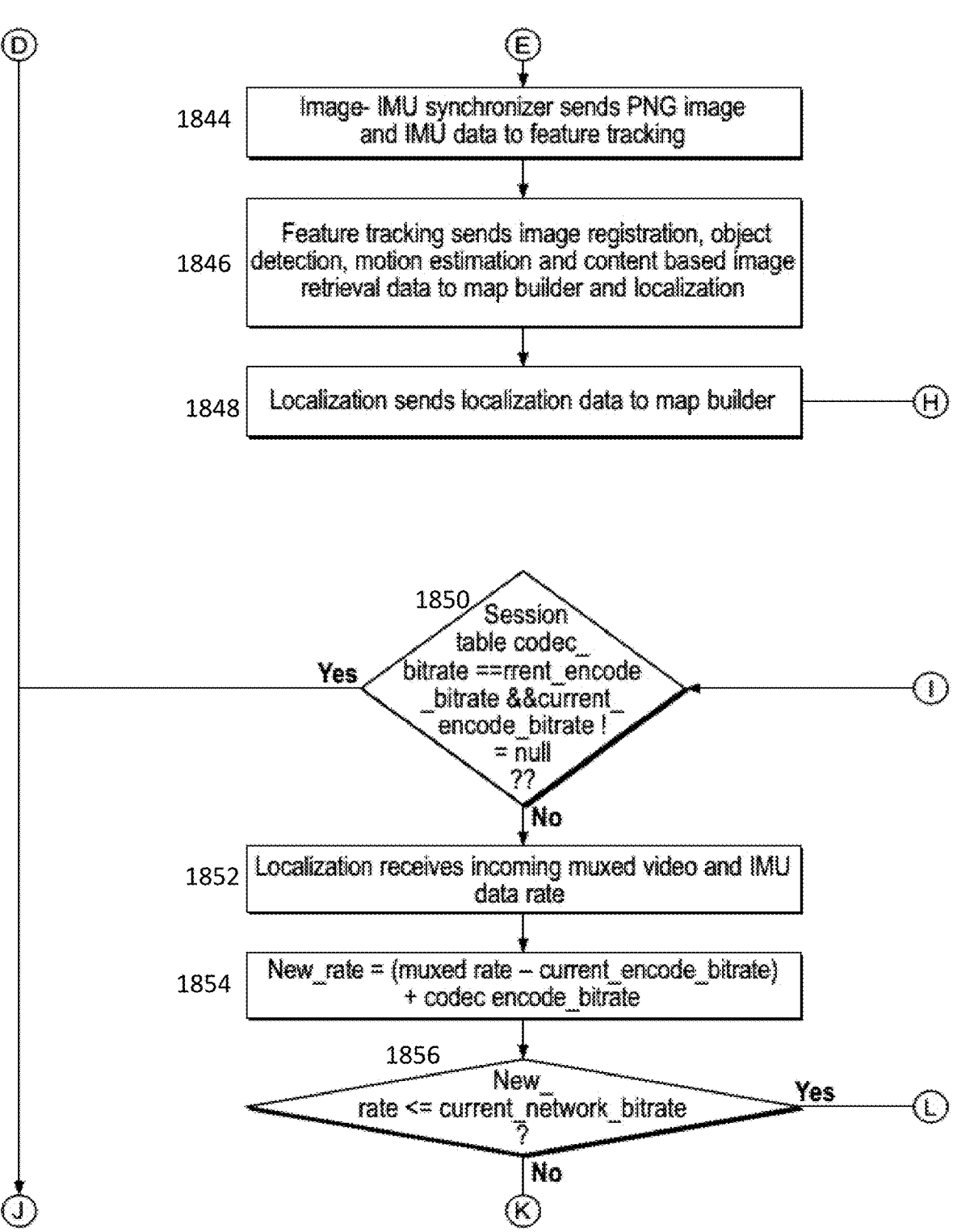

At 1844-1848 of FIG. 18C, based on the IMU and PNG image data, key feature points are tracked and object's motion is estimated. Localization of SLAM network edge service 1201 sends localization to map builder.

SLAM network edge service processor 1201 may determine, using visual odometry, a position and orientation of the SLAM device 1101. Using a previously built spatial map, SLAM network edge service processor 1201 estimates the speed of the SLAM device 1101 relative to stationary and moving objects, and may determine whether a current bit rate is equal to or greater than a new bit rate that may be set. A codec resolution target rate and a codec framerate target may be set and transmitted to control the SLAM client 1111. As shown at 1858-1862 of FIG. 18D, it is determined whether map data exists for the location of SLAM-enabled device 1101. Visual Inertial Odometry sends position and orientation data regarding the SLAM-enabled device 1101 to Map Builder of SLAM network edge service 1201, which then queries Local Edge service Spatial Map Data with received location data and position and orientation data and determines whether a spatial map exists and is current for device location and no further building of a spatial map is needed. At 1864 the closest object to SLAM-enabled device 1101 is estimated, and at 1870 a lookup is performed in the session codec for encode bitrate based on feature tracking proximity for level of location accuracy (See FIG. 22 for examples of different codecs). At this time, at 1866 a speed of the SLAM-enabled device 1101 is estimated along with its distance relative to nearby stationary and moving objects using feature tracking data, and at 1868 a lookup in the session codec framerate data structure is performed based on feature tracking proximity for the closest and fastest moving object to determine an optimal encoding framerate (See FIG. 21). As shown at 1872-1876 of FIG. 18D, new resolution and/or new framerate parameters may be called for based on the motion and speed data and, accordingly, a lower bitrate may be set as needed for the resolution and framerate determined.

As shown at 1852-1856 (in FIG. 18C), a new rate may be set as:

New_Rate=(muxed rate–current_encode_bitrate)+codec encode bitrate.

If the new rate is less than or equal to the current network bitrate, then at 1856 localization sends bitrate change request with New_Rate to Distributed SLAM Client Rate Control. Then, as shown at 1872-1876 of FIG. 18D, an encoding property resolution may be set accordingly.

Figure 18E:
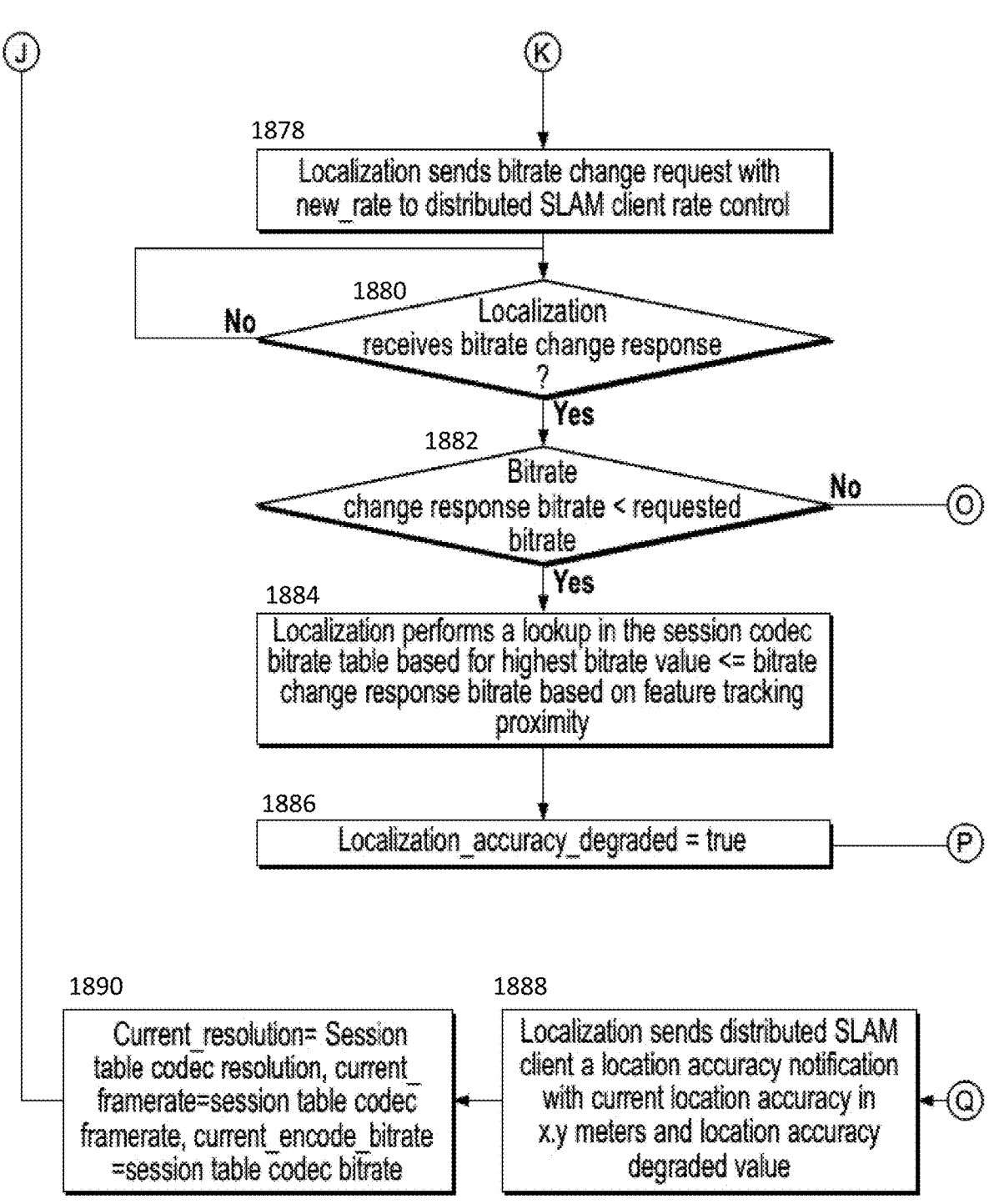
Figure 18F:
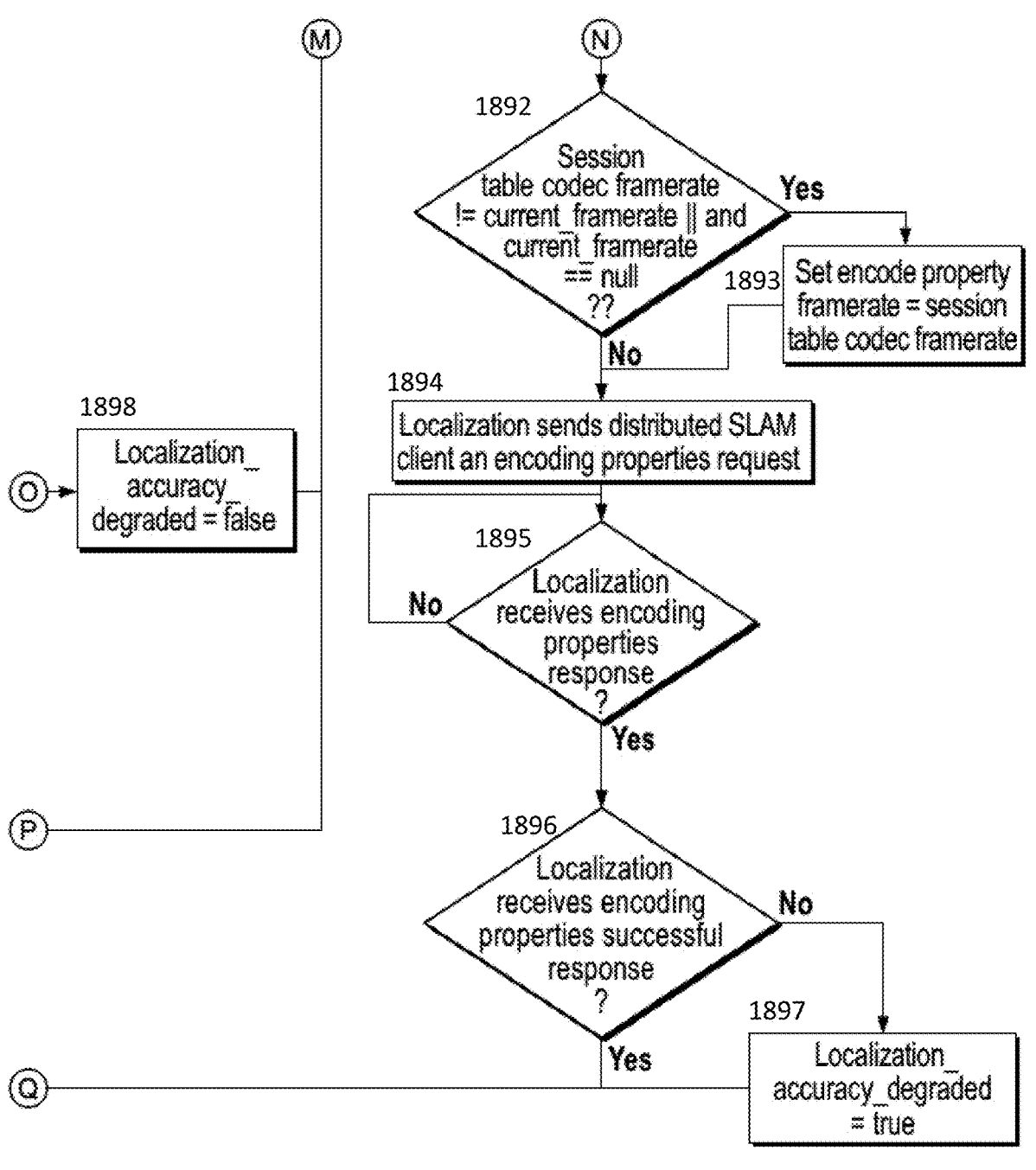

FIGS. 18E-F show bitrate and framerate control for the SLAM-enabled client 1111. If at 1880 shown in FIG. 18F, SLAM-enabled client 1111 receives a request for bit control change, then the highest bitrate value based on the codec used is determined, and it is further determined whether this value is less than or equal to the bitrate determined to be needed for feature tracking proximity. If at 1884 it is determined that the highest available bitrate that can be provided is less than the bitrate called for as determined based on the speed and distance, then at 1886 a degraded accuracy flag may be set. A degraded accuracy flag may trigger a request to the SLAM-enabled device 1101 to slow down, change course to increase distance from one or more nearby objects, to enter a failsafe mode, or to take other remedial measures.

Figure 19C:
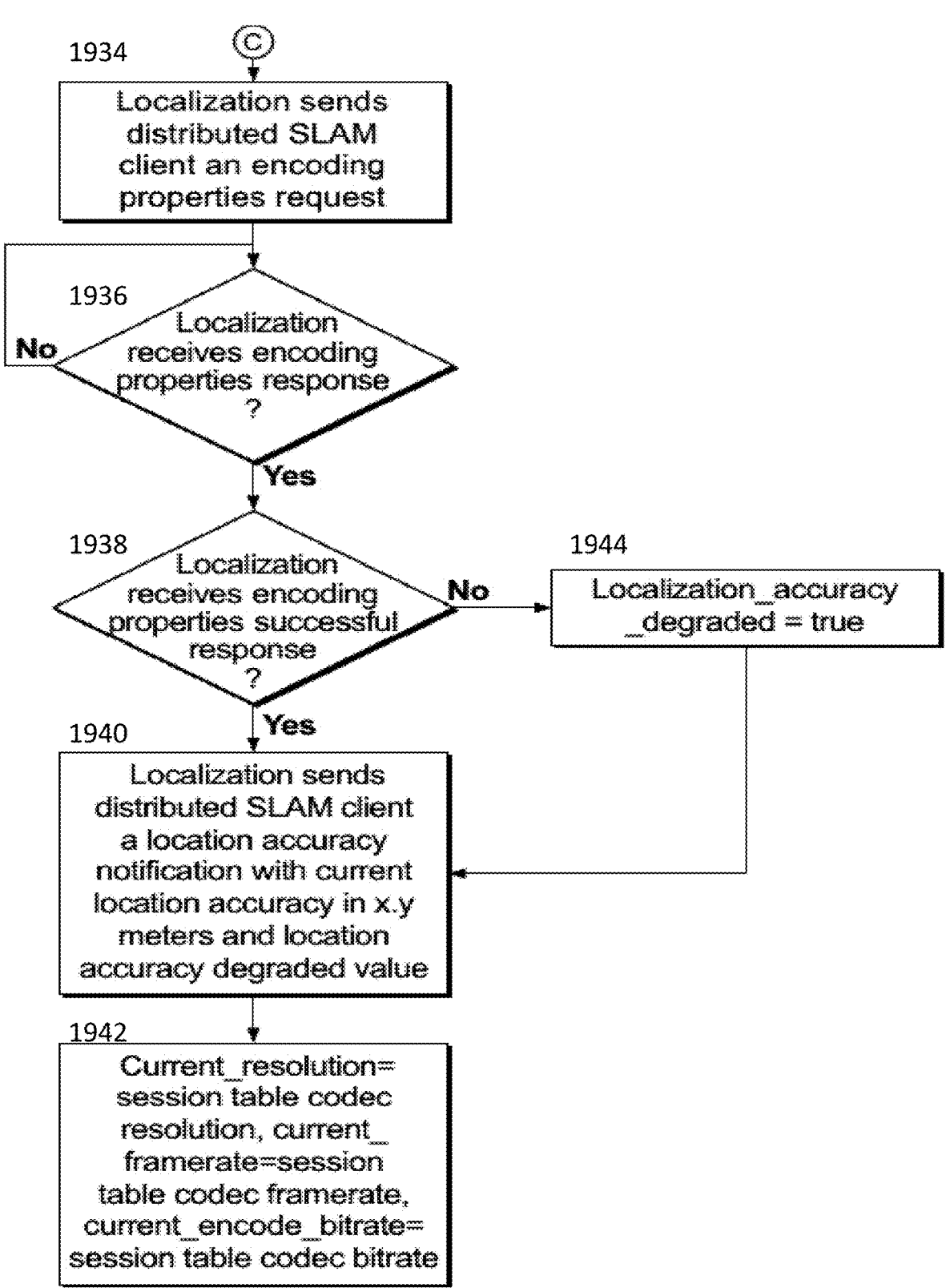
FIGS. 19-C are a flowchart that illustrates an example of a process performed by SLAM network edge service processor 1201 in a case in which change occurs in the SLAM client's uplink bandwidth, according to an aspect of the first embodiment.

FIG. 19A-C show a process 1900 that may be performed by SLAM network edge service processor 1201 in case there is a change in distributed SLAM client device's 1111 uplink bandwidth. If at 1906 it is determined that a current network bit rate is greater than a bit rate indicated in a notification of the SLAM network edge service 1201, then it is determined whether there is a degradation in localization accuracy for the SLAM device 1101. If so, then at 1916 shown in FIG. 19B it is decided, based on available bandwidth, whether the encoding parameter used by the SLAM client 1111 can be increased to the level required for localization accuracy. If so, then one or more encoding parameter(s) and the framerate is/are adjusted. If not, then a degraded accuracy may be determined at 1928.

Figure 20A:
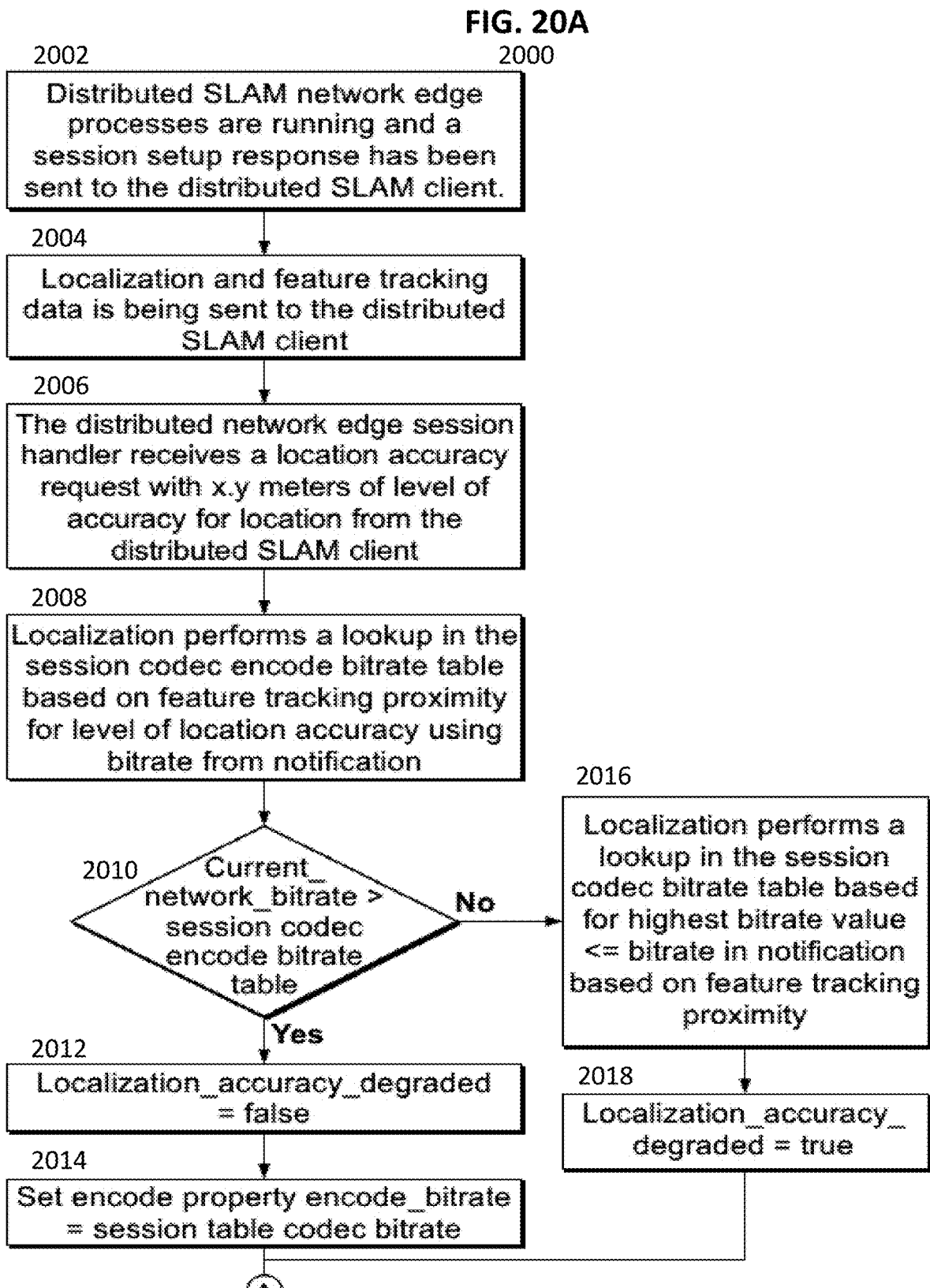
FIGS. 20A-C are a flowchart that illustrates an example of a process performed by a SLAM network edge service processor after receiving a location accuracy request from a SLAM client, according to an aspect of the first embodiment.
Figure 20B:
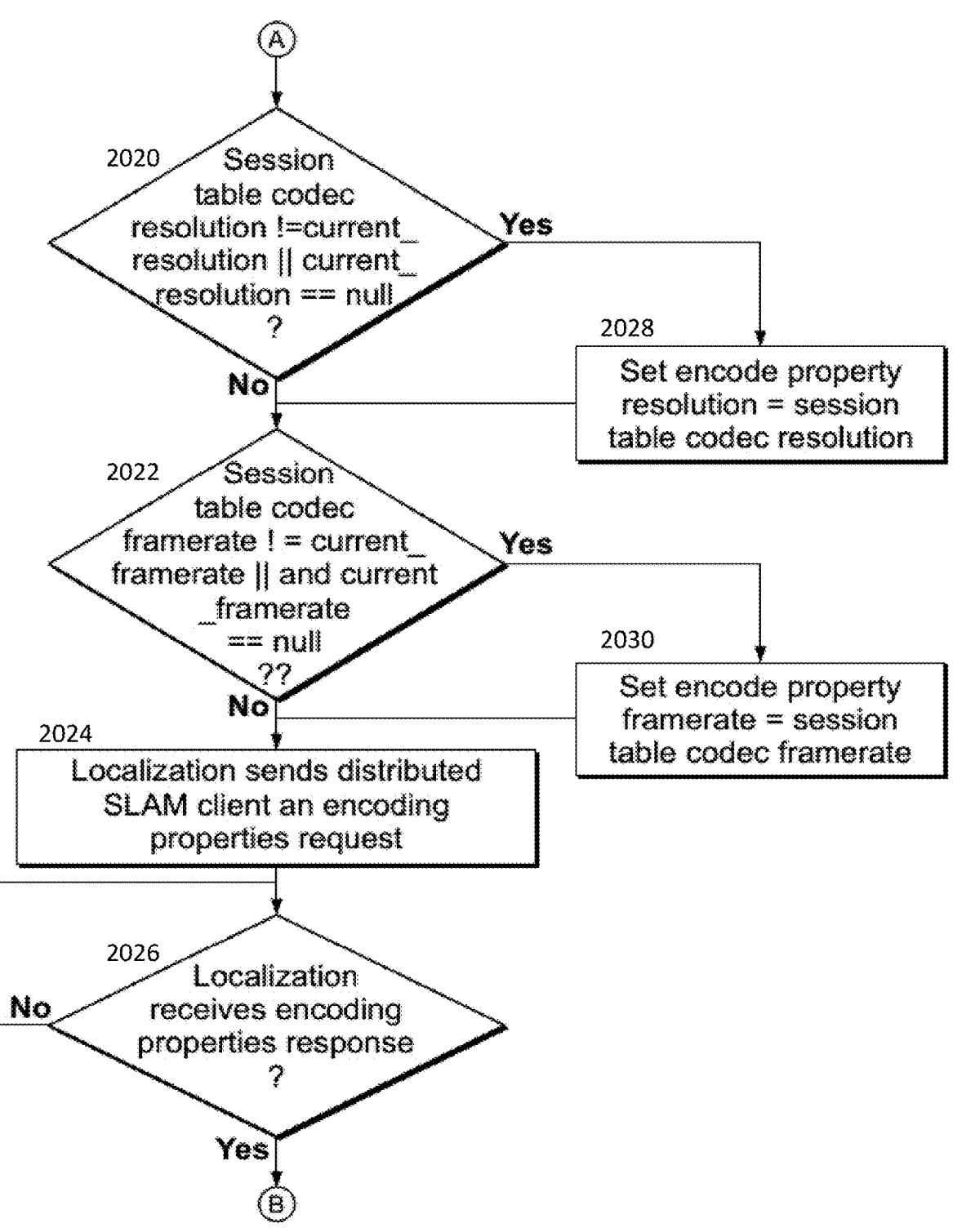
Figure 20C:
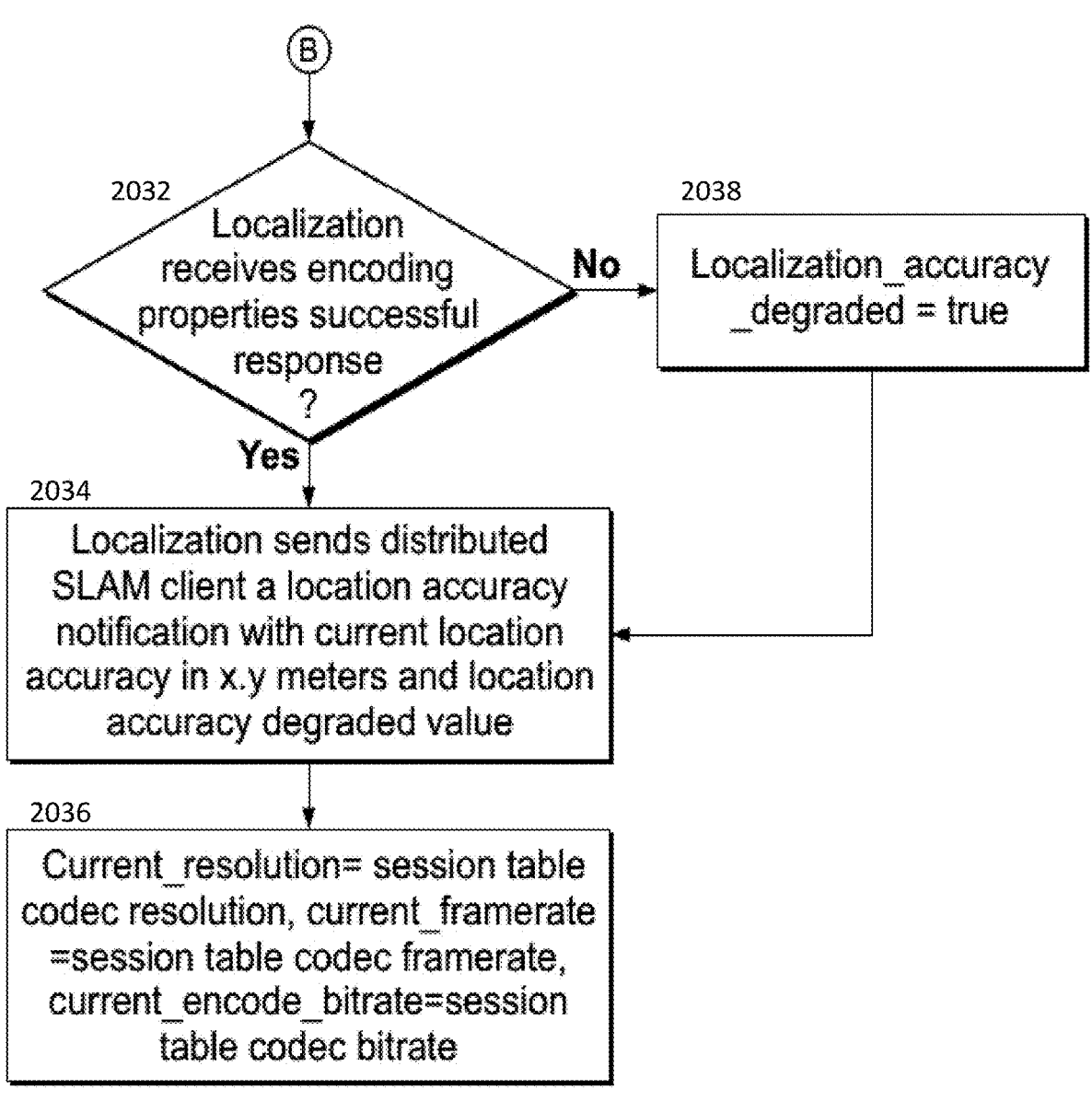

FIGS. 20A-C show a process 2000 that may be performed by a SLAM network edge service processor 1201 upon receiving a location accuracy request transmission from a SLAM client 1111. FIGS. 20A-C illustrate that SLAM network edge service 1201 at 2006 receives a location accuracy request from a SLAM-enabled client 1111 and at 2010 determines, based on the codec encode bitrate needed for the level of accuracy (according to the framerate and resolution called for pursuant to the speed and distance values, as determined at 2008), whether the current bitrate is greater than the bitrate called for. If yes, then at 2016, the bitrate is set accordingly, and at 2014 the encoding bitrate is set to the new rate. However, if at 2010 the determination is that it is not greater ("No") and at 2016 it is determined that the highest bitrate available is less than that the bitrate called for, then at 2018 a degraded condition flag may be set. In this way, the SLAM network edge service 1201 may set the codec image resolution parameter and the codec framerate using a table of values, and then at 2024 of FIG. 20B may transmit instructions, including new video encode bitrates, new framerate and resolution parameters, to the SLAM client 1111 accordingly. As shown at 2032-2036 of FIG. 20C, SLAM network edge service 1201 sends SLAM-enabled client device 1101 the localization and may notify it that the location accuracy is degraded.

FIG. 21 shows examples of target framerates (expressed as frames per second) that may be set based on a combination of the distance of the SLAM client device 1101 from a close nearby object, shown at the top (heading) row of each column, and the speed of the SLAM-enabled client device 1101 shown in the rows below the top row of each column. For example, as shown in the first row, showing speed values, in the column on the far left of FIG. 21, if the SLAM-enabled device 1101 is moving at a speed or 0.04-0.19 meters/second, and as shown in the heading row is less than 1 meter (m) from a nearby object, then this would call for a framerate of 10 Hz (per second). According to the table of FIG. 21, greater speeds of the SLAM-enabled device 1101 and closer distances to nearby objects call for greater framerates. Image resolution may be set in addition, or instead of framerates, based on the values shown in FIG. 21. As discussed, the speeds, distances to nearby objects and framerates shown are examples.

According to an embodiment, the speed of moving nearby objects also may be taken into consideration in determining framerate. For example, if the SLAM-enabled device 1101 is moving at speed A meters per second (m/s) in a first direction, and if a first object is moving toward the SLAM-enabled device 1101 at a speed of B m/s in the opposite direction, then the speed may be thought of as A+B m/s for purposes of calculating the needed framerate and/or resolution rate.

FIG. 22 is a table that has columns as follows: localization accuracy (in meters) in the far left column, the resolution called for by that level of localization accuracy, the framerates called for by that level of localization accuracy, and encoding bit rates (in Mb per second) provided by HEVC encoding and by VVC encoding for encoding image data at the specified resolution and framerate. Based on the framerates determined according to the table shown in FIG. 21, using the table provided in FIG. 22, parameters, including encoding bit rates may be determined. Values in bold may be used as keys for localization and tracking speed that are used to determine the encoding parameters. For example, based on the values of the table shown in FIG. 21, it may determined, according to the penultimate row, that a framerate of 120 frames/second is needed for guiding the SLAM-enabled device 1101, because it is moving at a speed of 3.6-4.59 m/s at a distance of less than 1 meter from a nearby object (first column) or at a speed of 6.6-9.19 m/s at a distance of 1 m-5 m from a nearby object (second column). Turning then to FIG. 22, a framerate of 120 Hz at a resolution of 8K (second row) may be provided by a bitrate of 230 Mbs by an HEVC codec or by a bitrate of 115 Mbs by a VVC codec. However at a greater level of accuracy of 0.05 m, a framerate of 120 Hz at a resolution of 8K (second row) may be provided by a bitrate of 200 Mbs by an HEVC codec or by a bitrate of 100 Mbs by a VVC codec. If a lower 4K resolution is called for then the bitrates necessary for the same framerate may be considerably lower, as also shown in FIG. 22. As shown in FIG. 22, an improved codec such as the VVC may provide the same or better image quality at a lower bitrate than some older codecs. Thus the actual bitrate required to transmit a given framerate and resolution from the SLAM-enabled device 1101 to the SLAM network edge service 1201 may depend on the codec used. In an embodiment, a greater image resolution may compensate for a lower framerate, and vice versa. For example, a 4K resolution at a higher framerate may be sufficient for guiding the SLAM-enabled device 1101, or an 8K resolution at a lower framerate may be sufficient for guiding the SLAM-enabled device 1101. By way of illustration, with a 1 meter localization (accuracy=1.0 in the x.y format), the client device would request a localization accuracy of 1.0. The edge server would look up the encode bitrate based on the codec used and the resolution. The SLAM network edge 1201 will send a request to the client device to change the encode bitrate to be bitrate A Mbs and N resolution based on the requirements to achieve that level of specified localization accuracy. The SLAM-enabled client device 1101 will determine whether the bandwidth requested is available to achieve the requested new bitrate. If it is not, the client device will send the highest bitrate available. Based on that new bitrate, the SLAM network edge 1201 will send the client a notification that based on the current bandwidth available, set the highest available video encode rate and the highest resolution available at the available network bitrate and it will also send the SLAM-enabled client device 1101 the best localization accuracy based on the current available network quality of service.

Figure 23A:
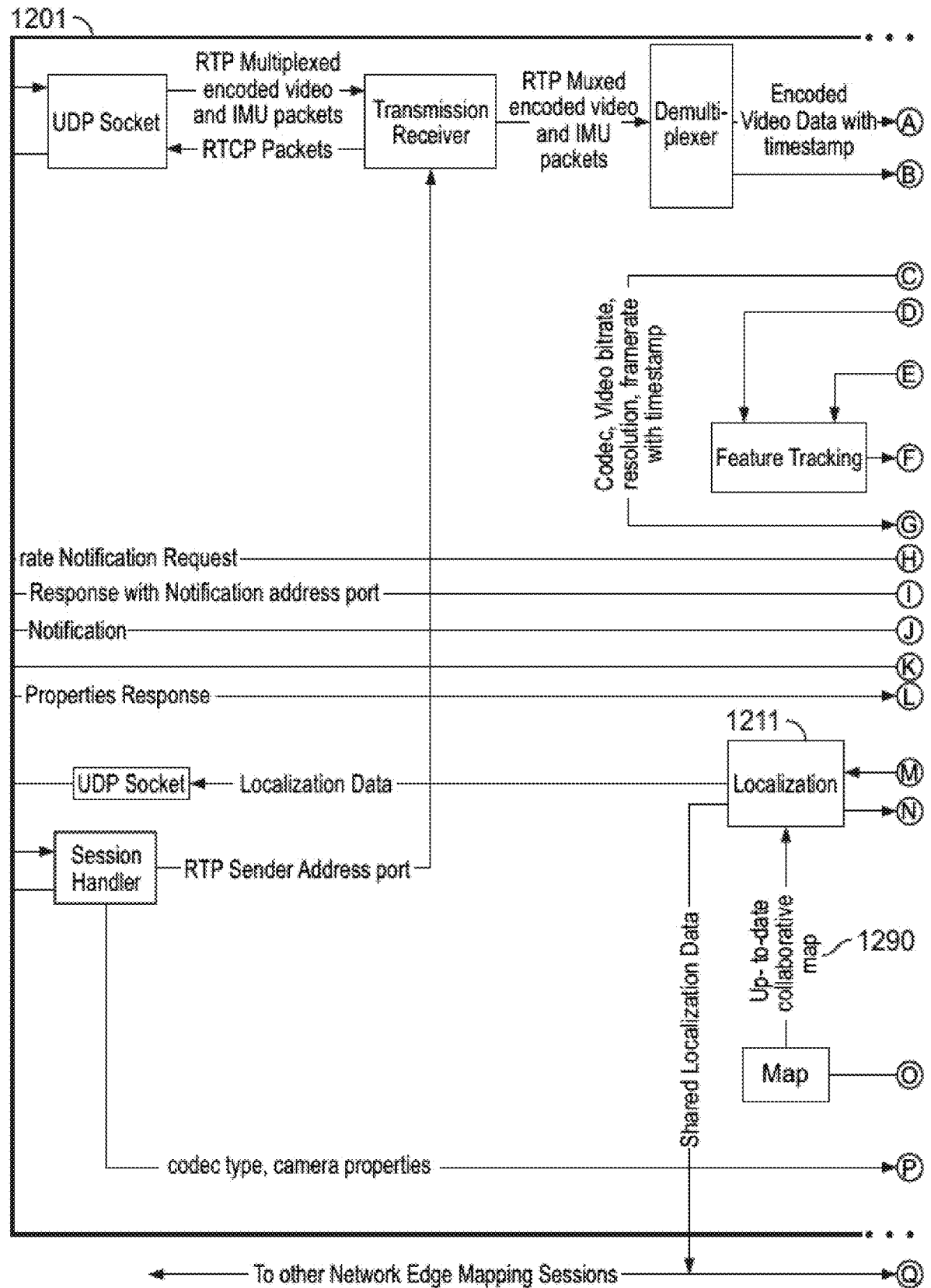
FIGS. 23A-B illustrate an example of a SLAM network edge service processor that provides map building and map updating based on image data and IMU data received from one or more SLAM devices, according to the second embodiment.
Figure 23B:
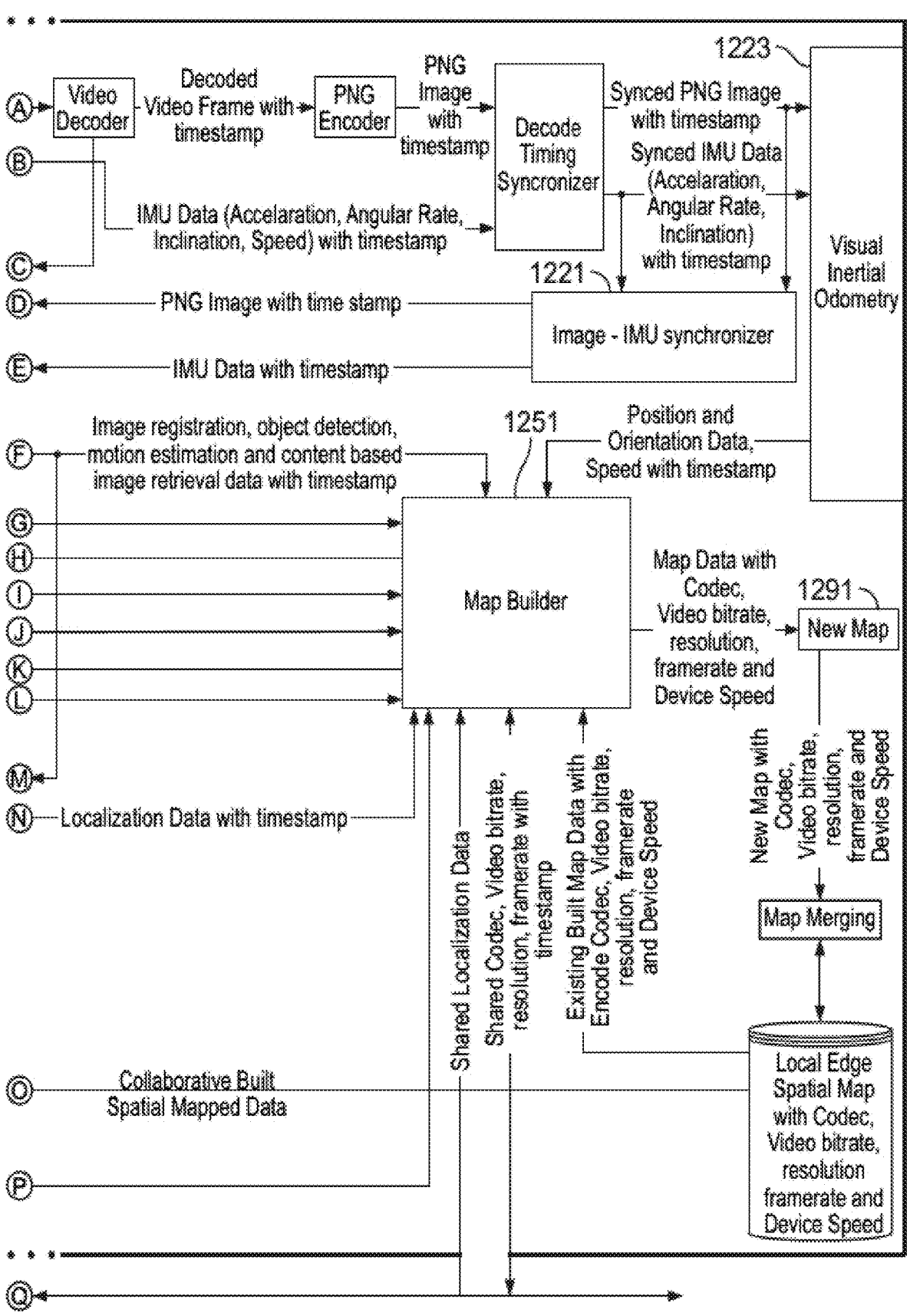

FIGS. 23A-B illustrate the SLAM network edge service 1201 (also illustrated in FIGS. 12A-B) in communication with SLAM device 1101 (shown in FIG. 11A). The SLAM network edge service 1201 may include map building modules, according to the second embodiment of the present disclosure. According to the second embodiment, the map builder module 1251 of the SLAM network edge service 1201 may generate a map of the area where the SLAM device 1101 is located and may store the map in a map module 1290. However, as discussed, generation of the data for the map be a collaborative process performed by the capturing of data and data transmission by more than one SLAM device and processed by more than one SLAM network edge service 1201. Some SLAM clients may provide processing, including map building, as part of this process.

FIGS. 23A-B illustrate that SLAM network edge service 1201 also includes an IMU-image synchronizer 1221 that may correlate the IMU data with the image data, both obtained from SLAM device 1101. Visual inertial odometry module 1223 may use the IMU and image data to determine distances. If additional higher quality data is received, map builder 1251 updates the map at, or replaces portions of map 1290, to obtain a new map or an upgraded map 1291.

Figure 24:
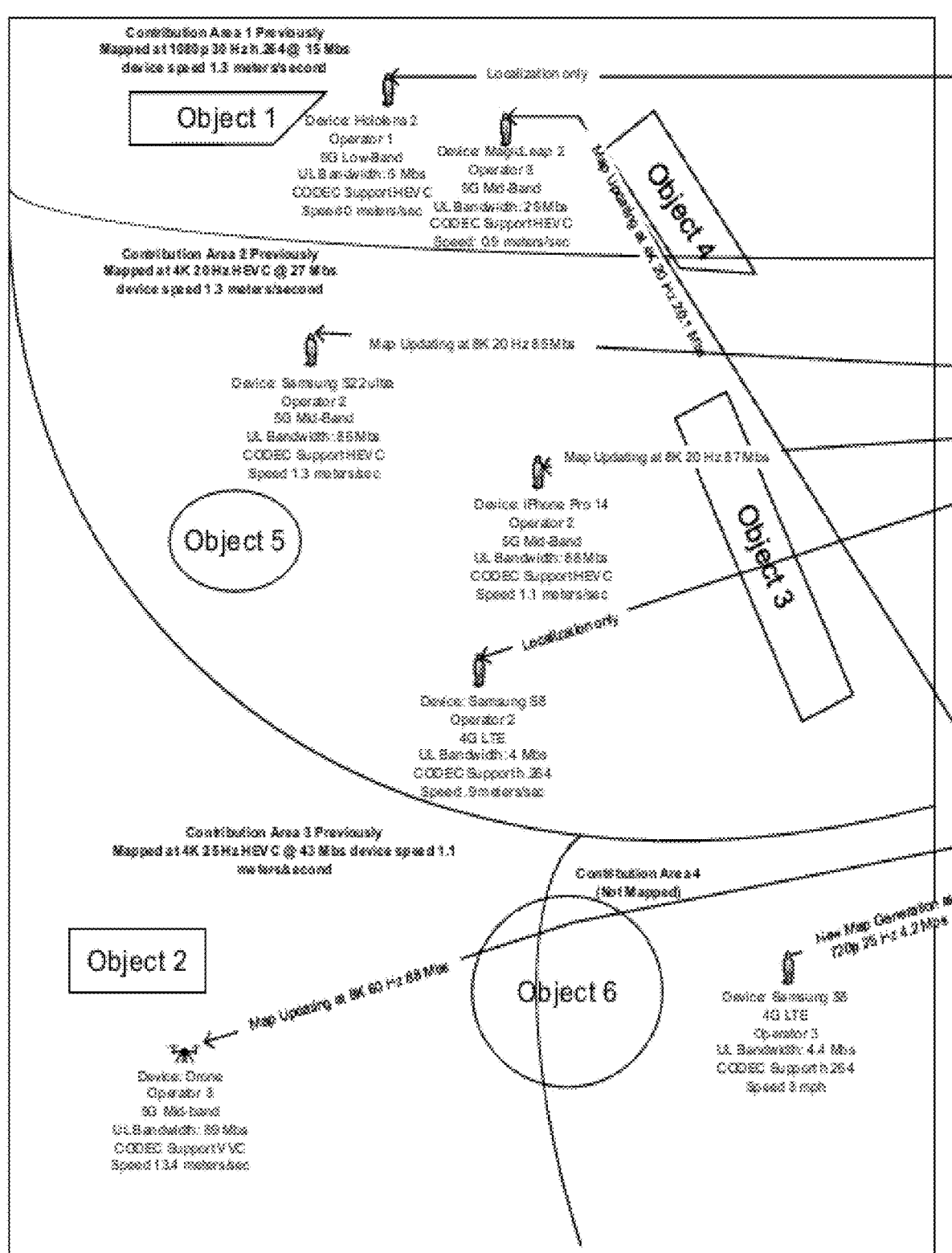
FIG. 24-25 illustrate an example of collaborative mapping with different devices, possibly moving at different speeds, on different mobile networks contributing to the spatial map building/updating process, according to the other embodiment.
Figure 25:
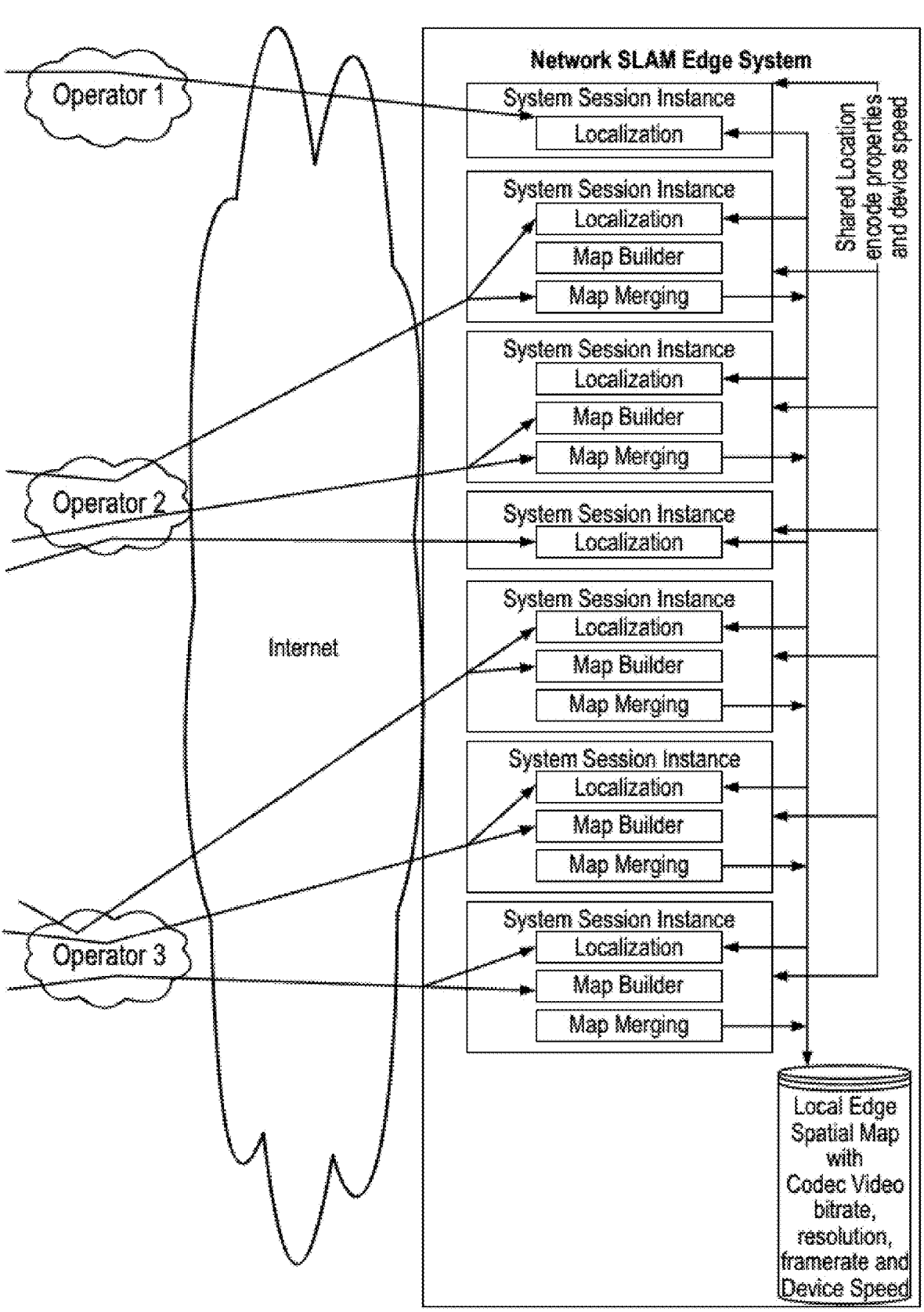

FIGS. 24 and 25 illustrate several SLAM-enabled devices with sensors, capturing image, which may comprise image data of various parameters. Each SLAM-enabled device transmits the image date it captures via a data network, such as the Internet, to the SLAM edge service network of SLAM processors, such as SLAM edge service processor 1201. An example of a SLAM network edge service processor is illustrated in FIG. 25. The SLAM network edge service processor is shown as maintaining system sessions with several SLAM any enabled devices, and as maintaining a local edge service, spatial map of the device region, which may also maintain a record of the resolution, framerate and other parameter as discussed below for each set of image data captured, such as the codec used and the speed with which the SLAM-enabled device was traveling at the time of image capture. The bit rate of transmission of the image data to the SLAM network edge service 1201 may determine how much image data can be throughput using the encoding protocol. Some more modern codecs for example, because of the efficiency in which they encode and compress image data, may require a lower bit rate for transmitting the same amount of raw image data.

FIG. 26 illustrates a process 2600 that may be formed by the SLAM network edge service 1201, according to a second embodiment of the present disclosure. This process may entail an initial map building process from scratch for a device area or may be based on some pre-existing map data.

At 2602, the SLAM network edge service 1201 receives a transmission of first image data from a SLAM device 110 with SLAM client 1111. The first image data may be requested by the SLAM network edge service 1201 or the transmission of the first image data may be initiated by the SLAM client 1111 onboard the SLAM client.

The SLAM network edge service 1201 may also receive additional data, such as IMU data, from the first device. For example, the IMU data may be multiplexed with the first image data and encoded and compressed before being transmitted to the SLAM network edge service 1201. Additional sensor data, such as RADAR data, audio data, electric field or magnetic field data, and/or radio or microwave frequency communication, may also be captured by the first device and transmitted by the first device and transmitted to the SLAM network edge service 1201. The image data may be captured by one or more cameras in, on, or at the first device, and may comprise image data in one or more of the visible frequencies, radio frequencies, microwave frequencies and/or other EM bands. Such data may be transmitted to the SLAM network edge service 1201 via radio transmission or in other suitable frequencies.

The map building may be a collaborative process in which more than one processor participates in receiving data from the first device to build the map, and in which more than one processor participates in localizing the first device, and in guiding the first device. Such processors may be provided remote from one another and from the first device.

While sometimes referred to as a processor or as a SLAM network edge service 1201, the SLAM network edge service 1201 may itself be provided as part of a SLAM-enabled device, such as AR or VR wearable devices, for example, smart glasses or head mounted displays, or as autonomous or self-driving/driver assist vehicles, drones, robots, household appliances such as vacuum cleaners, sweepers, floor treatment equipment, lawn mowers, and the like.

The SLAM network edge service 1201 may then determine one or more image data parameters pertaining to the first data received. Such an image data parameter may pertain to a sensor capacity of the capturing sensor of the first device. The capturing sensor may be the sensor of the first device that captured the first image data, for example, one or more cameras. In an embodiment, the image data parameter may refer to a setting or condition of the capturing sensor that is controlling at a time that the first image data was captured. For example, a setting or condition of a capturing camera may be 4K resolution at the time the first image data is captured, but the maximum capacity of the capturing camera may be 8K resolution. The image data parameter may thus be 4K and this image data parameter may be compared with the image data parameter of the second image data, as discussed below. Similarly, a set of image data may have been captured at a lower framerate than the maximum framerate capacity of the sensor, and thus the lower framerate may be transmitted to the SLAM network edge service 1201 in association with this set of image data.

An image data parameter may be a maximum resolution capacity and/or a maximum framerate capacity of a camera of the SLAM device 1101. The image data parameter may be a maximum bit rate that can provided by the SLAM device 1101. The parameter may be a maximum encoder throughput using a particular codec of the first device. The parameter may also concern data traffic conditions prevailing at the time of the transmission of the image data.

In addition, weather-related conditions, such as rain, snow or other precipitation, humidity, cloudiness, time of day, season or time of year and the like, may affect image quality, and such conditions may also be provided as image data parameters. In addition, a speed of the SLAM device 1101 at the time of the capturing of image data may affect image quality as the amount of data captured per unit of time may be reduced with increased speed of the first device. Thus, these factors may also be considered as image data parameters and may be taken into account by the SLAM network edge service 1201. The transmission from the SLAM device 1101 may also include the one or more such image data parameters pertaining to the image data. Or, such image data parameter information may be previously stored by the SLAM network edge service 1201, or may be otherwise obtained by the SLAM network edge service 1201, for example, from an online database that contains maximum image resolution, maximum framerate, maximum bitrate, the codec uses and the like for each type of device. Accordingly, by knowing the type of SLAM device, such parameter information may be retrieved.

At 2604, SLAM network edge service 1201 may determine one or more distances of the SLAM device 1101 to objects in the device region. Visual inertial odometry may be used to determine distances, and the first image data received may be used in combination with IMU data generated by and received from the SLAM device 1101. Additional data from other SLAM devices may also be received to determine distances to objects in the device region. For example, another SLAM device in the device region may provide image data from which distances to the SLAM device 1101 may be computed, and then at 2606 build a map 1290 of the device region may be generated based on distance determined. While sometimes described as distances or speeds being determined, detected or identified, it will be understood that such quantities may sometimes be produced by estimation or interpolation or restriction to a particular range of values.

At 2608, the map data so generated may be used to guide the SLAM device 1101 by transmitting guidance information to the SLAM device 1101. The map data 1290 may be sufficient to localize the SLAM device 1101 and to transmit guidance instructions or guidance data to the SLAM device 1101 for navigating the device region. In an embodiment, the map data may also be sufficient for localizing other SLAM devices in the device region and for guiding them. Depending on the system architecture for offloading processing from the SLAM device 1101, the guidance data may be localization data transmitted to the SLAM device 1101, or the localization may be performed by the SLAM network edge service 1201 and, based on the localization, guidance instructions/data may be transmitted by the SLAM network edge service 1201 to the SLAM device 1101.

The map data 1290 so generated may be sufficient to localize or to guide the SLAM device 1101 within a range of accuracy with respect to distance from other objects in the device region. In this way, the map data 1290 may be sufficient only to a coarser degree in localizing the SLAM device 1101. For this reason, the first map 1290 may be used to localize the SLAM device 1101 and to guide it to maintain a safety margin to other objects in its vicinity and/or to maintain a lower speed.

At 2610, the SLAM network edge service 1201 may receive a second set of image data. The second image data may be received from a second SLAM device. The second data may be in the device region of the same or substantially the same area and taken from the same or substantially the same vantage point as the first image data. Or the second data may be taken in the device region but from a different area or from a different vantage point. It may be determined by the SLAM network edge service 1201 that the second image data are of the device region. The SLAM network edge service 1201 may determine one or more image data parameters.

In an embodiment, the second image data may be received from the same SLAM device 1101 as the first image data. For example, the second image data may be taken by the SLAM device at a higher image resolution or at a higher framerate than the first image data. Or the second image data may be taken under different weather or indoor lighting conditions than the first image data. Or, the SLAM device 1101 may have received a software or hardware upgrade, which may have yielded second image data of a different image quality than the first image data. In this case, the second data that is received from the SLAM device 1101 may be higher quality because an image data constraint has been removed or is more permissive than was the parameter for the first data.

If at 2612 the SLAM network edge service 1201 determines that the image data parameter of the second data allows for, or provides, higher image quality than the image quality of the first image data, then the SLAM network edge service 1201 may update the map that was generated. A variety of ways may be used to determine which image data comprises higher image quality. Image data quality of the second image data may be considered higher than the image quality of the first image data, for example, if an image data parameter, for example, an image resolution of the capturing camera of the second image data and/or a framerate of the capturing camera of the second image data, is higher than the image resolution and/or framerate of the capturing camera of the first image data. Such capturing parameters may be transmitted to the SLAM network edge service 1201. Or, there may be modules of a device other than the capturing camera involved in imposing image data processing that may degrade image data quality. For example, there may be image encryption or compression modules, less efficient lossy codecs, or the like that may lose some of the originally captured image data. Such additional parameters may also be transmitted to the SLAM network edge service 1201. For example, the type or protocol for image data compression may be transmitted to the SLAM network edge service 1201 may be transmitted to the SLAM network edge service 1201. Such parameters may be transmitted at the time of the transmission of the first or second image data, or may be transmitted at a time of initial registration of the SLAM device with the SLAM network edge service 1201.

If the parameter pertains to data traffic conditions, weather conditions, indoor or outdoor lighting conditions, or a speed of the device on which the capturing camera is deployed, then the second image data may be considered higher quality data than the first data if the constraint imposed by the data traffic conditions, weather conditions, indoor or outdoor lighting conditions or the speed of the device on which the capturing camera is deployed has been mitigated, reduced or changed in its ability to adversely affect image quality.

According to an embodiment, the quality of the image data, or a segment of video, or an image or frame of the second image data, may be considered higher if it contains more data. For example, this may be measured by the number of bits compared with a corresponding portion of the first image data. Or, the amount of data may be compared for the same area within a corresponding image, or for a corresponding reference point or key point of a scene or for a set of reference points or key points of a scene. It is thus determined whether a second parameter or a two or more parameters of the second image data provide(s) for or enable)(s) higher quality image data than does a first parameter or two or more parameters of the first image data. On the other hand, overall image quality may be equal to or higher for the first image data but one or more portions of the second image data may be taken at a higher framerate, or at a higher resolution than the framerate or resolution of the first image data, in which case those one or more portion of the second image data are used to replace corresponding portions of the first image data while keeping remaining portions of the first image data.

If the second image or portions thereof are of higher quality image ("yes" at 2612) then processing continues to 2614. later. On the other hand, if no higher quality image data is obtained from the second image data, then processing may return to 2602.

At 2614 the map is updated, for example, the map is supplemented with the second image data. Or, the old map may be entirely replaced. Or, a portion of the map, may be entirely replaced by the second image data. For example, some or all of the first image data may be replaced by the second image data for generating the updated map. Or, only portions of the first image data that are deemed to be of lower image quality than the second image data may be replaced for generating the updated map. Or, only those portions that are taken of the same or substantially the same areas or objects in the device region, or only those portions that are from the same or substantially the same vantage points may be replaced by corresponding portions of the higher image quality second image data to generate the update map data. For example, an area of the device region that has higher image quality than a corresponding area of the first image data may be replaced. Data for a reference point or key point of a scene or for a set of reference points or key points of a scene may be replaced by corresponding data of the second image data. Further, the second image data may be used to supplement the first image data without replacing or supplanting the first image data. Or updated map data may be generated such that portions of the first image data that are higher image quality may be used for some portions of the updated may while portions of the second image data that are higher quality may be used for generating other portions of the updated map.

After the updated map is generated, at 2616 the updated map may be transmitted to SLAM enabled devices in or near the device region. However, if localization is offloaded from the SLAM-enabled device 1101 then the SLAM network edge service 1201 may transmit guidance data to be used for navigating the SLAM device 1101, based on the localization performed by the SLAM network edge service 1201 according to the updated map. Such guidance data may be upgrade version of the guidance data generated based on the localization according to the initial map. The updated guidance data may be generated based on more accurate localization of the SLAM device 1101 and thus may enable finer positioning of the SLAM device 1101 and/or reduced distance margin to nearby objects and/or higher speeds of operation for the SLAM device 1101. Thus, higher SLAM device speeds and reduced distance margins to nearby objects may be realized. Reduced distances to nearby objects and/or higher speeds may require more frequent image data capture and/or more frequent image data transmission to the SLAM network edge service 1201.

Figure 27A:
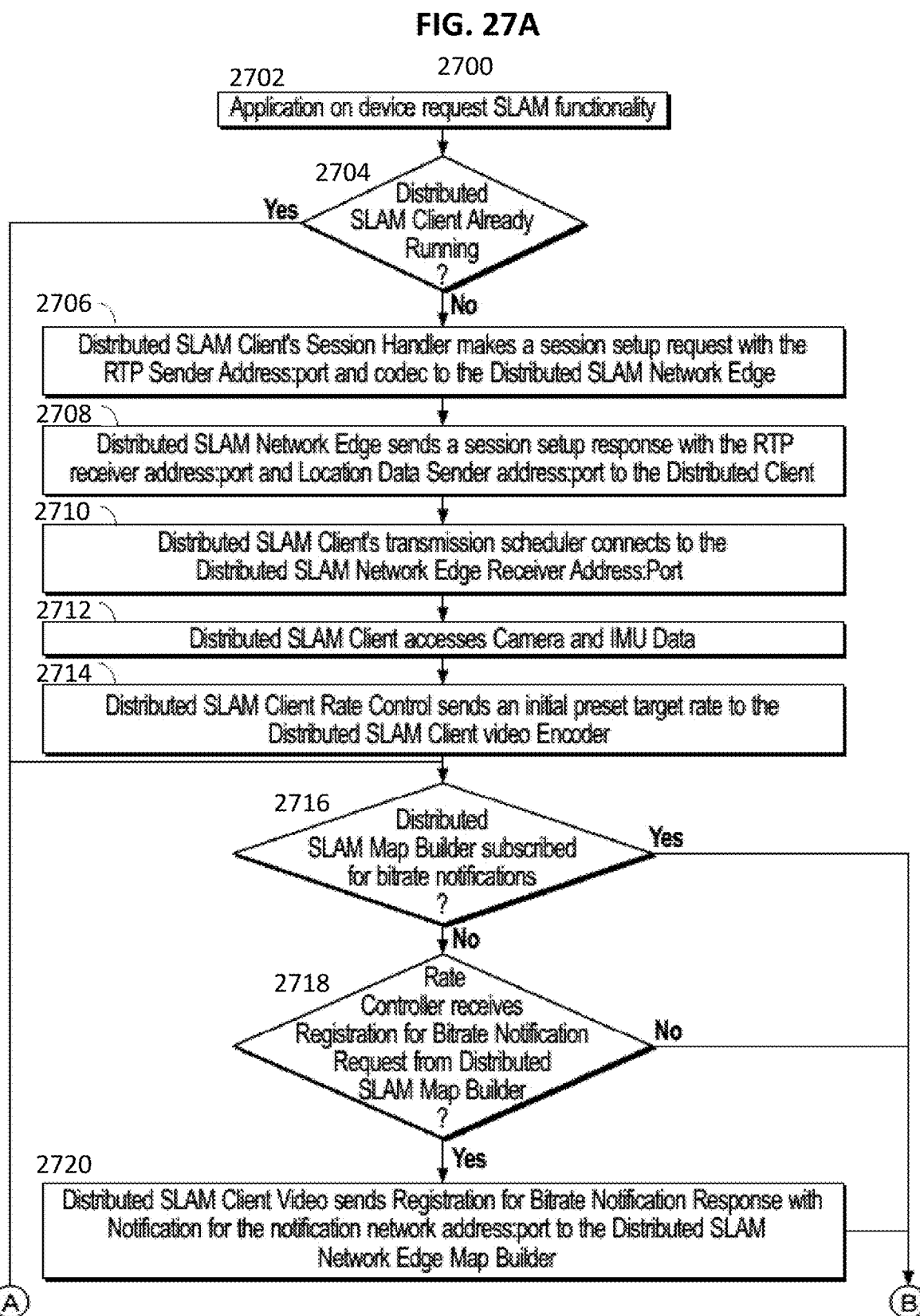

FIGS. 27A-B present a flowchart showing an initial startup process of a SLAM client 1111 of SLAM device 1101 as part of map building process with updates to improve map detail and quality. The flowchart illustrates that at 2702, an application running on the SLAM-enabled device 1101 requests SLAM functionality, for example, to navigate a space. If the SLAM client 1111 is not already running, then at 2706-2714 of FIG. 27A steps are performed to initiate communication with the SLAM network edge service 1201 and to give the SLAM client 1111 access to the camera, IMU and other components of the SLAM device 1101. SLAM client 1111 may also set an initial target bitrate and registers with SLAM network edge service 1201 to receive bitrate and other notifications.

FIG. 27B shows at 2722-2742 that the SLAM client device 1101 processes camera and IMU data and may adjust a bitrate at which it communicates with map builder module of the SLAM network edge service 1201.

Figure 28:
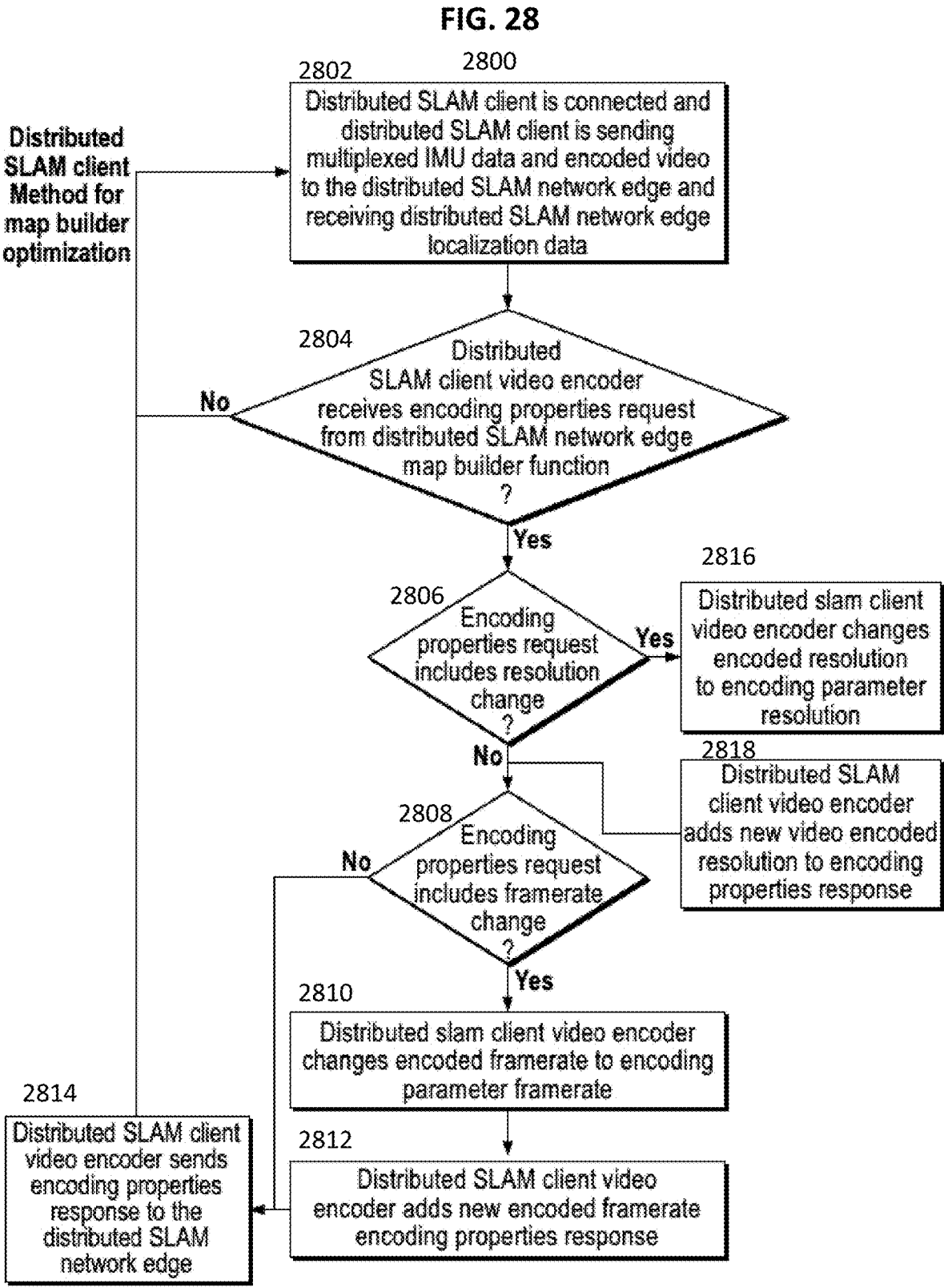
FIG. 28 is a flowchart showing an example of a process for distributed SLAM client image data aggregation for optimized map building, according to the second embodiment.

FIG. 28 shows a process for requesting image data from SLAM client 1111 of SLAM device 1101. By way of example, FIG. 28 illustrates that at 2804-2808 when a resolution change or a framerate change is requested by SLAM network edge service 1201, then these parameters are updated at 2816 and 2818, respectively, and image data transmission may be sent to the SLAM network edge service 1201, accordingly.

FIGS. 29A-D illustrate a process for initiating map builder or map upgrade/update mode by the SLAM network edge service 1201. FIGS. 29A-D illustrate that if the SLAM network edge service 1201 is not yet running (at 2904), then at 2906 session is initiated for relevant SLAM network edge serviced services and sets up communication with SLAM client 1101 and initializes variables (steps 2908-2916), and sets a bitrate for SLAM rate controller and map builder (2918-2920). At 2922-2924 of FIG. 29B, map builder listens for and receives a bitrate notification and the uplink bitrate notification is set accordingly at 2926.

As also shown in FIG. 29B, when at 2928 the SLAM network edge service 1201 receives IMU and video data from the SLAM-enabled device 1101, at 2920 the IMU and video data rare demultiplexed, at 2932 the IMU data are sent with a timestamp to timing sync, while at 2934 the video data are transcoded, and processed at 2936-2940.

Figure 29C:
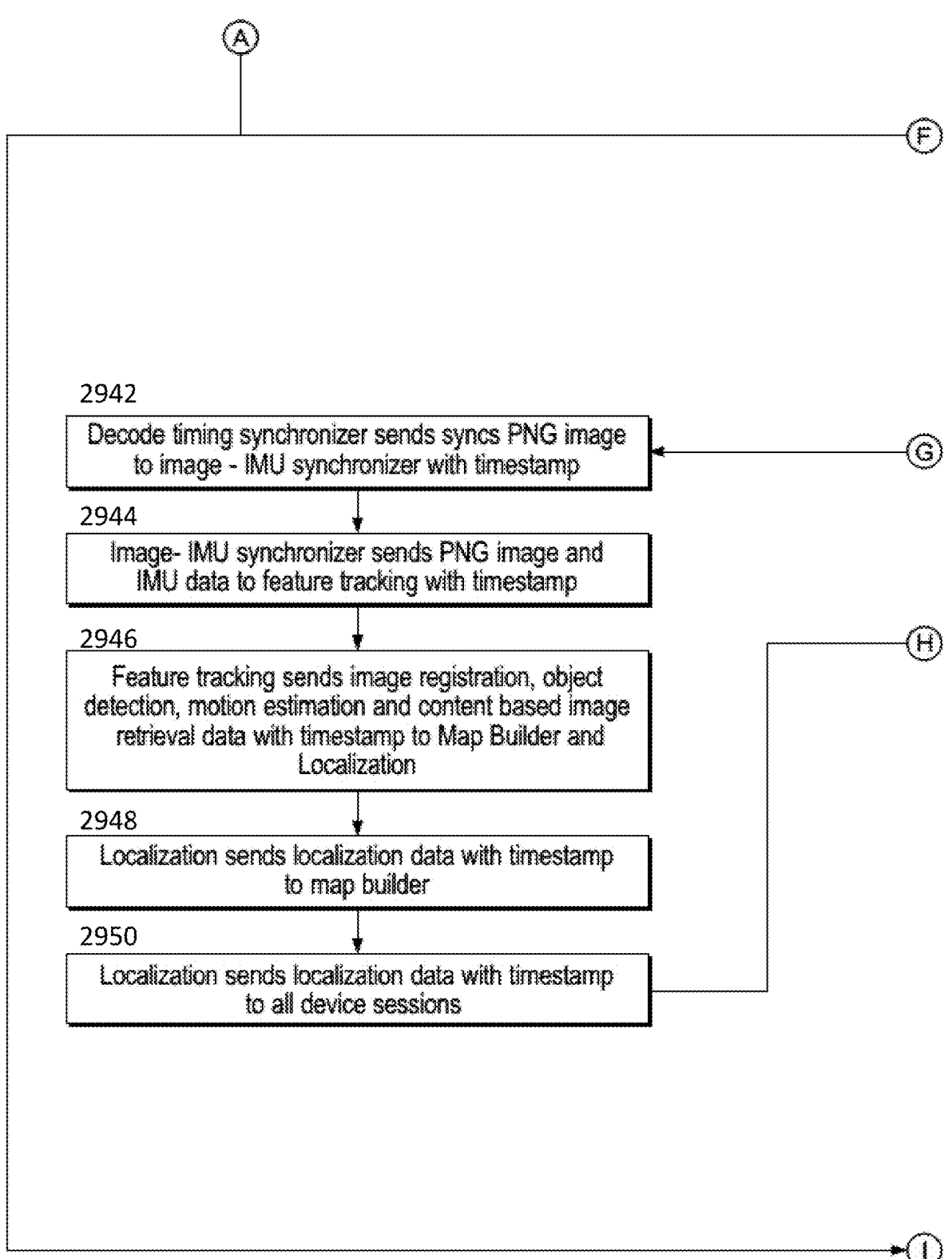
Figure 29D:
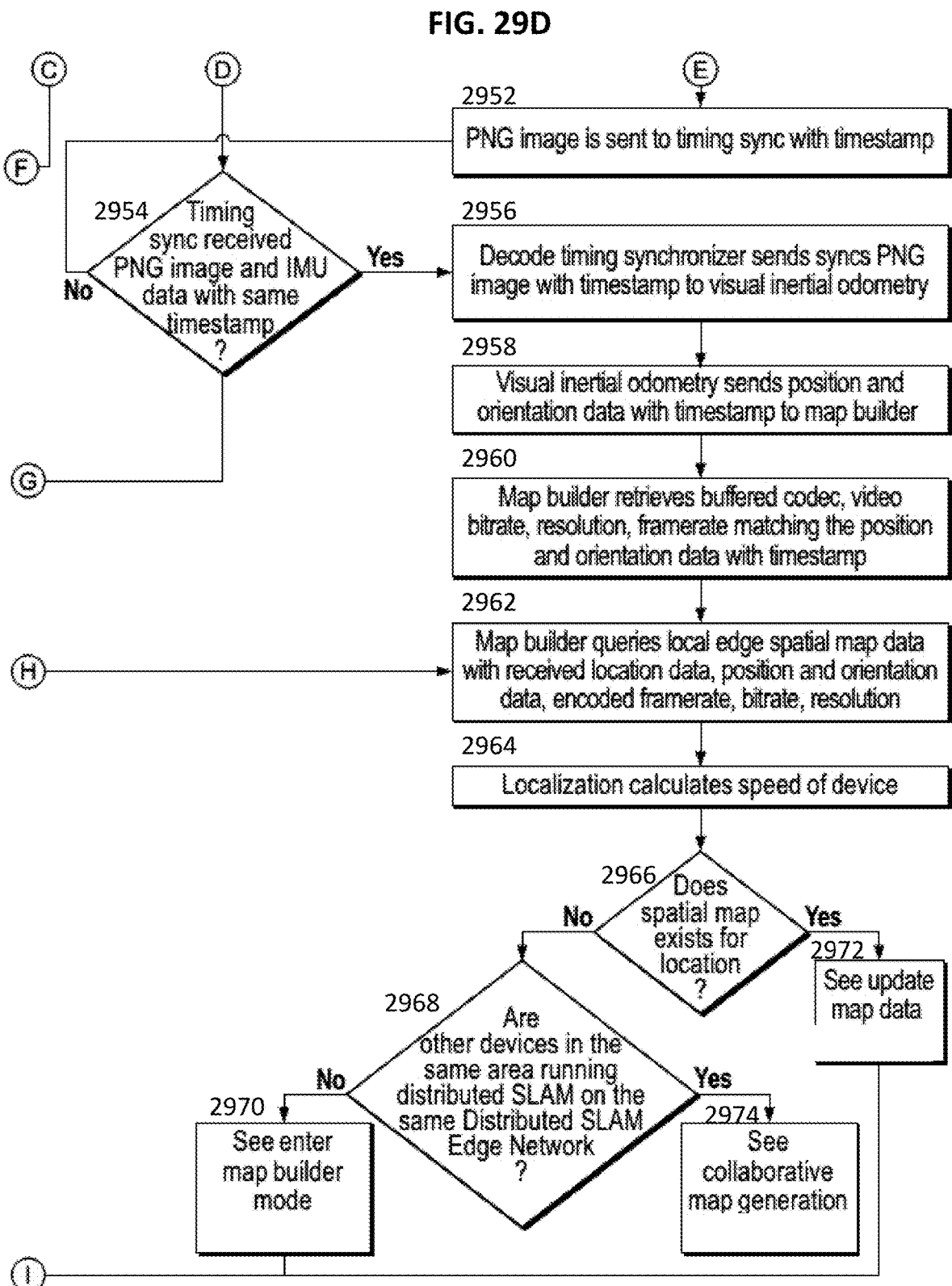

FIG. 29C shows that at 2942 the PNG image data and the IMU data are synchronized, and at 2944-2950, key features are identified and tracked, objects and object motions are estimated and localization is performed and sent to map builder of SLAM network edge service 1201. FIG. 29D shows processing for decoding the image data and synchronizing it with the IMU data (2926) before visual inertial odometry, at 2858, sends position and orientation data to map builder. At 2962, map builder checks this information with its map and at 1964 localization calculates the speed of the SLAM-enabled device 1101. If at 2966 it is determined that spatial map data already exists for the location described by the data received, then at 2972 the map is updated. If not, then at 2968 it may be determined whether one or more other SLAM-enabled devices are in the area, in which case, a collaborative map generation process may be performed based on the data received and based on other data collected by these one or more other SLAM-enabled devices. At 2970, map builder mode starts based on the data received from the SLAM-enabled device 1101. SLAM network edge service 1201 may maintain the type of codec used, the video data bit rate, the resolution for the image data, the framerate for the image data, the device speed at the time of capture of the image data, and a time/date stamp of the capturing of the image data, and associate such parameters for the image data with the map that is built or with portions or aspects of the map associated with the image data.

FIG. 30 shows that the map builder of SLAM network edge service 1201 may enter a map builder mode when it is determined that higher quality image data are available for updating or upgrading the map, or when no map exists for the area. At 3002, encoding parameters may be determined based on the SLAM-enabled device 1101, the uplink bandwidth available, the speed of the device and the like. Map builder may consult a lookup table that specifies bitrates, image resolutions and framerates to set the resolution parameter at 3004, and to set the framerate at 3006. At 3008, a request is sent to the SLAM-enabled device 1101 and if at 3010 a response is received, then at 3012-3014 a map is built or updated with codec, bitrate, resolution, framerate and device speed recorded for the data received and integrated into the map. Such data is recorded so that the quality of the data may be later compared with data for the comparable area to determine whether the data available subsequently may be used to improve/replace the map or one or more portions thereof. SLAM network edge service 1201 may request encoding properties and other parameters from the SLAM client 1111 of SLAM device, 1101. Or, SLAM network edge service 1201 may look up SLAM client 1111 properties and parameters of the camera or other sensors based on a knowledge service of the model. A building mode of the SLAM network edge service 1201 may be entered when better parameters for the image data, those that provide higher quality image data, have been identified.

FIGS. 31A-B show a method for the map builder of SLAM network edge service 1201 to enter a map building update mode. For example, such an update mode may be triggered at 3104-3106 based on the determination of sensor parameters or capabilities of a camera, other image sensor and/or uplink bandwidth, or other parameters associated with image data exists that are more accurate or providing more data than data for corresponding space or objects currently on the map. If so, then at 3108 it is determined whether there are SLAM-enabled devices in the area other than the SLAM-enabled device 1101 and, if yes, then at 3112 a collaborative map generation or map updating process is commenced, as shown in FIG. 32A. If the SLAM-enabled device 1101 is the only one available in the area then at 3114-3116 of FIG. 31B a map building process is commenced by setting a framerate parameter based on a table or other data structure that correlates framerates with bitrates and image resolutions, and at requesting SLAM-enabled device 1101 to encode data accordingly. Then if a response is received at 3118, then map builder at 3120-3122 builds/updates map with codec, bitrate, resolution, framerate and device speed recorded for the data received and integrated into the map.

FIGS. 32A-B show SLAM network edge service 1201 engaging in a collaborative map generation or map upgrade process, still continuing discussion of the second embodiment. SLAM network edge service 1201 may determine whether parameters such as framerates, image, resolution, codec, and bit rate associated with image data that has been received for an area of a map, provide less image quality or less image data than could be generated for image data by the maximal capabilities of the SLAM-enabled client 1111 or other SLAM-enabled device in the area, including the sensor(s) used, the quality of the IMU, etc. If so, SLAM network edge service 1201 may enter a map upgrading mode. At 3202, the codec, bitrate, resolution, framerate and device speed at which data for the map or portions thereof are retrieved and at 3204 the portion of such data for a portion of the map at which a SLAM-enabled device is identified. For each SLAM-enabled device in the area, at 3206 these parameters for the data available from the device are compared with the identified data and if the former represents an improvement in terms of improving quality, resolution, detail of the map or portion thereof, or if it is more recent, then at 3208 a map creation mode is entered.

At 3212-3214 of FIG. 32B, map builder sets the resolution parameter and the framerate parameter to the selected resolution parameter and the selected framerate parameter, respectively, from the table or other data structure that correlates resolution parameters, framerates and bitrates available at the SLAM-enabled device. Accordingly, at 3216, SLAM network edge service 1201 requests SLAM-enabled device 1101 to encode using such parameters and, if at 3218 this request is acknowledged, then at 3220-3222 map builder builds/expands/updates the map accordingly, with codec, bitrate, resolution, framerate and device speed recorded for the data received and integrated into the map.

FIG. 33 shows a process for the map builder of SLAM network edge service 1201 to select optimal encoding parameters. At 3302, based on the SLAM device's speed, a framerate is determined, according to the data structure illustrated in FIG. 55. Map builder 1251 may look up a framerate in the table illustrated in FIG. 34 based on the SLAM device's speed (in meters per second) and select other parameters accordingly, based on the table illustrated in FIG. 35. That is, using this framerate determined from FIG. 34, and knowing the reported camera properties of SLAM-enabled device 1101, at 3304-3306 selects the bitrate, resolution in the data structure represented in FIG. 35. At 3308, map builder may then determine a bitrate, depending on the codec used by the SLAM-enabled device 1101, and request SLAM-enabled device to transmit IMU and/or video data based on the determined bitrate.

FIG. 34 is a table (Table 1) showing an example for framerates that may be required for optimal map building based on the speed of the contributing device that may be used in conjunction with the table of FIG. 35 (Table 2), which shows examples for encoding bitrates, resolutions, and framerates that may be required for optimal map building.

The example shown in Table 2 uses MPEG h.264 (AVC), MPEG h.265 (HEVC) and MPEG h.266 (VVC). The table of FIG. 34 may be used to determine the framerate based on the device speed and as input for selection of encoding parameters for the table of FIG. 35. The values in bold in Table 2 are the keys that may be used for localization and device speed to determine the encoding parameters for an optimal map building process at different bitrates, according to the other embodiment.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method of communication control comprising:
receiving a transmission from a device, the transmission indicating inertial measurement data and image data obtained by a sensor of the device;
determining, by a processor and based at least in part on the inertial measurement data and the image data, one or more of a speed of the device or a distance of the device from one or more objects;

based at least in part on the determining of the speed of the device or the distance of the device from the one or more objects, transmitting to the device one or more of a request for an adjustment of a framerate of the sensor of the device for obtaining additional image data or a request for an adjustment of a resolution of the additional image data; and
receiving from the device the additional image data at the adjusted framerate or at the adjusted resolution.

2. The method of claim 1, further comprising:
determining by the processor, based on the transmission received from the device, a change in a speed of a first object of the one or more objects relative to the device; and
based at least in part on the determining of the change in the speed of the first object, transmitting to the device the request for the adjustment of the framerate.

3. The method of claim 1, wherein the determining of the distance of the device from the one or more objects comprises determining a decreased distance of the device from the one or more objects relative to a previous distance of the device from the one or more objects, and
based at least in part on the determining the decreased distance, transmitting to the device the request for the adjustment of the framerate comprising an indication of a specified second framerate of the sensor of the device for obtaining the additional image data, the second framerate being greater than a first framerate of the image data in the received transmission from the device prior to the adjustment.

4. The method of claim 1, further comprising localizing the device according to spatial mapping data generated by the processor and the additional image data, wherein the processor is physically not connected to the device and is remote from the device.

5. The method of claim 1, wherein the device is a wearable virtual reality device or an augmented reality device.

6. The method of claim 1, wherein the device is an autonomous vehicle.

7. The method of claim 1, wherein the device is a drone or a robot.

8. A system of communication control comprising:
I/O circuitry configured to receive a transmission from a device, the transmission indicating inertial measurement data and image data obtained by a sensor of the device;
processing circuitry configured to:
determine, based at least in part on the inertial measurement data and the image data, one or more of a speed of the device or a distance of the device from one or more objects; and
based at least in part on the determining of the speed of the device or the distance of the device from the one or more objects, transmit to the device one or more of a request for an adjustment of a framerate of the sensor of the device for obtaining additional image data or a request for an adjustment of a resolution of the additional image data; and
the I/O circuitry configured to receive from the device the additional image data at the adjusted framerate or at the adjusted resolution.

9. The system of claim 8, wherein the processing circuitry is configured:

to determine, based at least in part on the transmission received from the device, a change in a speed of a first object of the one or more objects relative to the device; and in response to the determining of the change in the speed of the first object, to transmit to the device the request for the adjustment of the framerate.

10. The system of claim 8, wherein the determining of the distance of the device from the one or more objects comprises determining a decreased distance of the device from the one or more objects relative to a previous distance of the device from the one or more objects and the processing circuitry is configured to transmit to the device, based at least in part on the determining the decreased distance, the request for the adjustment of the framerate comprising an indication of a specified second framerate of the sensor of the device for obtaining the additional image data, the second framerate being greater than a first framerate of the image data in the received transmission from the device prior to the adjustment.

11. The system of claim 8, wherein the processing circuitry is configured:

to localize the device according to spatial mapping data generated by the processing circuitry and the additional image data, wherein the processing circuitry is physically not connected to the device and is remote from the device.

12. The system of claim 8, wherein the device is a wearable virtual reality device or an augmented reality device.

13. The system of claim 8, wherein the device is an autonomous vehicle.

14. The system of claim 8, wherein the device is a drone or a robot.

15. A non-transitory computer-readable medium incorporating instructions that, when executed by a processor, are configured to cause control circuitry:

to receive a transmission from a device, the transmission indicating inertial measurement data and image data obtained by a sensor of the device;

to determine, based at least in part on the inertial measurement data and the image data, one or more of a speed of the device or a distance of the device from one or more objects;

based at least in part on the determining of the speed of the device or the distance of the device from the one or more objects, to transmit to the device one or more of a request for an adjustment of a framerate of the sensor of the device for obtaining additional image data or a request for an adjustment of a resolution of the additional image data; and to receive from the device the additional image data at the adjusted framerate or at the adjusted resolution.

* * * * *